United States Patent
Takada et al.

(10) Patent No.: US 12,230,119 B2
(45) Date of Patent: Feb. 18, 2025

(54) CONTROL DEVICE, CONTROL METHOD, AND RECORDING MEDIUM

(71) Applicant: NEC Corporation, Tokyo (JP)

(72) Inventors: Eiji Takada, Tokyo (JP); Hironori Nakata, Tokyo (JP); Hiroki Naoshima, Tokyo (JP); Yuji Takagi, Tokyo (JP); Yuri Mashimo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 17/590,138

(22) Filed: Feb. 1, 2022

(65) Prior Publication Data

US 2022/0277640 A1 Sep. 1, 2022

(30) Foreign Application Priority Data

Feb. 26, 2021 (JP) ................. 2021-030340

(51) Int. Cl.
*G06F 21/32* (2013.01)
*G06V 40/16* (2022.01)
*G08B 23/00* (2006.01)

(52) U.S. Cl.
CPC ........... *G08B 23/00* (2013.01); *G06V 40/168* (2022.01); *G06V 40/172* (2022.01)

(58) Field of Classification Search
CPC .............. G08B 23/00; G08B 13/19613; G08B 13/19647; G08B 21/245; G06V 40/168; G06V 40/172; G06V 10/70; G06V 20/52; G06V 20/56; G06V 20/58; G06V 20/59; G06V 40/10; G06V 40/1365; A61B 5/01; A61G 3/061; A61G 3/062; B60R 25/102; B60R 25/104; B60R 25/24; B60R 25/25; B60R 25/302; B60R 25/305; B60R 25/31; B60W 50/0098; B60W 50/14; G06T 2207/30196; G06T 2207/30242; G06T 2207/30268; G06T 7/0008; G06T 7/70; H04N 5/76; H04N 7/188; G06F 16/951; G06F 21/32; H04L 2209/34; H04L 2209/805; H04L 9/0866; H04L 9/30; H04L 9/3231

See application file for complete search history.

(56) References Cited

U.S. PATENT DOCUMENTS

| | | | |
|---|---|---|---|
| 2013/0004032 A1* | 1/2013 | Abiko | G06V 40/1365 382/124 |
| 2018/0241558 A1* | 8/2018 | Takahashi | H04L 9/3231 |
| 2022/0153232 A1* | 5/2022 | Gallagher | A61G 3/062 |

FOREIGN PATENT DOCUMENTS

| | | |
|---|---|---|
| JP | 2002-269331 A | 9/2002 |
| JP | 2011-013936 A | 1/2011 |
| JP | 2011-210100 A | 10/2011 |
| JP | 2015-156129 A | 8/2015 |
| JP | 2020-144681 A | 9/2020 |

OTHER PUBLICATIONS

JP Office Action for JP Application No. 2021-030340, mailed on Oct. 1, 2024 with English Translation.

* cited by examiner

*Primary Examiner* — Dionne Pendleton
(74) *Attorney, Agent, or Firm* — Sughrue Mion, PLLC

(57) ABSTRACT

A control device acquire person information that is information unique to person, specify ability information that is information indicating ability of the person indicated by the acquired person information, and output the specified ability information to a predetermined output device.

14 Claims, 27 Drawing Sheets

Fig.16

| ABILITY INFORMATION OF MR. ○△ | |
|---|---|
| LARGE VEHICLE LICENSE | VALID |
| EMERGENCY PARAMEDIC | QUALIFIED |

| AREA IDENTIFICATION INFORMATION | AREA TOTAL VALUE INFORMATION |
|---|---|
| FIRE STATION A | 50 |
| FIRE STATION B | 150 |
| FIRE STATION C | 200 |

Fig.18

ABILITY INFORMATION OF MR. ○△ — 1031

| | 1032 | |
|---|---|---|
| LARGE VEHICLE LICENSE | VALID | |
| EMERGENCY PARAMEDIC | QUALIFIED | |

1041a

| AREA IDENTIFICATION INFORMATION | AREA TOTAL VALUE INFORMATION ||
|---|---|---|
| | FIREFIGHTING OPERATION RESPONSIVENESS | EMERGENCY OPERATION RESPONSIVENESS |
| FIRE STATION A | 50 | 30 |
| FIRE STATION B | 150 | 180 |
| FIRE STATION C | 200 | 240 |

104a

CONTROL DEVICE, CONTROL METHOD, AND RECORDING MEDIUM

This application is based upon and claims the benefit of priority from Japanese Patent Application No. 2021-030340, filed on Feb. 26, 2021, the disclosure of which is incorporated herein in its entirety by reference.

TECHNICAL FIELD

The present invention relates to a control device, a control method, and a recording medium.

BACKGROUND ART

A driver driving an urgent car, such as an emergency car or a fire engine, may not be a proper driver. For example, a driver who drives an urgent car needs to have a valid driver's license related to a type of urgent car. Nevertheless, in some cases, a person with an expired driver's license may drive an urgent car. Such cases occur because a driver and a person in charge of managing the driver cannot easily grasp the ability of the driver.

Japanese Patent Application Laid-open Publication No. 2020-144681 (Patent Literature 1) describes a method of specifying an ambulance crew or patient who uttered using a voiceprint. In the method described in Patent Literature 1, when the content of an utterance is converted into text from a voice received by a smart speaker installed in an urgent car or an emergency room, the server device specifies the speaker using the voiceprint of the voice.

SUMMARY

An example object is to provide a control device, a control method, and a recording medium that enable a user of the control device to easily grasp ability of a predetermined person.

According to an example aspect of the invention, a control device includes an acquisition unit configured to acquire person information that is information unique to person, a specification unit configured to specify ability information that is information indicating ability of the person indicated by the acquired person information, and a control unit configured to output the specified ability information to a predetermined output device.

In addition, according to an example aspect of the invention, a control method includes acquiring person information that is information unique to person, specifying ability information that is information indicating ability of the person indicated by the acquired person information, and outputting the specified ability information to a predetermined output device.

Further, according to an example aspect of the invention, a control program recorded on a computer-readable recording medium causes a computer to execute an acquisition function configured to acquire person information that is information unique to person, a specification function configured to specify ability information that is information indicating ability of the person indicated by the acquired person information, and a control function configured to output the specified ability information to a predetermined output device.

BRIEF DESCRIPTION OF THE DRAWINGS

Exemplary features and advantages of the present invention will become apparent from the following detailed description when taken with the accompanying drawings in which:

FIG. 16 is a diagram illustrating an example of a screen displayed on an output device according to the fourth example embodiment of the present invention;

FIG. 18 is a diagram illustrating an example of a screen displayed on an output device according to the fourth example embodiment of the present invention;

EXAMPLE EMBODIMENT

First Example Embodiment

A first example embodiment of the present invention will be described.

Figure 1:
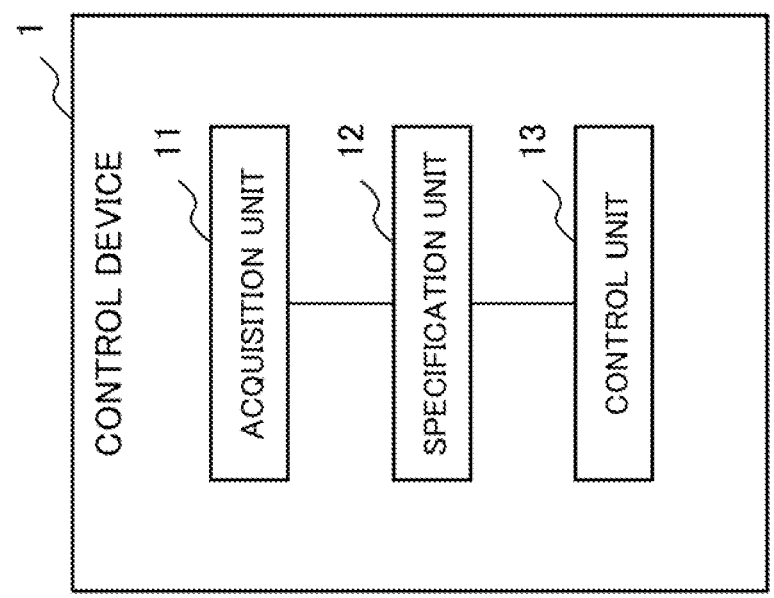
FIG. 1 is a block diagram illustrating a configuration example of a control device according to a first example embodiment of the present invention.

FIG. 1 is a block diagram illustrating a configuration example of a control device 1 of the present example embodiment. The control device 1 of the present example embodiment includes an acquisition unit 11, a specification unit 12, and a control unit 13.

The acquisition unit 11 acquires person information that is information unique to the person.

For example, the acquisition unit 11 is a card reader that acquires person information from an integrated circuit (IC) card in which person information is stored in advance. For example, the person information is person identification information indicating preset identifiers for each person.

Further, for example, the person information is biometric information obtained from the living body of a person. For example, the acquisition unit 11 may have an imaging function of capturing an image, or may receive image information indicating an image captured by a predetermined imaging device (not illustrated). When the acquisition unit 11 acquires the image information, the person information is the image information indicating a face image. Further, for example, the acquisition unit 11 may have an input function of receiving voice input, or may receive voice information that is voice information received by a predetermined input device (not illustrated). The voice information is information according to the voice. When the acquisition unit 11 acquires voice information, the person information is voice information.

The specification unit 12 specifies the ability information that is information indicating the ability of the person indicated by the person information acquired by the acquisition unit 11.

For example, the specification unit 12 collates whether person identification information that matches with person identification information that is the acquired person information is stored in an ability information storage unit (not illustrated). The person identification information of a person who is a specification target of the ability information and the ability information of the person are stored in the ability information storage unit in association with each other in advance. The specification unit 12 specifies the ability information stored in the ability information storage unit in association with the person identification information that matches the acquired person identification information.

The control unit 13 causes a predetermined output device (not illustrated) to output the specified ability information.

In this way, the control device 1 acquires the person information that is information unique to a person. Further, the control device 1 specifies the ability information of the person indicated by the acquired person information, and outputs the specified ability information to a predetermined output device. This makes it possible for a user of the control device 1 to confirm the ability information output to the output device. In this way, it becomes possible for the user of the control device 1 to easily grasp the ability of a predetermined person.

Figure 2:
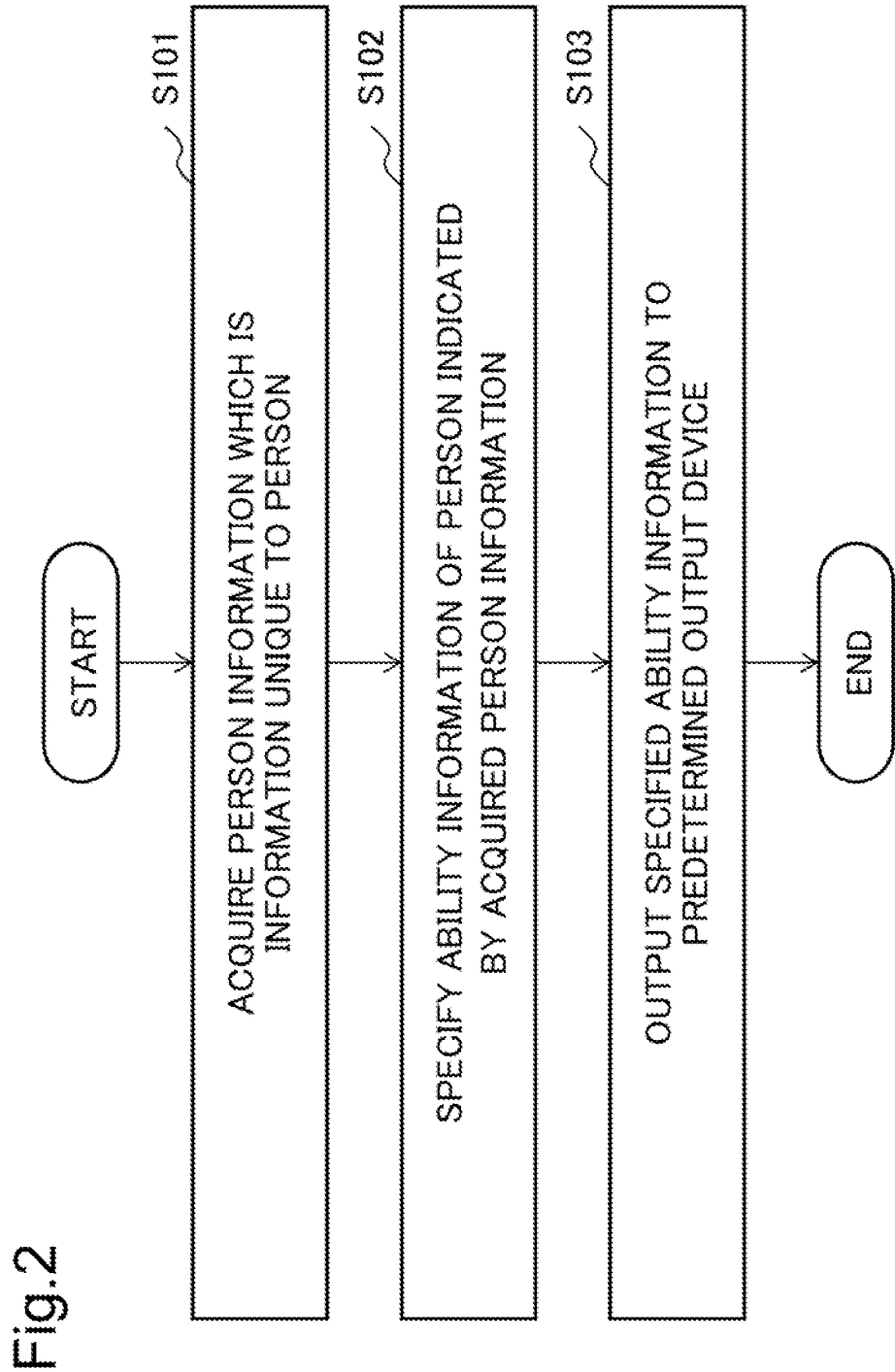
FIG. 2 is a flowchart illustrating an operation example of the control device according to the first example embodiment of the present invention.

Next, an operation example of the control device 1 of the present example embodiment will be described with reference to FIG. 2. FIG. 2 is a flowchart illustrating the operation example of the control device 1.

The acquisition unit 11 acquires the person information that is information unique to a person (step S101).

The specification unit 12 specifies the ability information of the person indicated by the person information acquired by the acquisition unit 11 (step S102).

The control unit 13 outputs the specified ability information to a predetermined output device (step S103).

This makes it possible for a user of the control device 1 to confirm the ability information output to the output device. In this way, it becomes possible for the user of the control device 1 to easily grasp the ability of a predetermined person.

Second Example Embodiment

Next, a control device 3 according to a second example embodiment of the present invention will be specifically described. The control device 3 of the second example embodiment is different from the control device 1 of the first example embodiment in that the person information that is information unique to the person is acquired from the acquisition device 2. The function of the acquisition device 2 may be provided by the control device 3 described later.

Figure 3:
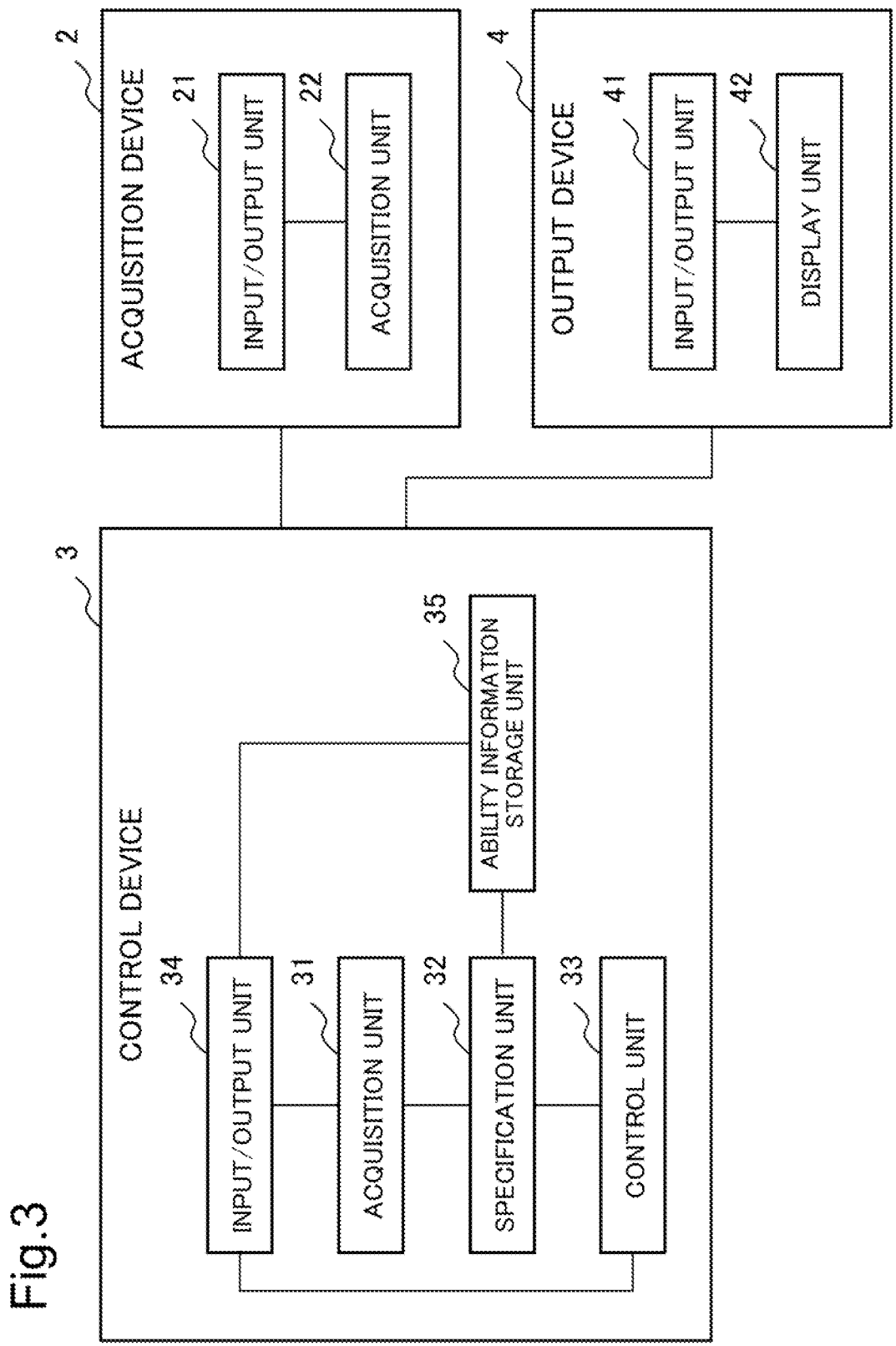
FIG. 3 is a block diagram illustrating a configuration example of a control system according to a second example embodiment of the present invention.

A configuration example of the control system of the present example embodiment will be described with reference to FIG. 3. FIG. 3 is a block diagram illustrating a configuration example of a configuration of the control system according to the present example embodiment. As illustrated in FIG. 3, the control system of the present example embodiment includes an acquisition device 2, a control device 3, and an output device 4. The number of acquisition devices is optional as one or two or more. Further, the number of control devices may be optional as one or two or more. Further, the number of output devices may be optional as one or two or more. In addition, each of one or two or more control devices 3 receives person information from a predetermined acquisition device 2. In addition, each control device 3 causes a predetermined output device 4 to output ability information.

The acquisition device 2 acquires person information that is information unique to the person. The acquisition device 2 outputs the acquired person information to the control device 3. For example, the acquisition device 2 is a card reader that acquires person information from an IC card in which person information is stored in advance. Alternatively, the person information is biometric information obtained from the living body of the person. Instead of the card reader, for example, the acquisition device 2 may include an imaging device that captures an image. Alternatively, the acquisition device 2 may include an input device that receives voice input and outputs voice information that is information of voice. The acquisition device 2 may include both an imaging device and an input device. The acquisition device 2 may be connected to a terminal device including a mobile terminal. Further, the imaging device or input device of the acquisition device 2 may be an imaging device or an input device provided in a terminal device including a mobile terminal. Further, the acquisition device 2 may be installed in a car. The car is, for example, an emergency car or a firefighting car. When the acquisition device 2 includes the imaging device installed in the car, the imaging device of the acquisition device 2 is installed at a position where a person in the car can be imaged.

In addition, biometric information of a plurality of persons may be included in the image information indicating the image captured by the imaging device of the acquisition device 2 or voice information that is the voice information input by the input device of the acquisition device 2 (for example, pieces of biometric information of each person of a plurality of persons can be extracted or detected). When the acquired image information and voice information include biometric information of a plurality of persons, the acquisition device 2 extracts the pieces of biometric information of each person from the image information and voice information based on a preset rule. The acquisition device 2 outputs the extracted biometric information to the control device 3 as person information.

For example, when the acquisition device 2 includes the imaging device and captures an image including face images illustrating faces of a plurality of persons in a car, the image shown in the image information includes face images of a plurality of persons that are biometric information of a plurality of persons. The acquisition device 2 detects a person's face image included in the captured image from the image based on feature points indicating features of the person's face. The acquisition device 2 outputs the face image information indicating the detected face image to the control device 3 as pieces of person information of each person.

Further, the acquisition device 2 may include a display unit (not illustrated) that displays an image and an input/output interface (not illustrated) that receives input by the user, and may have the function of the output device 4 described later. When the acquisition device 2 includes a display unit, the acquisition device 2 that receives, from the control device 3, control information instructing the output of the ability information that is information indicating ability of a person may display an image indicating the ability information on the display unit. For example, the acquisition device 2 displays an image of a list of ability information specified by the control device 3 on the display unit. Further, when the acquisition device 2 includes an input/output interface, person information and ability information may be input to the acquisition device 2 according to the operation of the input/output interface by the user. In this case, the acquisition device 2 outputs the input person information and ability information to the control device 3. As a result, the acquisition device 2 can accept a modification of the ability information or a registration of new ability information by the user.

Further, the acquisition device 2 may acquire position information indicating the position of the acquisition device 2. For example, the acquisition device 2 acquires position information using a global positioning system (GPS). The acquisition device 2 acquires the position information when the person information is acquired or when the control device 3 requests the acquisition of the position information. Further, the acquisition device 2 outputs the acquired position information to the control device 3. The case where the acquisition device 2 acquires the position information will be described in a third example embodiment.

The control device 3 acquires the person information by receiving the person information from the acquisition device 2. The control device 3 specifies the ability information of the person indicated by the acquired person information, and outputs the specified ability information to the output device 4. Specifically, the control device 3 outputs the control information instructing the output of the ability information to the output device 4. Further, when the ability information cannot be specified based on the person information received from the acquisition device 2, the control device 3 outputs the control information instructing the output of the information requesting the input of the ability information and the person information for which the ability information cannot be specified to the output device 4. The control device 3 receives the ability information and the person information from the output device 4. When the received person information is the person information for which the ability information cannot be specified, the control device 3 outputs the control information instructing the output of the received ability information to the output device 4. As a result, the control unit 33 outputs the ability information to the output device 4.

The output device 4 receives the control information instructing the output of the ability information from the control device 3. The output device 4 outputs the ability information as an image or voice based on the control information instructing the output of the ability information. The output device 4 includes at least one of a display and a speaker. For example, the output device 4 includes a display that is installed in a command center for giving instructions to ambulance crews or a hospital of a transport destination, and outputs the ability information to the display. Further, the acquisition device 2 including at least one of the display and the speaker may have the function of the output device 4. The output device 4 may be connected to a terminal device including a mobile terminal and output ability information to the display and speaker of the terminal device. For example, the control device 3 displays an image indicating the ability information or the information requesting the input of the ability information on the display installed in the command center and the display unit (not illustrated) of the acquisition device 2 having the function of the output device 4.

Further, in the present example embodiment, the user can modify the ability information and register the ability information by using the output device 4. The output device 4 includes an input/output interface (not illustrated) that accepts input by the user. For example, the person information and ability information of the user are input to the output device 4 according to the operation of the user who operates the input/output interface of the output device 4. When the biometric information is used as person information, the output device 4 may have a function of acquiring predetermined biometric information. The output device 4 outputs the input ability information and the person information and to the control device 3 in association with each other. The input/output interface is, for example, a keyboard.

Further, the output device 4 may input the person information of the user or a request for displaying the ability information according to the operation of the user of the control device 3. When the output device 4 is requested to display the ability information, the output device 4 outputs a notification requesting the display of the ability information to the control device 3. When the notification requesting the display of the ability information is received, the input/ output unit 34 of the control device 3 reads out the ability information stored in the ability information storage unit 35 in association with the received person information. Further, the input/output unit 34 outputs the control information instructing the display of the read ability information to the output device 4. As a result, the user can confirm the ability information stored in the ability information storage unit 35 and correct the ability information stored in the ability information storage unit 35.

Further, when the ability information cannot be specified by the control device 3, the output device 4 receives the control information instructing the output of the information requesting the input of the ability information and the person information. When the control information instructing the output of the information requesting the input of the ability information and the person information are received, the output device 4 outputs a message requesting the input of the ability information. Further, the ability information is input to the output device 4 according to the operation of the input/output interface of the output device 4 by the user. Further, the output device 4 outputs the received person information and the input ability information to the control device 3 in association with each other.

Next, the configuration of the acquisition device 2 of the present example embodiment will be described in detail with reference to FIG. 3. The acquisition device 2 includes an input/output unit 21 and an acquisition unit 22.

The input/output unit 21 is instructed to acquire person information according to the operation of the user. When the input/output unit 21 is instructed to acquire the person information, the input/output unit 21 requests the acquisition unit 22 to acquire the person information. The acquired person information is input to the input/output unit 21 from the acquisition unit 22. The input/output unit 21 outputs the input person information to the control device 3.

The acquisition unit 22 acquires the person information when the input/output unit 21 requests the acquisition of the person information. For example, when the acquisition device 2 is a card reader, the acquisition unit 22 acquires the person information from the IC card in which the person information is stored in advance. Further, for example, when the acquisition device 2 includes an imaging device, the acquisition unit 22 acquires image information indicating an image. Further, for example, when the acquisition device 2 includes an input device that accepts voice input, the acquisition unit 22 acquires voice information that is voice information.

When the acquired image information and voice information include pieces of biometric information of a plurality of persons, the acquisition unit 22 extracts the pieces of biometric information of each person from the image information and voice information based on a preset rule. The acquisition unit 22 outputs the extracted biometric information to the input/output unit 21 as person information.

When the control device 3 specifies the ability information using other biometric information other than the image information and the voice information, the acquisition device 2 acquires arbitrary biometric information that the control device 3 uses to specify the ability information.

Next, the configuration of the control device 3 of the present example embodiment will be described in detail with reference to FIG. 3. The control device 3 includes an acquisition unit 31, a specification unit 32, and a control unit 33. Further, the ability information storage unit 35 is connected to the specification unit 32 and the input/output unit 34. Further, the input/output unit 34 is connected to the acquisition unit 31, the control unit 33, and the ability information storage unit 35.

The input/output unit 34 receives, from the acquisition device 2, the person information that is the information unique to the person. The input/output unit 34 outputs the received person information to the acquisition unit 31. Further, the input/output unit 34 receives the ability information and the person information from the output device 4. When the ability information and the person information are received from the output device 4, the input/output unit 34 associates the received person information with the received ability information and stores the received ability information in the ability information storage unit 35. Further, the input/output unit 34 outputs the received person information and the ability information to the control unit 33 in association with each other.

The person information is input to the acquisition unit 31 from the input/output unit 34. The acquisition unit 31 acquires the person information by inputting the person information from the input/output unit 34. The acquisition unit 31 outputs the acquired person information to the specification unit 32. For example, the person information is person identification information or biometric information. When the acquisition unit 31 acquires the image information, the person information is the image information indicating a face image. Further, for example, when the acquisition unit 31 acquires voice information, the person information is voice information.

The person information is input to the specification unit 32 from the acquisition unit 31. The specification unit 32 specifies the ability information that is information indicating the ability of the person indicated by the person information acquired by the acquisition unit 31. The specification unit 32 outputs the specified ability information to the control unit 33. The ability information includes at least one or more of information indicating a person's class, information indicating a person's condition, information indicating a person's qualifications, and information indicating a person's features. In addition, the information indicating a qualification includes information indicating an expiration date of a driver's license and information on a type of car that can be driven by possessing the driver's license. The feature information includes, for example, information indicating susceptibility to mistakes. For example, as information indicating the susceptibility of an ambulance crew to make a mistake, information indicating the number of times the transport destination was mistaken is included.

Next, a method in which the specification unit 32 specifies the ability information by using the person identification information that is the person information will be described. In addition, a method in which the specification unit 32 specifies the ability information by using the feature information extracted from the biometric information that is the person information will be described.

First, a method in which the specification unit 32 specifies the ability information by using the person identification information that is the person information will be described.

The person identification information of the person whose ability information is specified is input from the acquisition unit 31 to the specification unit 32 as the person information. The specification unit 32 collates whether the person identification information that matches the input person identification information is stored in the ability information storage unit 35. When the person identification information is used as the person information, the ability information storage unit 35 stores the person identification information of the person who is the specification target of the ability information and the ability information of the person in advance in association with each other. Further, one or two or more arbitrary ability information is stored in the ability information storage unit 35 in association with predetermined person information.

The specification unit 32 specifies the ability information stored in the ability information storage unit 35 in association with the person identification information that matches the input person identification information. The specification unit 32 outputs the specified ability information to the control unit 33. In addition, when the person identification information that matches the input person identification information is not stored in the ability information storage unit 35, the specification unit 32 notifies the control unit 33 of the person information for which the ability information cannot be specified and the notification indicating that the ability information cannot be specified.

Next, a method in which the specification unit 32 specifies the ability information by using the feature information extracted from the biometric information that is the person information will be described.

The specification unit 32 extracts feature information indicating features of the biometric information from the biometric information according to the preset rule for extracting the feature information from the biometric information. The specification unit 32 may extract the feature information from the biometric information by using machine learning. The feature information is, for example, information illustrating facial features of each person extracted from the image information illustrating the face image. Further, for example, the feature information is information that shows features of voiceprints of each person extracted from the voice information.

When the machine learning is used for extracting the feature information, the specification unit 32 has a model generation function. Learning data includes, for example, pieces of biometric information obtained from various persons. In addition, the learning data includes information indicating from which person the biometric information is obtained from each of the pieces of biometric information. Based on the learning data, the specification unit 32 generates an extraction model that extracts feature information that makes it possible to distinguish individual persons from biometric information. The specification unit 32 performs new machine learning each time new learning data is input, and generates a new extraction model. Further, the specification unit 32 may perform the machine learning at a predetermined timing to generate a new extraction model. The specification unit 32 extracts the feature information from the biometric information by using the generated extraction model. The input to the extraction model is the biometric information input from the acquisition unit 31. Further, the output from the extraction model is the feature information extracted from the biometric information.

The specification unit 32 collates whether the target feature information whose degree of similarity to the extracted feature information is equal to or greater than a predetermined value is stored in the ability information storage unit 35. When the specification unit 32 specifies the ability information using the feature information, the ability information storage unit 35 stores the following information. Target feature information that is feature information of biometric information of a person who is a specification target of ability information, person identification information of a person who is a specification target of ability information, and ability information of a person who is a specification target of ability information is stored in the ability information storage unit 35 in advance in association with each other. The specification unit 32 specifies the ability information stored in the ability information storage unit 35 and associated with the target feature information whose degree of similarity to the extracted feature information is equal to or greater than a predetermined value. The specification unit 32 outputs the specified ability information to the control unit 33. Further, when the target feature information whose degree of similarity to the extracted feature information is equal to or greater than a predetermined value is not stored in the ability information storage unit 35, the specification unit 32 outputs the person information for which the ability information cannot be specified and the notification indicating that the ability information cannot be specified to the control unit 33.

In addition, the specification unit 32 may specify the ability information by using the biometric information instead of the feature information extracted from the biometric information. When the specification unit 32 specifies the ability information using the biometric information, the specification unit 32 collates whether the biometric information whose degree of similarity to the input biometric information is equal to or greater than a predetermined value is stored in the ability information storage unit 35. When the specification unit 32 specifies the ability information using the biometric information, the ability information storage unit 35 stores the following information. Biometric information of a person who is a specification target of ability information, person identification information of a person who is a specification target of ability information, and ability information of a person who is a specification target of ability information are stored in the ability information storage unit 35 in advance in association with each other. The specification unit 32 specifies the ability information stored in the ability information storage unit 35 that is associated with the biometric information whose degree of similarity to the input biometric information is equal to or greater than a predetermined value.

The ability information storage unit 35 is connected to the input/output unit 34 and the specification unit 32. When the person identification information is used as the person information, the ability information storage unit 35 stores the person identification information of the person who is the specification target of the ability information and the ability information of the person in advance in association with each other. Further, when the specification unit 32 specifies the ability information using the feature information, the ability information storage unit 35 stores the following information. Target feature information that is feature information of biometric information of a person who is a specification target of ability information, person identification information of a person who is a specification target of ability information, and ability information of a person who is a specification target of ability information is stored in the ability information storage unit 35 in advance in association with each other. Further, biometric information of a person who is a specification target of ability information, target feature information, and person identification information may be stored in the ability information storage unit 35 in advance in association with the ability information of the person.

The specified ability information is input to the control unit 33 from the specification unit 32. When the ability information is input, the control unit 33 outputs the control information instructing the output of the ability information to the output device 4. The control information instructing the output of the ability information includes information for outputting the ability information as an image to the output device 4. Further, the control information instructing the output of the ability information may include information for outputting the ability information as voice to the output device 4. Further, the control unit 33 may output a plurality of pieces of ability information specified during the predetermined period to the output device 4 as a list.

The person information for which the ability information cannot be specified and the notification indicating that the ability information cannot be specified are input from the specification unit 32 to the control unit 33. When the notification indicating that the ability information cannot be specified is input from the specification unit 32, the control unit 33 outputs the control information instructing the output of the information requesting the input of the ability information to the output device 4 in association with the person information for which the ability information cannot be specified. The output device 4 that has received the control information instructing the output of the information requesting the input of the ability information and the person information to display an image illustrating the information requesting the input of the ability information on the display unit 42. Specifically, the control unit 33 outputs a message requesting the input of the ability information to the output device 4. Further, for example, the control unit 33 may output the information requesting the input of the ability information to the acquisition device 2 having the function of the output device 4 that is an output source of the person information whose ability information cannot be specified.

Further, the control unit 33 may output a message requesting the input of the person identification information that is the person information to the output device 4. In addition, the specification unit 32 specifies the ability information based on the input person identification information. A case where the output device 4 outputs the message requesting the input of the person identification information that is the person information will be described with reference to a modification of the second example embodiment.

Further, when the information requesting the input of the ability information is output to the output device 4, the ability information input according to a user's operation may not be detailed information. For example, suppose that the user is a person who assigns an instruction to an ambulance crew at a command center and an ambulance crew who responds to an emergency call. When a person who assigns instructions to the ambulance crew at the command center grasps whether the ambulance crew who responds to the emergency call is a veteran, the control device 3 outputs, to the output device 4, a message requesting input of information indicating whether the user is a veteran or a newcomer as ability information. As described in the third example embodiment, when specifying ability information of a person included in a predetermined team, the control device 3 may display the number of veteran ambulance crews and the number of new ambulance crews to the output device 4. Further, when the ability information includes information indicating the number of years of service, the control device 3 determines whether the person whose ability information is specified is a newcomer or a veteran based on whether the number of years of service indicated in the information indicating the number of years of service is equal to or greater than a predetermined number of years of service. The ability information to be input may be self-evaluation information Further, the ability information and the person information are input to the control unit 33 from the input/output unit 34. When the input person information is the person information for which the ability information cannot be specified, the control unit 33 outputs the control information instructing the output of the input ability information to the output device 4.

Next, the configuration of the output device 4 of the present example embodiment will be described in detail with reference to FIG. 3. The output device 4 includes an input/output unit 41 and a display unit 42.

The input/output unit 41 receives the control information instructing the output of the ability information from the control device 3. When the input/output unit 41 receives the control information instructing the output of the ability information, the input/output unit 41 displays an image indicating the ability information on the display unit 42 based on the control information instructing the output of the ability information. For example, the image indicating the ability information is an image of a list of ability information. Further, the input/output unit 41 receives, from the control device 3, the control information instructing the output of the information requesting the input of the ability information and the person information. When the control information instructing the output of the information requesting the input of the ability information and the person information are received, the input/output unit 41 displays an image indicating the information requesting the input of the ability information on the display unit 42. Further, when the received person information is image information, the input/output unit 41 may display the received image information on the display unit 42.

Further, when the output device 4 receives the control information instructing the output of the information requesting the input of the ability information, the output device 4 outputs the message requesting the input of the ability information. Further, the ability information is input to the output device 4 according to the operation of the input/output interface of the output device 4 by the user. The output device 4 outputs the received person information and the input ability information to the control device 3 in association with each other.

When the user modifies the ability information and newly registers the ability information, the person information and the ability information are input to the output device 4 according to the user's operation using the input/output interface of the output device 4. Further, the input/output unit 41 outputs the person information input by the user's operation and the ability information to the control device 3 in association with each other.

The display unit 42 is controlled by the input/output unit 41. The display unit 42 displays an image indicating the ability information or an image indicating that the input of the ability information is requested. The display unit 42 is, for example, a display installed in the command center.

In this way, the control device 3 acquires the person information that is the information unique to the person. Further, the control device 3 specifies the ability information of the person indicated by the acquired person information, and outputs the specified ability information to the predetermined output device 4. As a result, it is possible for the user of the control device 3 to confirm the ability information output to the output device 4. In this way, it becomes possible for the user of the control device 3 to easily grasp the ability of a predetermined person.

Figure 4:
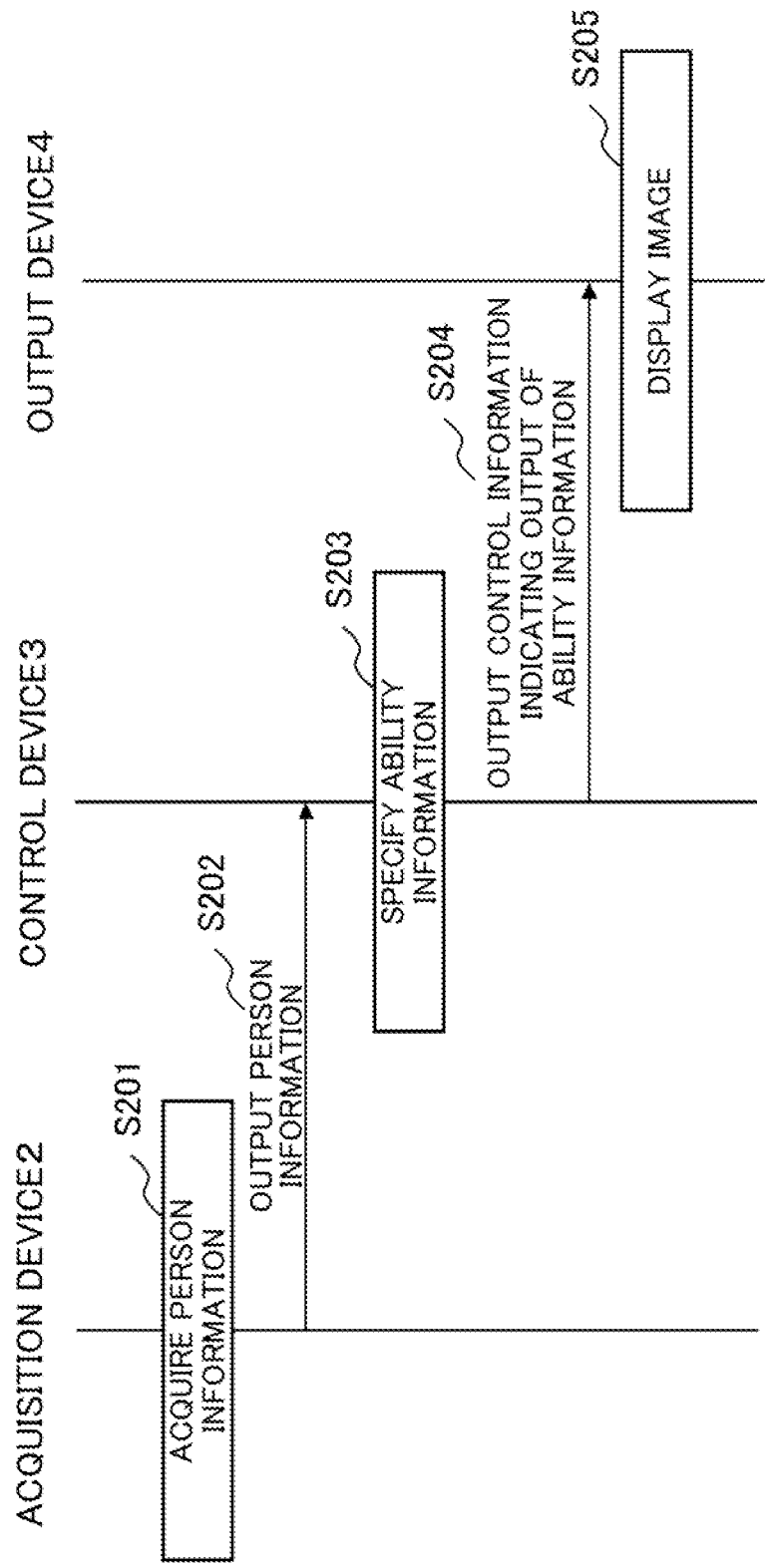
FIG. 4 is a sequence diagram illustrating an operation example of the control system according to the second example embodiment of the present invention.
Figure 5:
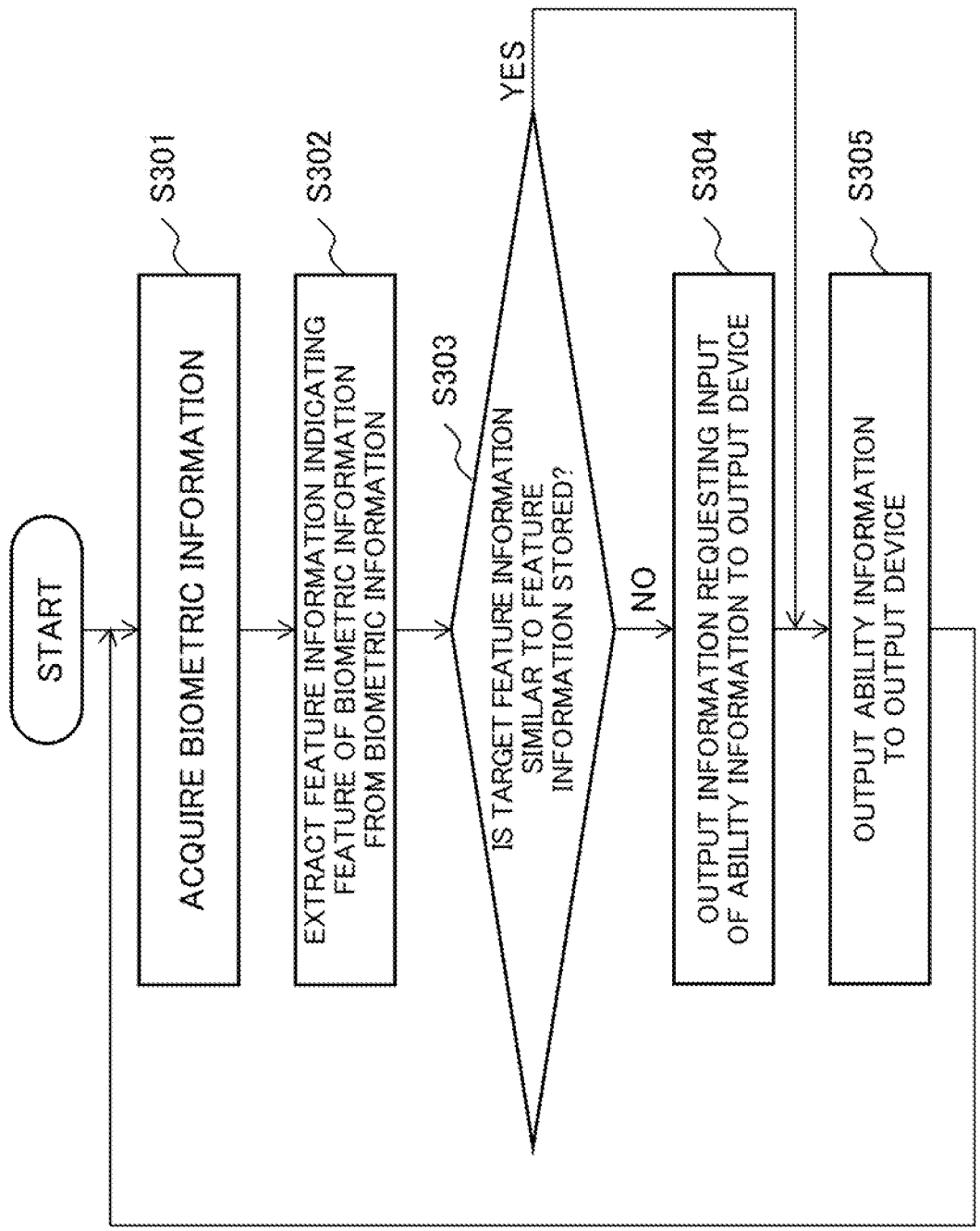
FIG. 5 is a flowchart illustrating the operation example of the control device according to the second example embodiment of the present invention.

Next, an operation example of the control system of the present example embodiment will be described with reference to FIGS. 4 and 5. FIG. 4 is a sequence diagram illustrating an operation example of the control system. FIG. 5 is a flowchart illustrating the operation example of the control device 3.

First, with reference to FIG. 4, the operation in which the acquisition device 2 acquires the person information and the control device 3 outputs the ability information to the output device 4 will be described.

The acquisition device 2 acquires the person information that is information unique to a person (step S201). The acquisition device 2 outputs the acquired person information to the control device 3 (step S202).

The control device 3 acquires the person information by receiving the person information from the acquisition device 2. The control device 3 specifies the ability information of the person indicated by the acquired person information (step S203). The control device 3 outputs the control information instructing the output of the ability information to the output device 4 (step S204). When the ability information cannot be specified in step S203, the control device 3 outputs the information requesting the input of the ability information to the output device 4. Further, the control device 3 receives the ability information and the person information from the output device 4. When the ability information cannot be specified, the control device 3 outputs the control information instructing the output of the received ability information to the output device 4.

The output device 4 receives the control information instructing the output of the ability information from the control device 3. The output device 4 displays an image indicating the ability information based on the control information instructing the output of the ability information (step S205). For example, the image indicating the ability information is an image of a list of ability information.

Next, an operation example of the control device 3 will be described with reference to FIG. 5. In the following description, a case where the specification unit 32 specifies the ability information by using the feature information extracted from the biometric information that is the person information will be described as an example. Further, the operation of FIG. 5 is to describe in detail the operation of step S203 and step S204 of FIG. 4.

The input/output unit 34 receives the biometric information from the acquisition device 2 as the person information that is information unique to a person. The input/output unit 34 outputs the received biometric information to the acquisition unit 31.

The biometric information is input to the acquisition unit 31 from the input/output unit 34. The acquisition unit 31 acquires the biometric information by inputting the biometric information from the input/output unit 34 (step S301). The acquisition unit 31 outputs the acquired biometric information to the specification unit 32.

The biometric information is input from the acquisition unit 31 to the specification unit 32. The specification unit 32 extracts the feature information indicating the features of the biometric information from the biometric information (step S302). The specification unit 32 collates whether the target feature information whose degree of similarity to the extracted feature information is equal to or greater than a predetermined value is stored in the ability information storage unit 35. When the target feature information whose degree of similarity to the extracted feature information is equal to or greater than a predetermined value is stored in the ability information storage unit 35 (step S303, YES), the specification unit 32 performs the following operation. The specification unit 32 specifies the ability information stored in the ability information storage unit 35 and associated with the target feature information whose degree of similarity to the extracted feature information is equal to or greater than a predetermined value. The specification unit 32 outputs the specified ability information to the control unit 33.

When the target feature information whose degree of similarity to the extracted feature information is equal to or greater than a predetermined value is not stored in the ability information storage unit 35 (step S303, NO), the specification unit 32 performs the following operation. The specification unit 32 outputs, to the control unit 33, the person information for which the ability information cannot be specified and the notification indicating that the ability information cannot be specified.

When the person information for which the ability information cannot be specified and the notification indicating that the ability information cannot be specified are input from the specification unit 32, the control unit 33 performs the following operation. The control unit 33 outputs the control information for instructing the output of the information requesting the input of the ability information to the output device 4 in association with the person information for which the ability information cannot be specified. As a result, the control unit 33 outputs the information requesting the input of the ability information to the output device 4 (step S304). The output device 4 may output information indicating that the ability information cannot be specified, instead of the information requesting the input of the ability information. In that case, the control unit 33 does not perform the operation of step S305 for the person information for which the ability information cannot be specified, and ends the process of specifying the ability information.

Specifically, the output device 4 outputs the message requesting the input of the ability information as the information requesting the input of the ability information. Further, the ability information is input to the output device 4 according to the operation of the input/output interface of the output device 4 by the user. The output device 4 outputs the received person information and the input ability information to the control device 3 in association with each other.

Figure 6:
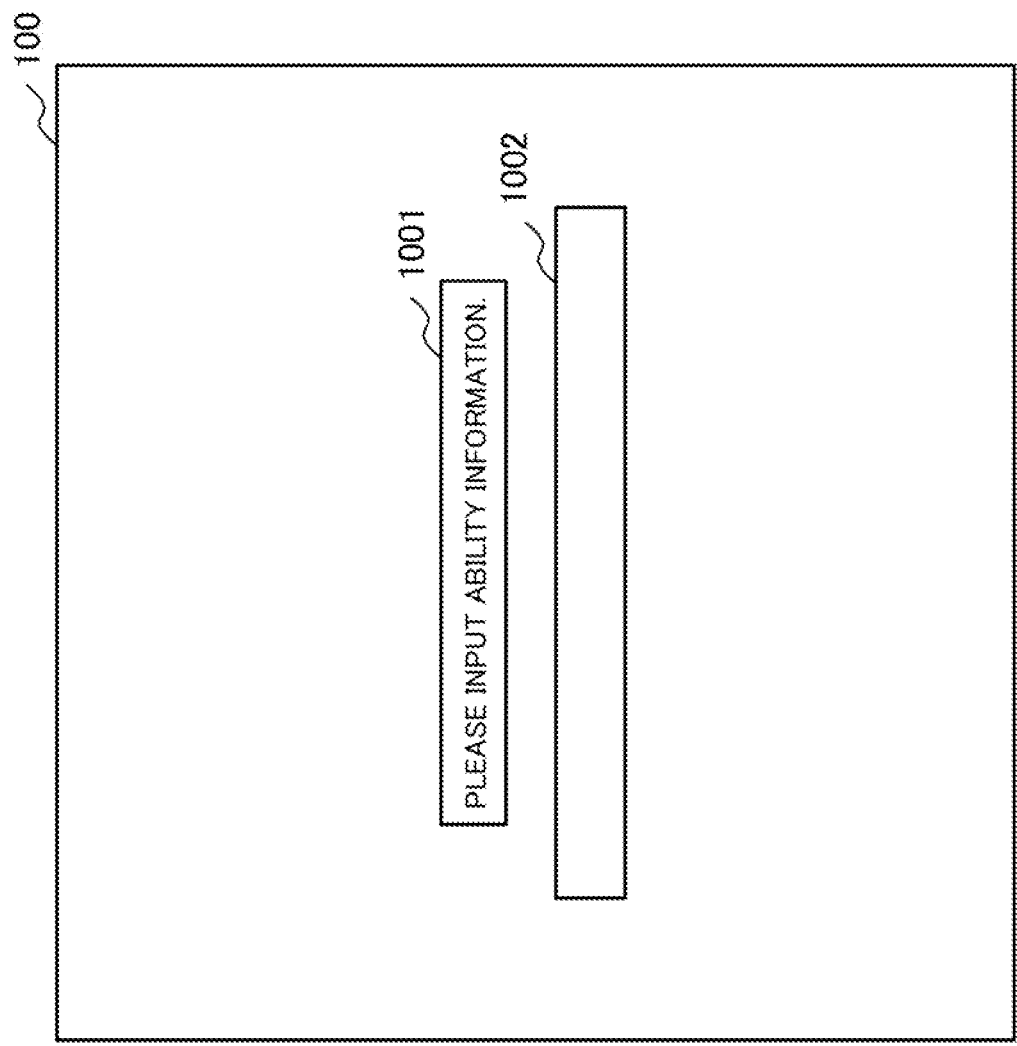
FIG. 6 is a diagram illustrating an example of a screen displayed on an output device according to the second example embodiment of the present invention.

FIG. 6 illustrates an example of a screen displayed on the display unit 42 of the output device 4 when outputting the message requesting the input of the ability information. In the example of FIG. 6, a message 1001 requesting the input of the ability information, "Please input the ability information" and a part 1002 where the input ability information is displayed according to a user's operation of the input/output interface of the output device 4 are displayed on a screen 100.

The input/output unit 34 receives the ability information and the person information input by the user from the output device 4. The input/output unit 34 stores the received ability information in the ability information storage unit 35 in association with the received person information. Further, the input/output unit 34 outputs the received person information and the ability information to the control unit 33 in association with each other.

Further, the ability information and the person information are input to the control unit 33 from the input/output unit 34. The control unit 33 outputs the control information instructing the output of the input ability information to the output device 4 when the input person information is the person information whose ability information cannot be specified by the specification unit 32. Further, when the ability information is specified by the specification unit 32, the specified ability information is input from the specification unit 32 to the control unit 33. When the ability information is input, the control unit 33 outputs the control information instructing the output of the ability information to the output device 4. In this way, the control unit 33 outputs the ability information to the output device 4 (step S305).

Figure 7:
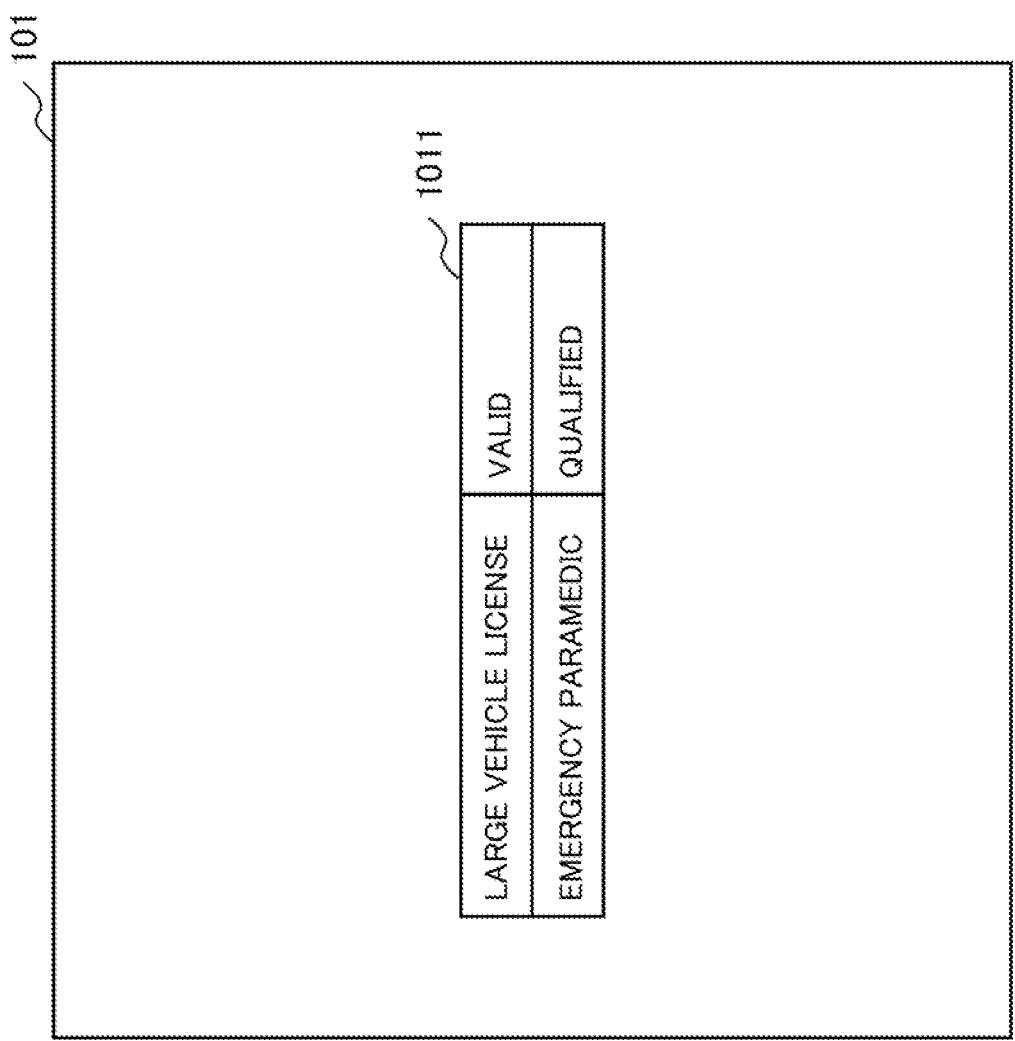
FIG. 7 is a diagram illustrating an example of the screen displayed on the output device according to the second example embodiment of the present invention.

FIG. 7 illustrates an example of a screen displayed on the display unit 42 of the output device 4 when outputting the ability information. In an example of FIG. 7, a table 1011 in which "valid" indicating that the "large vehicle license" is "valid" and "qualified" indicating that the user has the qualification of "emergency paramedic" are displayed on a screen 101 as the specified ability information is shown.

In this way, the control device 3 acquires the person information that is the information unique to the person. Further, the control device 3 specifies the ability information of the person indicated by the acquired person information, and outputs the specified ability information to the predetermined output device 4. As a result, it is possible for the user of the control device 3 to confirm the ability information output to the output device 4. In this way, it becomes possible for the user of the control device 3 to easily grasp the ability of a predetermined person.

Further, the control device 3 of the present example embodiment displays an image indicating the ability information to the output device 4. As a result, when the ability information of the ambulance crew is specified, the control device 3 displays the ability information as an image on the display installed in the command center. As a result, the user of the control device 3 can check the ability information displayed on the display installed in the command center and grasp the ability of the ambulance crew whose ability information is specified.

Further, the control device 3 of the present example embodiment causes the acquisition device 2 having the function of the output device 4 that is an output source of the person information to output the information requesting the input of the ability information of the person information for which the ability information cannot be specified. As a result, it becomes possible to easily input the ability information to the person indicated by the person information whose ability information cannot be specified by using the input/output interface of the acquisition device 2 having the function of the output device 4.

[Modification]

A modification of the second example embodiment described above will be described. The present invention can be implemented in a form different from the above-described example embodiment. For example, the following modifications can be applied to the present invention.

In the second example embodiment, when the ability information cannot be specified by the specification unit 32, the control unit 33 outputs the information requesting the input of the ability information to the output device 4. In the present modification according to the second example embodiment, when the ability information cannot be specified by the specification unit 32, the acquisition unit 31 acquires the person information of the person whose ability information cannot be specified again, and the specification unit 32 identifies the ability information based on the person information acquired again.

The person information to be acquired again may be the person information whose ability information cannot be specified by the specification unit 32, or the person information different from the person information whose ability information cannot be specified by the specification unit 32. For example, when the ability information cannot be specified using the feature information extracted from the biometric information, the control device 3 outputs, to the output device 4, a message requesting the input of the person identification information of the person whose ability information cannot be specified.

When the ability information cannot be identified, the operation of the control device 3 of this modification after step S203 illustrated in FIG. 4 will be described by taking as an example the operation of the control device 3 that outputs the message requesting the input of the person identification information as the person information to the output device 4.

Since the operation of the acquisition unit 31 is the same as the operation in the second example embodiment, the description thereof will be omitted.

The person information for which the ability information cannot be specified and the notification indicating that the ability information cannot be specified are input from the specification unit 32 to the control unit 33. When the notification indicating that the ability information cannot be specified is input from the specification unit 32, the control unit 33 outputs, to the output device 4, the control information instructing the output of the information requesting the input of the person identification information as the person information and the person information whose ability information could not be specified in association with each other.

As the person information, the output device 4 that has received the control information instructing the output of the information requesting the input of the person identification information and the person information displays an image indicating the information requesting the input of the person identification information on the display unit 42. Specifically, the output device 4 displays the message requesting the input of the person identification information on the display unit 42. Further, the person identification information is input to the output device 4 according to the user's operation of the input/output interface of the output device 4. The output device 4 outputs the input person identification information and the person information for which the ability information cannot be specified to the control device 3.

Figure 8:
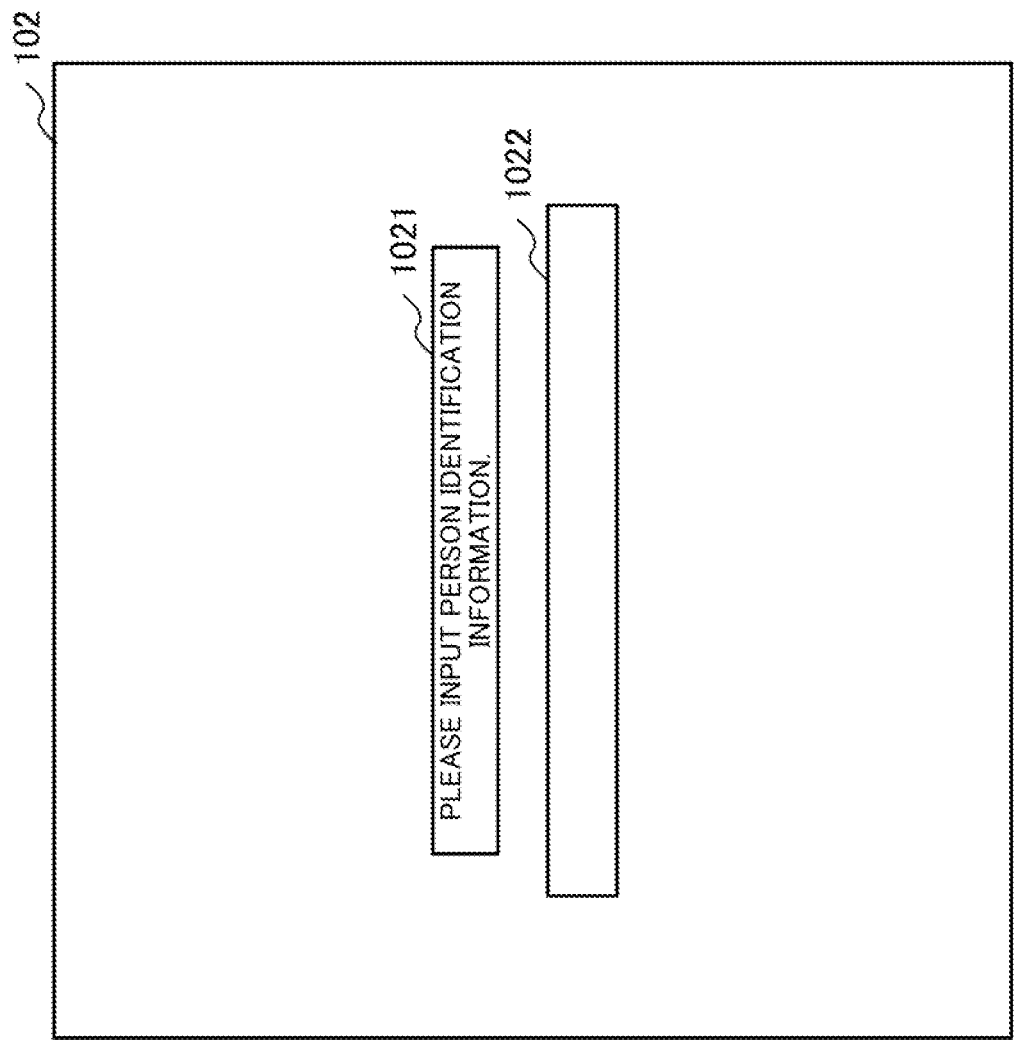
FIG. 8 is a diagram illustrating an example of a screen displayed on an output device of a modification of the second example embodiment of the present invention.

FIG. 8 illustrates an example of a screen displayed on the display unit 42 of the output device 4 when outputting a message requesting input of person identification information. In the example of FIG. 8, a message 1021 requesting the input of the person identification information, "Please input person identification information" and a part 1022 where the input person identification information is displayed according to the user's operation of the input/output interface of the output device 4 are displayed on a screen 102.

Here, the operation of the input/output unit 34 of the control device 3 will be described. The input/output unit 34 receives the input person identification information and the person information for which the ability information cannot be specified from the output device 4. The input/output unit 34 outputs the person identification information input by the user and the person information for which the ability information cannot be specified to the specification unit 32 in association with each other.

The person information for which the ability information cannot be specified and the person identification information input according to the user's operation are input to the specification unit 32. In addition, the specification unit 32 specifies the ability information based on the person identification information input according to the user's operation. The specification unit 32 outputs, to the acquisition unit 31, the person identification information input according to the user's operation, the ability information specified based on the person identification information input according to the user's operation, and the person information for which the ability information cannot be identified in association with each other.

The person identification information input according to the user's operation, the ability information specified based on the person identification information input according to the user's operation, and the person information for which the ability information cannot be specified are input from the specification unit 32 to the control unit 33. The control unit 33 outputs the ability information to the output device 4 specified based on the person identification information input according to the user's operation as the ability information of the person indicated by the person information for which the ability information cannot be specified.

In this way, the control device 3 of the present modification acquires the person information again for the person information for which the ability information cannot be specified, and specifies the ability information. As a result, when the ability information cannot be specified based on the person information, without inputting the ability information already stored in the ability information storage unit 35 of the control device 3 to the user of the control device 3 again, the control device 3 can specify the ability information.

Third Example Embodiment

Next, a control device 5 according to a third example embodiment of the present invention will be specifically described. The control device 5 according to the third example embodiment differs from the control device 3 according to the second example embodiment in the following points. When an attention condition that is set for a role assigned to a person and generates attention information that calls attention is satisfied by ability indicated by specified ability information indicating ability of a person, a control device 5 of the third example embodiment further outputs the attention information to an output device 4.

Figure 9:
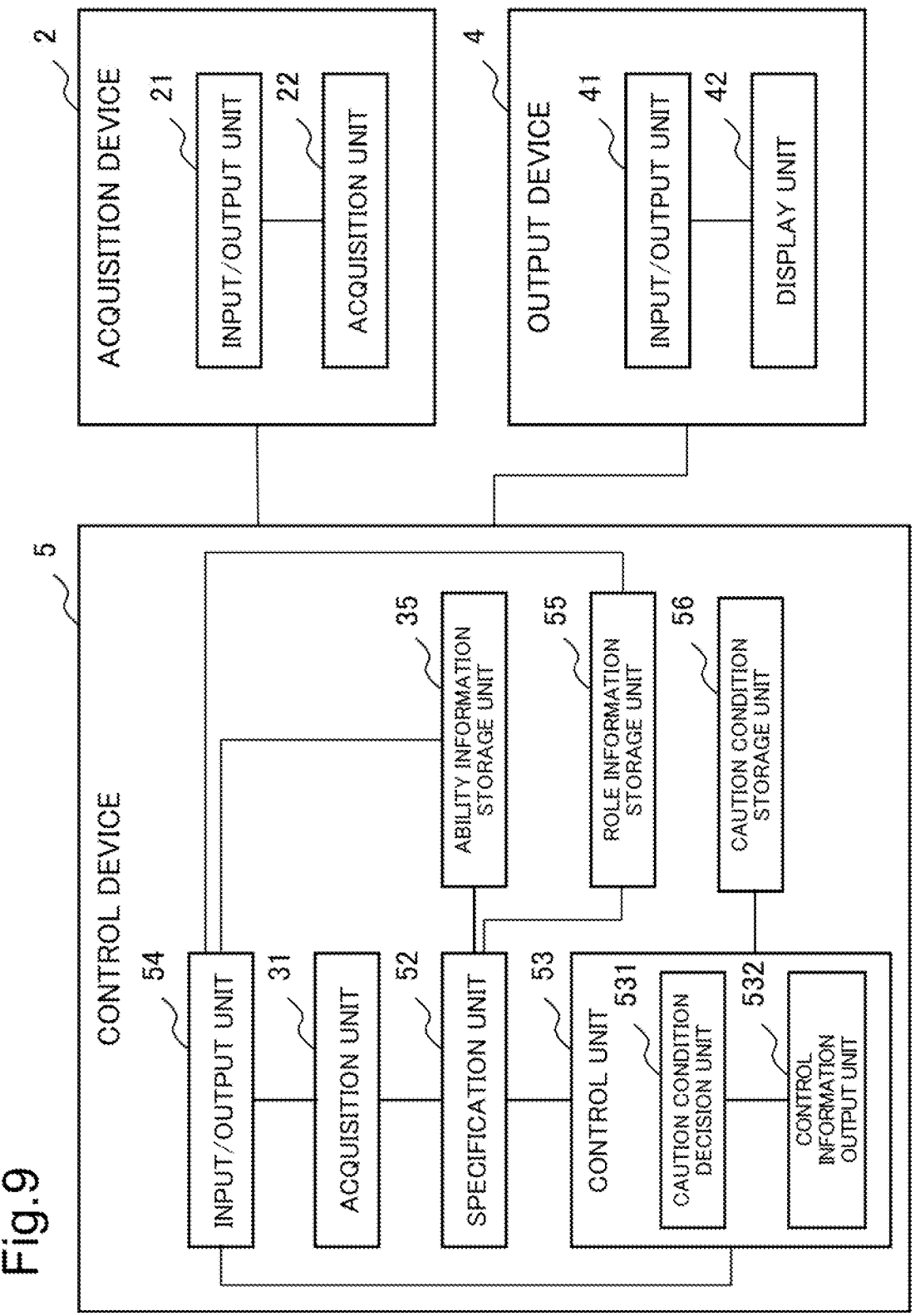
FIG. 9 is a block diagram illustrating a configuration example of a control system according to a third example embodiment of the present invention.

A configuration example of a control system of the present example embodiment will be described with reference to FIG. 9. FIG. 9 is a block diagram illustrating a configuration example of a control system according to the present example embodiment. As illustrated in FIG. 9, the control system of the present example embodiment includes an acquisition device 2, a control device 5, and an output device 4.

Since a configuration of the acquisition device 2 in the present example embodiment is the same as the configuration of the acquisition device 2 in the second example embodiment illustrated in FIG. 3, the corresponding elements are designated by the same reference numerals as those in FIG. 3 and the description thereof will be omitted.

Further, since the configuration of the output device 4 in the present example embodiment is the same as the configuration of the output device 4 in the second example embodiment illustrated in FIG. 3 except for the following points, the corresponding elements are designated by the same reference numerals as in FIG. 3, and the description thereof will be omitted. When the output device 4 in the present example embodiment receives attention information and control information instructing an output of ability information from the control device 3, the input/output unit 41 displays the ability information and caution information on the display unit 42.

The control device 5 acquires person information by receiving the person information that is information unique to a person from the acquisition device 2. The control device 5 specifies the ability information that is information indicating ability of a person indicated by the acquired person information. Further, the control device 5 specifies role information indicating a role assigned to the person indicated by the person information. When the attention condition associated with the role information is satisfied by the ability indicated by the specified ability information, the control device 5 outputs the ability information and the control information instructing the output of the attention information to the output device 4. In this way, the control device 5 outputs the specified ability information and the caution information for calling attention to the output device 4. Further, the control device 5 outputs the control information instructing the output of the ability information to the output device 4 when the ability indicated by the specified ability information does not satisfy the caution condition associated with the role information. In this way, the control device 5 outputs the ability information to the output device 4. The caution condition is a condition for notifying the user of the caution information. In addition, the caution conditions are preset for each role indicated by the role information. Further, each caution condition is associated with the caution information notified in advance when the caution condition is satisfied.

Further, the control device 5 of the present example embodiment may generate additional information indicating information to be notified to the user regarding the ability information of a person included in the team, in addition to the ability information and caution information. Further, the control device 5 may output control information instructing an output of the additional information, the ability information, and the caution information to the output device 4.

As the additional information output by the control device 5 to the output device 4, for example, the following examples (1) to (6) can be considered.

(1) The control device 5 outputs, to the output device 4, additional information indicating that there is no person with predetermined ability in the team.

(2) The control device 5 outputs, to the output device 4, information indicating a total value of evaluation values of the abilities indicated by the ability information as the additional information.

(3) The control device 5 outputs, to the output device 4, person identification information indicating a person who meets a predetermined condition for moving from another team to a team whose total value of evaluation values of abilities indicated by the ability information is lower than a predetermined threshold value, or name information indicating a name of a person as additional information.

(4) By specifying a team whose total value of the evaluation values of the abilities indicated by the ability information is greater than the predetermined threshold value, the output device 4 outputs, as additional information, information indicating the team selected by the control device 5 as the team to be dispatched to respond to the emergency call.

(5) The control device 5 outputs, as the additional information, a message indicating that the evaluation value of the ability indicated by the specified ability information is equal to or lower than a predetermined threshold value for each person information associated with the team information to the output device 4.

(6) The control device 5 outputs, to the output device 4, information indicating a person to be increased to a team related to a site where the number of personnel needs to be increased as the additional information.

Here, the operations of the acquisition device 2 and the control device 5 common to (1) to (6) will be described, and then the operations unique to each case will be described.

The acquisition device 2 outputs pieces of person information of each person included in the team to the control device 5 in association with the team information indicating that the persons indicated by each person information are a team. When face images of a plurality of persons are included in an image shown in image information and the face images of the persons included in the images are extracted from the images, the acquisition device 2 may associate team information indicating that the team is the same with the extracted face images of each person.

The control device 5 specifies pieces of ability information of each person information with which the team information is associated. The control device 5 generates additional information about the ability information specified for the pieces of person information of each person included in the team. The control device 5 may generate additional information of the pieces of ability information specified for each person information when the additional information generation condition that is a condition for generating additional information is satisfied. Further, the control device 5 specifies role information indicating a role assigned to the person indicated by the person information. When the attention condition associated with the role information is satisfied by the ability indicated by the specified ability information, and when additional information is generated, the control device 5 outputs control information instructing an output of additional information, ability information, and caution information to the output device 4. Further, when the attention condition associated with the role information is not satisfied by the ability indicated by the specified ability information, and when the additional information is generated, the control device 5 outputs the control information instructing the output of the additional information and the ability information to the output device 4. The control device 5 outputs, to the output device 4, the pieces of ability information specified for each person information with which the team information is associated.

Next, an operation unique to the case of (1) where the control device 5 outputs, to the output device 4, additional information indicating that a person with predetermined ability is not in the team will be described.

In the case of (1), the additional information generation condition does not include information indicating that the pieces of ability information specified for each person information with which the team information is associated has a predetermined ability or a predetermined qualification. For example, a given qualification is a large vehicle license. Further, for example, the predetermined qualification is the qualification of an emergency paramedic.

For example, when the ability information specified by the control device 5 does not include information indicating that it has a valid driver's license, the control device 5 outputs additional information indicating that no person with a valid driver's license is on the team to the output device 4. It is possible for a user who confirms a display with additional information indicating that no person with a valid driver's license is on the team to grasp that there is a need to assign a person with a valid driver's license to the team.

Next, an operation unique to the case of (2) where the control device 5 outputs the information indicating a total value of the evaluation values of the abilities indicated by the ability information to the output device 4 as additional information will be described.

When the control device 5 specifies the ability information of a plurality of teams, the control device 5 displays, to the output device 4, information indicating the total value of the evaluation values of the abilities indicated by the ability information of each team as additional information. When the information indicating the evaluation value is displayed on the output device 4, the information indicating the evaluation value is stored in the ability information storage unit 35 in association with the ability information and the person information. As a result, the user can grasp responsiveness of each team based on the information indicating the total value of the evaluation values of the abilities indicated by the ability information.

For example, regarding the value indicated by the information indicating the evaluation value, it is assumed that ability information indicating ability useful for responding to an emergency call is associated with a value greater than pieces of ability information indicating other abilities. When a predetermined person included in the team has the ability useful for responding to then emergency call, the total value of the evaluation values of the ability indicated by the ability information becomes large. In this way, it is possible to visualize how well each team has responsiveness to an emergency call, that is, ability to respond to the emergency call. In addition, when selecting a team of ambulance crews or firefighters to respond to an emergency call, the user can select a team with responsiveness or a team including a person with predetermined ability.

Next, an operation unique to the case of (3) which the control device 5 outputs, to the output device 4, person identification information indicating a person who meets a predetermined condition for moving from another team to a team whose total value of evaluation values of abilities indicated by the ability information is lower than a predetermined threshold value, or name information indicating a name of a person as the additional information will be described.

As in the case of (2), the control device 5 generates the information indicating the total value of the evaluation values of the abilities indicated by the ability information of each team. In the case of (3), the additional information generation condition is that there is a team whose total value of the evaluation values of the abilities indicated by the ability information is lower than the predetermined threshold value. The control device 5 specifies a person who satisfies a predetermined condition and is to be moved to a team whose total value of the evaluation values of the abilities indicated by the ability information is lower than the predetermined threshold value from another team.

The predetermined condition in the case of (3) is that the person has predetermined ability such as being able to serve as a command captain of an ambulance crew or a fire brigade, or having a large vehicle license. Further, as information indicating an operating state of a person having the above-described predetermined ability or a person having ability to play a predetermined role, the person may be associated with the information indicating that the person is not operating. The information indicating the operating state may be stored in the ability information storage unit 35 in association with the person information. As a result, when there is no person who can play a predetermined role in a team lower than a predetermined threshold value, the control device 5 can specify a person who has a predetermined ability and a person who is not operating from another team. Further, the control device 5 outputs, to the output device 4, the person identification information indicating a person satisfying a predetermined condition and the name information indicating the name of the person as additional information. In this way, the control device 5 may organize the persons included in the team dispatched in response to the emergency call. When organizing a team, the control device 5 may output information indicating the organized team to the output device 4. Alternatively, the control device 5 may display an image of a list of person identification information of a person included in an organized team and an image of a list of name information of a person included in the organized team on the output device 4 as additional information. Further, the control device 5 may include a name information storage unit (not illustrated). Person information of a person who is a specification target of ability information and name information indicating a name of the person indicated by the person information are stored in the name information storage unit in association with each other.

Next, an operation unique to in the case of (4) by identifying the team whose total value of the evaluation values of the abilities indicated by the ability information is greater than the predetermined threshold value, where the information indicating the team selected as the team to be dispatched by the control device 5 to respond to the emergency call is output to the output device 4 as additional information will be described.

As in the case of (2), the control device 5 generates the information indicating the total value of the evaluation values of the abilities indicated by the ability information of each team. Further, the control device 5 specifies a team whose total value of the evaluation values of the abilities indicated by the ability information is greater than a predetermined threshold value. In this way, the control device 5 selects a team to be dispatched to respond to an emergency call by identifying a team whose total value of the evaluation values of the abilities indicated by the ability information is greater than a predetermined threshold value. When selecting a team, the control device 5 outputs, to the output device 4, information indicating the selected team as additional information. For example, the control device 5 displays an image of a list of person identification information of a person included in the selected team and an image of a list of name information of a person included in the selected team on the output device 4 as additional information.

Next, the operation unique to the case of (5) in which the control device 5 outputs, to the output device 4, as additional information, a message indicating that the evaluation value of the ability indicated by the specified ability information is equal to or lower than a predetermined threshold value for each person information with which the team information is associated will be described.

In the case of (5), the additional information generation condition is that the evaluation value of the ability indicated by the specified ability information for all the person information with which the team information is associated is equal to or lower than a predetermined threshold value. When the evaluation value of the ability indicated by the specified ability information is equal to or lower than a predetermined threshold value for all the person information with which the team information is associated, the control device 5 displays a message "all members have a low responsiveness to firefighting operation, so you should call for support" on the output device 4 as the additional information.

Finally, the operation unique to the case of (6) where the control device 5 outputs the information indicating the person to be increased to the team related to the site where the number of personnel needs to be increased to the output device 4 as additional information will be described.

For example, depending on a situation at a site where the team of ambulance crews and firefighters dispatched in response to an emergency call is dispatched, it may be necessary to increase the number of personnel to a team at a dispatch destination. The control device 5 organizes a team according to the situation of the site based onsite position information indicating a position of a site that is information on the situation of the site.

The operation of the acquisition device 2 and the control device 5 when organizing a team according to the situation at the site will be described in detail. When it becomes necessary to increase the number of personnel, the acquisition device 2 acquires the pieces of person information of each person of the team dispatched to the dispatch destination by associating each person included in the team dispatched to the dispatch destination with the team information. Further, when the acquisition device 2 acquires the person information, the acquisition device 2 acquires the position information indicating the position of the acquisition device 2. The acquisition device 2 outputs the team information, the person information, and the position information to the control device 5 in association with each other. The control device 5 considers the position information output from the acquisition device 2 in association with the team information and the person information as the site position information indicating the position of the site. Further, the control device 5 may acquire utterance information indicating utterance content of the emergency call. Further, the control device 5 may generate text information in which the utterance content of the emergency call is a text from the utterance information. Further, the control device 5 may extract the position information indicating the position included in the utterance content from the text information, and consider the position indicated by the extracted position information as the site position information. In addition to these methods, any method can be used as the method of the control device 5 to acquire the site position information. When the team information, the person information, and the position information are received, the control device 5 specifies a person who satisfies a predetermined condition to increase the number of members to the team indicated by the team information. In the case of (6), the additional information generation condition is that the control device 5 has received the team information, the person information, and the position information. In addition, the control device 5 displays, on the output device 4, the ability information specified from the pieces of person information of each person of the team dispatched to the dispatch destination, and as additional information, the person identification information of the specified person and the name information of the specified person.

The predetermined condition in the case of (6) is a person who has a predetermined ability, a person who has ability to play a predetermined role, and a person who is near the position indicated by the site position information In addition to the above conditions, the person may be a person who has predetermined ability or a person who is associated with information indicating that the person is not operating as information indicating an operating state of a person who has the ability to play a predetermined role. In this way, the control device 5 can organize a team according to the situation of the site where the number of personnel needs to be increased, based on the site position information indicating the position of the site that is information on the situation of the site. Further, since the control device 5 specifies a person who is within a predetermined distance from the position indicated by the site position information indicating the position of the site as a person to be added to the team, when the team needs to be increased, it is possible to quickly dispatch the increasing number of persons to the site. In this way, the control device 5 can efficiently allocate personnel to the site. In addition, the control device 5 enables the team including the increased number of personnel to quickly respond to an emergency call and the primary response that is the initial response to the accident site.

Further, when the control device 5 specifies a person who satisfies a predetermined condition to be increased to the team indicated by the team information, the control device 5 may request the acquisition device 2 to acquire the position information and output the person information last acquired by the acquisition device 2. The control device 5 may consider the person indicated by the person information last acquired by the acquisition device 2 to be the person at the position indicated by the position information of the acquisition device 2. The control device 5 specifies the acquisition device 2 that outputs the position information indicating the position within a predetermined distance from the position indicated by the site position information. Further, the control device 5 specifies a person who satisfies the predetermined condition in the case of (6) from the persons indicated by the person information output from the specified acquisition device 2. In this way, the control device 5 may specify a person who satisfies a predetermined condition to increase the number of members to the team indicated by the team information.

Alternatively, the control device 5 may consider a person assigned to the fire station, which is an area within a predetermined distance from the position indicated by the site position information, to be a person near the position indicated by the site position information, based on a fire station that is an area and area position information that indicates the position of the area. The control device 5 specifies a person who satisfies the predetermined condition in the case of (6) from the persons near the position indicated by the site position information. The control device 5 may include an area information storage unit (not illustrated). The area identification information indicating identifiers set in advance for each area and the person information of the person assigned to the area indicated by the area identification information are stored in the area information storage unit in association with each other.

In addition, regarding the caution information, when the information indicating that it is easy to make a mistake is specified as the ability information, the control device 5 may display a message "Mr. XX has made many mistakes in the past" on the output device 4 as the caution information. "○○" indicates the name of a person whose ability information indicates that information indicating that a mistake is likely to occur is specified as ability information. The control device 5 specifies the name information of the person whose ability information indicates that the person is likely to make a mistake based on the person information, and displays the caution information including the name information to the output device 4. In addition, for example, regarding the information indicating the expiration date of the driver's license included in the specified ability information, when the valid period of the driver's license is shorter than the predetermined number of days, a message "the valid period of Mr. ○Δ's driver's license is short" may be displayed on the output device 4 as the caution information. "○Δ" indicates the name of a person whose driver's license is valid for a shorter period of time than a predetermined number of days, and whose information indicating the expiration date of the driver's license is specified as ability information.

Next, the configuration of the control device 5 of the present example embodiment will be described in detail with reference to FIG. 9. The control device 5 includes an acquisition unit 31, a specification unit 52, and a control unit 53. Further, the ability information storage unit 35 and the role information storage unit 55 are connected to the specification unit 52 and the input/output unit 54. Further, the input/output unit 54 is connected to the acquisition unit 31, the control unit 53, the ability information storage unit 35, and the role information storage unit 55. Further, the caution condition storage unit 56 is connected to the control unit 53.

The configuration of the acquisition unit 31 and the ability information storage unit 35 in the present example embodiment is the same as the configuration of the acquisition unit 31 and the ability information storage unit 35 in the second example embodiment illustrated in FIG. 3. The elements are designated by the same reference numerals as those in FIG. 3, and the description of the acquisition unit 31 and the ability information storage unit 35 will be omitted.

The input/output unit 54 receives the person information that is information unique to a person from the acquisition device 2. The input/output unit 54 outputs the received person information to the acquisition unit 31. Further, the input/output unit 54 receives the ability information and the person information from the output device 4. When the ability information and the person information are received from the output device 4, the input/output unit 54 associates the received person information with the received ability information and stores the received ability information in the ability information storage unit 35. Further, the input/output unit 54 outputs the received ability information and the person information to the control unit 53 in association with each other.

Further, the input/output unit 54 receives the role information and the person information from the output device 4. When the role information and the person information are received from the output device 4, the input/output unit 54 associates the received person information with the received role information and stores the received role information in the role information storage unit 55. Further, the input/output unit 54 outputs the received role information with the person information to the control unit 53 in association with each other. In the present example embodiment, the user can modify the role information and register the role information by using the output device 4 as well as the ability information.

The person information is input to the specification unit 52 from the acquisition unit 31. The specification unit 52 specifies the ability information of the person indicated by the person information acquired by the acquisition unit 31. Since the method of specifying the ability information by the specification unit 52 is the same as the method of specifying the ability information of the specification unit 32 in the second example embodiment, the description thereof will be omitted.

In addition, the specification unit 52 specifies the role information indicating the role assigned to the person indicated by the person information acquired by the acquisition unit 31. The specification unit 52 specifies the role information by using the same method as the method of specifying the ability information.

When the person information is person identification information indicating preset identifiers for each person, the specification unit 52 collates whether the person identification information matching the input person identification information in the role information storage unit 55. When the person identification information is used as the person information, the role information storage unit 55 stores the person identification information of the person who is the specification target of the ability information and the role information of the person in advance in association with each other. The specification unit 52 specifies the role information stored in the role information storage unit 55 in association with the person identification information that matches the input person identification information.

When the person information is biometric information, the specification unit 52 extracts feature information indicating features of the biometric information from the biometric information. The specification unit 52 collates whether the target feature information whose degree of similarity to the extracted feature information is equal to or greater than a predetermined value is stored in the role information storage unit 55. When the specification unit 52 specifies the role information using the feature information, the role information storage unit 55 stores the following information. Target feature information that is feature information of biometric information of a person who is a specification target of ability information, person identification information of the person who is the specification target of the ability information, and role information of the person who is the specification target of the ability information are stored in the role information storage unit 55 in advance in association with each other. The specification unit 52 specifies the role information stored in the role information storage unit 55 and associated with the target feature information whose degree of similarity to the extracted feature information is equal to or greater than a predetermined value.

The specification unit 52 outputs the specified ability information and role information to the control unit 53. In addition, when at least one of the ability information and the role information cannot be specified, the specification unit 52 outputs the person information, the specified information among the ability information and the role information, and the notification indicating the information that cannot be specified to the control unit 53.

The role information storage unit 55 is connected to the input/output unit 54 and the specification unit 52. When the person identification information is used as the person information, the role information storage unit 55 stores the person identification information of the person who is the specification target of the ability information and the role information of the person in advance in association with each other. Further, when the specification unit 52 specifies the ability information using the feature information, the role information storage unit 55 stores the following information. Target feature information that is feature information of biometric information of a person who is a specification target of ability information, person identification information of the person who is the specification target of the ability information, and role information of the person who is the specification target of the ability information are stored in the role information storage unit 55 in advance in association with each other. Further, biometric information of a person who is a specification target of ability information, target feature information, and person identification information may be stored in the role information storage unit 55 in advance in association with the role information of the person.

The control unit 53 includes a caution condition determination unit 531 and a control information output unit 532.

The specified ability information and role information are input from the specification unit 52 to the caution condition determination unit 531. When the ability information and the role information are input, the caution condition determination unit 531 reads the caution condition associated with the input role information and the caution information associated with the caution condition from the caution condition storage unit 56 The caution condition, the role information, and the caution information are stored in the caution condition storage unit 56 in advance in association with each other. When the ability indicated by the specified ability information satisfies the read caution condition, the caution condition determination unit 531 outputs the caution information and the ability information associated with the read caution condition to the control information output unit 532. Further, the caution condition determination unit 531 outputs the ability information to the control information output unit 532 when the ability indicated by the specified ability information does not satisfy the read caution condition.

For example, suppose that the role indicated by the specified role information is driving a car. In addition, it is assumed that the specified ability information includes information indicating the number of times the transport destination was mistaken as information indicating features of a person who is an ambulance crew. Further, as the caution condition associated with the role information indicating the driving of the car and the caution information indicating that the transport destination is requested to be repeated, "the number of times the transport destination was mistaken is equal to or more than a predetermined number" is stored in the caution condition storage unit 56. The caution condition determination unit 531 reads the caution condition and the caution information associated with the input role information from the caution condition storage unit 56. In addition, the caution condition determination unit 531 determines whether the ability indicated by the specified ability information satisfies the read caution condition. When the number of times indicated in the information indicating the number of times the transport destination was mistaken included in the ability information is equal to or more than a predetermined number and the caution condition is satisfied, the caution condition determination unit 531 outputs the ability information and the caution information to the control information output unit 532.

In addition, for example, as a caution condition associated with role information indicating driving a car and caution information indicating that the driver's license needs to be renewed, "the valid period of the driver's license is shorter than a predetermined number of days" may be stored in the caution condition storage unit 56. Further, for example, as the caution condition associated with role information indicating the driving of a car and the caution information indicating that the driver's license is invalid, "date indicated by the information indicating the expiration date of the driver's license indicates a past date" may be stored in the caution condition storage unit 56.

In addition, when at least one of the ability information and the role information cannot be specified, the person information, the specified information among the ability information and the role information, and a notification indicating the information that cannot be specified is input to the caution condition determination unit 531. The caution condition determination unit 531 outputs the person information, the specified information among the ability information and the role information, and the notification indicating the information that cannot be specified to the control information output unit 532.

Further, the role information is input from the input/output unit 54 to the caution condition determination unit 531 in association with the person information. Further, the ability information is input from the input/output unit 54 to the caution condition determination unit 531 in association with the person information. When the input person information is the person information for which at least one of the ability information and the role information cannot be specified, and the ability information and the role information are input to the caution condition determination unit 531 for the person information, the caution condition determination unit 531 performs the following operations. The caution condition determination unit 531 determines whether to output the caution information to the control information output unit 532 as described above based on the information specified by the specification unit 52 and the information input according to the user's operation with respect to the ability information and the role information.

The ability information and the caution information are input to the control information output unit 532 from the caution condition determination unit 531. When the ability information and the caution information are input, the control information output unit 532 outputs the control information instructing the output of the ability information and the caution information to the output device 4. The control information instructing the output of the ability information and the caution information includes information for outputting the ability information and the caution information as an image to the output device 4. Further, the control information instructing the output of the ability information and the caution information may include information for outputting the ability information and the caution information to the output device 4 as voice.

Further, the ability information is input to the control information output unit 532. When the ability information is input, the control information output unit 532 outputs the control information instructing the output of the ability information to the output device 4.

When the ability information that matches the ability information that outputs the caution information to the output device 4 and the person information that matches the person information having the ability indicated by the ability information that outputs the caution information to the output device 4 are input from the input/output unit 54, the control information output unit 532 may output the input ability information to the output device 4. In this case, it is assumed that the ability information is modified according to the operation of the input/output interface of the output device 4 by the user. Further, the control information output unit 532 may output the corrected ability information to the output device 4.

For example, it is assumed that the caution information associated with the above-described caution condition "the valid period of the driver's license is shorter than the predetermined number of days" or the caution condition "the date indicated by the information indicating the expiration date of the driver's license indicates the past date" is the following information. It is assumed that the above-described caution conditions are associated with caution information indicating that the driver's license expiration date is required to be entered. It is assumed that these caution conditions are satisfied in a case where, although the person who has the ability indicated by the ability information for which the caution information was output renewed the driver's license, when the ability information storage unit 35 of the control device 5 does not store the information indicating the expiration date of the renewed driver's license as the ability information. When these caution conditions are satisfied, the control device 5 displays the above-described caution information on the display unit 42 of the output device 4, so it is possible to encourage a user to register information indicating the expiration date of the renewed driver's license as the ability information. As a result, according to the operation by the user who confirmed the caution information, the information indicating the expiration date of the renewed driver's license and the person information are input to the output device 4 via the input/output interface of the output device 4 as the ability information. The input/output unit 54 of the control device 5 receives the ability information and the person information from the output device 4. The input/output unit 54 outputs the received person information and the ability information to the control unit 53 in association with each other. The control information output unit 532 in which the person information and the ability information are input outputs the corrected ability information to the output device 4.

When at least one of the ability information and the role information cannot be specified, the control information output unit 532 outputs the control information instructing the output of the information requesting the input of the information that cannot be specified and the person information for which ability information cannot be specified to the output device 4 in association with each other. Similar to the operation in which the control unit 33 of the second example embodiment outputs the message requesting the input of the ability information to the output device 4, the control information output unit 532 outputs the message requesting the input of the information that cannot be specified to the output device 4.

The role information, the caution conditions, and the caution information are stored in the caution condition storage unit 56 in advance in association with each other.

In this way, the control device 5 acquires the person information that is the information unique to the person. Further, the control device 5 specifies the ability information of the person indicated by the acquired person information, and outputs the specified ability information to the predetermined output device 4. As a result, it is possible for the user of the control device 5 to confirm the ability information output to the output device 4. In this way, it becomes possible for the user of the control device 5 to easily grasp the ability of a predetermined person.

Figure 10:
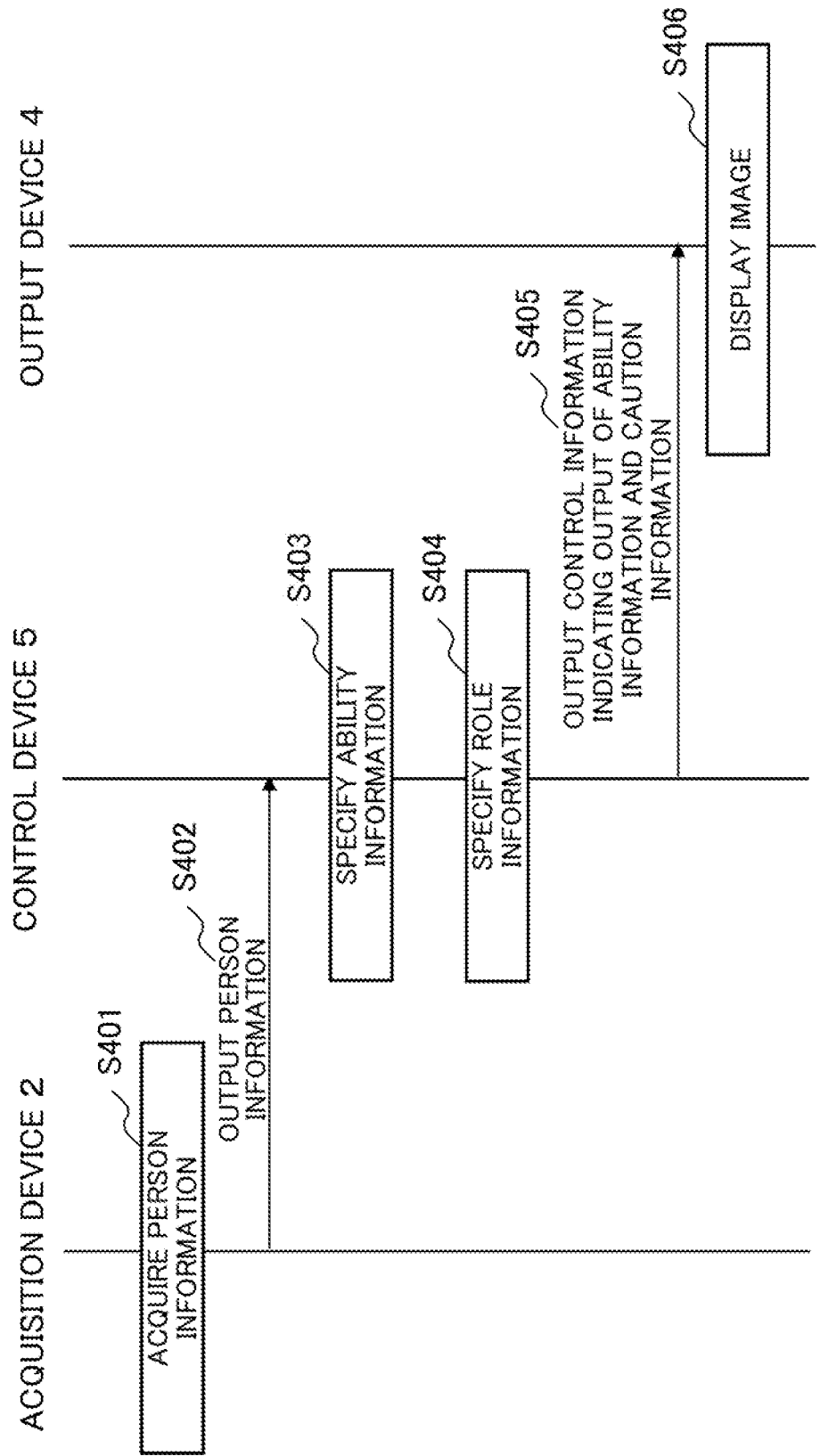
FIG. 10 is a sequence diagram illustrating an operation example of the control system according to the third example embodiment of the present invention.
Figure 11:
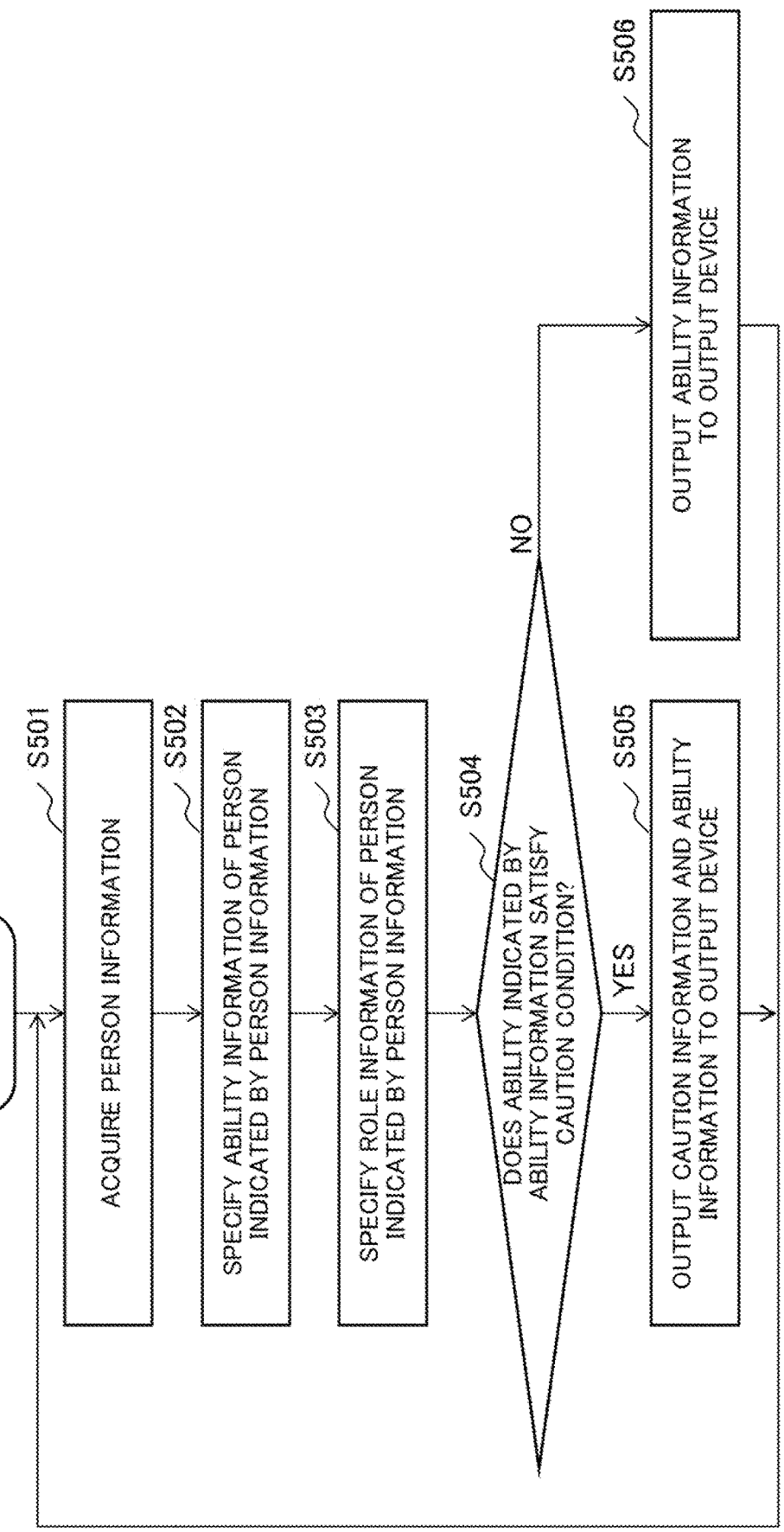
FIG. 11 is a flowchart illustrating the operation example of the control device according to the third example embodiment of the present invention.

Next, an operation example of the control system of the present example embodiment will be described with reference to FIGS. 10 and 11. FIG. 10 is a sequence diagram illustrating an operation example of the control system. FIG. 11 is a flowchart illustrating an operation example of the control device 5.

First, with reference to FIG. 10, the operation in which the acquisition device 2 acquires the person information and the control device 5 outputs the ability information and the caution information to the output device 4 will be described. When the ability information is output to the output device 4, the control device 5 does not perform the operation of step S405 illustrated in FIG. 10, but performs the operation of step S204 illustrated in FIG. 4 of the second example embodiment.

The acquisition device 2 acquires person information that is information unique to the person (step S401). The acquisition device 2 outputs the acquired person information to the control device 5 (step S402).

The control device 5 acquires the person information by receiving the person information from the acquisition device 2. The control device 5 specifies the ability information indicating the ability of the person indicated by the acquired person information (step S403). Further, the control device 5 specifies the role information indicating the role assigned to the person indicated by the person information (step S404). When the attention condition associated with the role information is satisfied by the ability indicated by the specified ability information, the control device 5 outputs the ability information and the control information instructing the output of the attention information to the output device 4 (step S405).

The output device 4 receives the control information instructing the output of the ability information and the caution information from the control device 5. The output device 4 displays an image indicating the ability information and the attention information based on the control information instructing the output of the ability information and the attention information (step S406). The image indicating the ability information and the caution information is, for example, an image including a list of the ability information specified by the control device 5 and a message indicating the caution information.

When the ability indicated by the specified ability information does not satisfy the caution condition associated with the role information, the control device 5 performs the operation of step S204 illustrated in FIG. 4 of the second example embodiment. Specifically, the control device 5 outputs the control information instructing the output of the ability information to the output device 4. Further, the output device 4 receives the control information instructing the output of the ability information from the control device 5. The output device 4 displays an image indicating the ability information based on the received control information instructing the output of the ability information. The image indicating the ability information is, for example, an image of a list of ability information specified by the control device 5.

Next, an operation example of the control device 5 will be described with reference to FIG. 11. Further, the operation of FIG. 11 details the operation of steps S403 to S405 of FIG. 10.

The input/output unit 54 receives the person information that is information unique to a person from the acquisition device 2. The input/output unit 54 outputs the received person information to the acquisition unit 31.

The person information is input to the acquisition unit 31 from the input/output unit 54. The acquisition unit 31 acquires the person information by inputting the person information from the input/output unit 54 (step S501). The acquisition unit 31 outputs the acquired person information to the specification unit 52.

The person information is input to the specification unit 52 from the acquisition unit 31. The specification unit 52 specifies the ability information that is the information indicating the ability of the person indicated by the acquired person information (step S502). In addition, the specification unit 52 specifies the role information that is the information indicating the role of the person indicated by the acquired person information (step S503). The specification unit 52 outputs the specified ability information and role information to the control unit 53.

The specified ability information and role information are input from the specification unit 52 to the caution condition determination unit 531 of the control unit 53. The caution condition determination unit 531 reads the caution condition associated with the input role information and the caution information associated with the caution condition from the caution condition storage unit 56. When the ability indicated by the specified ability information satisfies the read caution condition (step S504, YES), the caution condition determination unit 531 outputs the caution information and ability information associated with the read caution condition to the control information output unit 532. Further, the caution condition determination unit 531 outputs the ability information to the control information output unit 532 when the ability indicated by the specified ability information does not satisfy the read caution condition (step S504, NO).

When the ability information and the caution information are input, the control information output unit 532 outputs the control information instructing the output of the ability information and the caution information to the output device 4. In this way, the control information output unit 532 outputs the caution information and the ability information to the output device 4 (step S505). When the ability information is input, the control information output unit 532 outputs the control information instructing the output of the ability information to the output device 4. In this way, the control information output unit 532 outputs the ability information to the output device 4 (step S506).

Figure 12:
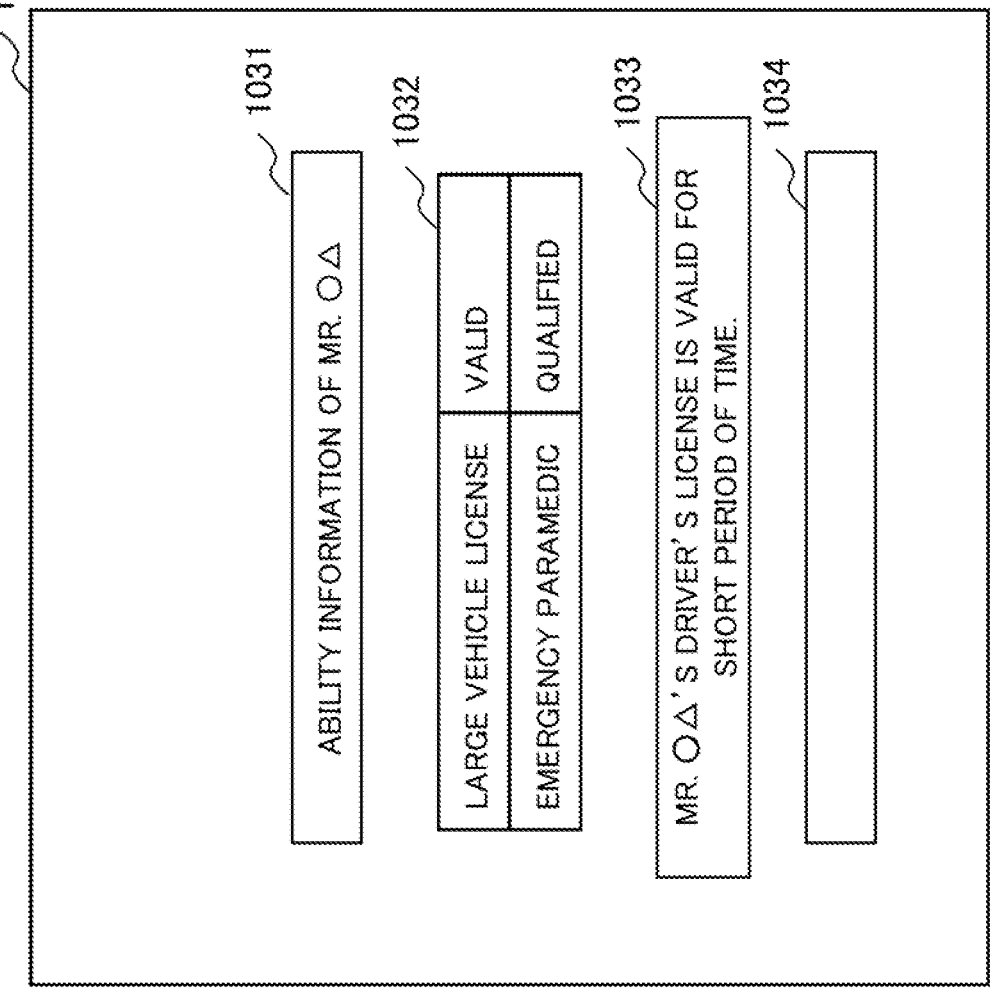
FIG. 12 is a diagram illustrating an example of a screen displayed on an output device according to the third example embodiment of the present invention.

FIG. 12 illustrates an example of a screen displayed on the display unit 42 of the output device 4 when the ability information and the caution information are output to the output device 4. In the example of FIG. 12, a message 1031 "ability information of Mr. ○△" indicating "○△" that is the name of the person whose ability information is specified is displayed on a screen 103. In addition, a table 1032 in which "valid" indicating that the "large vehicle license" is "valid" and "qualified" indicating that the "emergency paramedic" is qualified are shown is displayed as the specified ability information. In addition, the message 1033 indicating the caution information "Mr. ○△'s driver's license is valid for a short period of time" and a part 1034 in which the input ability information according to the user's operation of the input/output interface of the output device 4 is displayed are shown.

Further, when specifying the pieces of ability information of each person included in the predetermined team, the control device 5 may display the ability information of the person included in the predetermined team on the display unit 42 of the output device 4 as a list, or as illustrated in FIG. 12, the pieces of ability information for each person may be displayed on the display unit 42.

In addition, when at least one of the ability information and the role information cannot be specified in step S502 and step S503, the person information, the specified information among the ability information and the role information, and the notification indicating the information that cannot be specified are input to the caution condition determination unit 531. The caution condition determination unit 531 outputs the person information, the specified information among the ability information and the role information, and the notification indicating the information that cannot be specified to the control information output unit 532.

When at least one of the ability information and the role information cannot be specified, the control information output unit 532 outputs the control information instructing the output of the information requesting the input of the information that cannot be specified and the person information for which ability information cannot be specified to the output device 4 in association with each other. Specifically, the control information output unit 532 outputs, to the output device 4, a message requesting input of the information that cannot be specified for the information that cannot be specified.

Further, the role information is input from the input/output unit 54 to the caution condition determination unit 531 in association with the person information. Further, the ability information is input from the input/output unit 54 to the caution condition determination unit 531 in association with the person information. When the input person information is the person information for which at least one of the ability information and the role information cannot be specified, and the ability information and the role information are input to the caution condition determination unit 531 for the person information, the caution condition determination unit 531 performs an operation of step S504. Specifically, the caution condition determination unit 531 determines whether to output the caution information to the control information output unit 532 based on the information specified by the specification unit 52 and the information input by the user.

In this way, the control device 5 acquires the person information that is the information unique to the person. Further, the control device 5 specifies the ability information of the person indicated by the acquired person information, and outputs the specified ability information to the predetermined output device 4. As a result, it is possible for the user of the control device 5 to confirm the ability information output to the output device 4. In this way, it becomes possible for the user of the control device 5 to easily grasp the ability of a predetermined person.

Further, the control device 5 of the present example embodiment displays an image indicating the ability information to the output device 4. As a result, when the ability information of the ambulance crew is specified, the control device 5 displays the ability information as an image on the display installed in the command center. As a result, the user of the control device 5 can confirm the ability information displayed on the display installed in the command center and grasp the ability of the ambulance crew whose ability information is specified.

Further, for the person information that could not be identified at least one of ability information and role information, the control device 5 outputs the information requesting the input of the information that cannot be specified among the ability information and the role information to the acquisition device 2 having the function of the output device 4 that is the output source of the person information. As a result, it becomes possible to easily input, to the person indicated by the person information of which at least one of the ability information and the role information cannot be specified, the information that cannot be specified among the ability information and the role information via the input/output interface of the acquisition device 2 having the function of the output device 4.

Further, when the ability of the person indicated by the person information and the ability indicated by the specified ability information satisfy the caution condition associated with the specified role information, the control device 5 outputs the caution information and the ability information associated with the caution condition to the output device 4. By displaying the caution information on the display unit 42 of the output device 4, the control device 5 can call attention to the user of the control device 5 according to the specified ability information. For example, the control device 5 notifies the caution information when the driver's license needs to be renewed or when the driver's license is invalid. As a result, it is possible to reduce the possibility that a person with a driver's license that has expired after the expiration date will drive a car.

Further, the control device 5 displays, on the display unit 42 of the output device 4, caution information indicating that the ambulance crew who is likely to make a mistake is requested to repeat the transport destination. By having other ambulance crews confirm that the transport destination, which was repeated by ambulance crews who are prone to make mistakes, is correct, the ambulance crews who are prone to mistakes can reduce the likelihood that patients will be transported to the wrong transport destination.

Fourth Example Embodiment

Next, a control device 6 according to a fourth example embodiment of the present invention will be specifically described. The control device 6 of the fourth example embodiment is different from the control device 3 of the second example embodiment in that the control device 6 outputs an area total value information in which evaluation values of abilities of persons assigned to each area are summed to the output device 4. The area total value information indicates responsiveness of the person assigned to the area.

Figure 13:
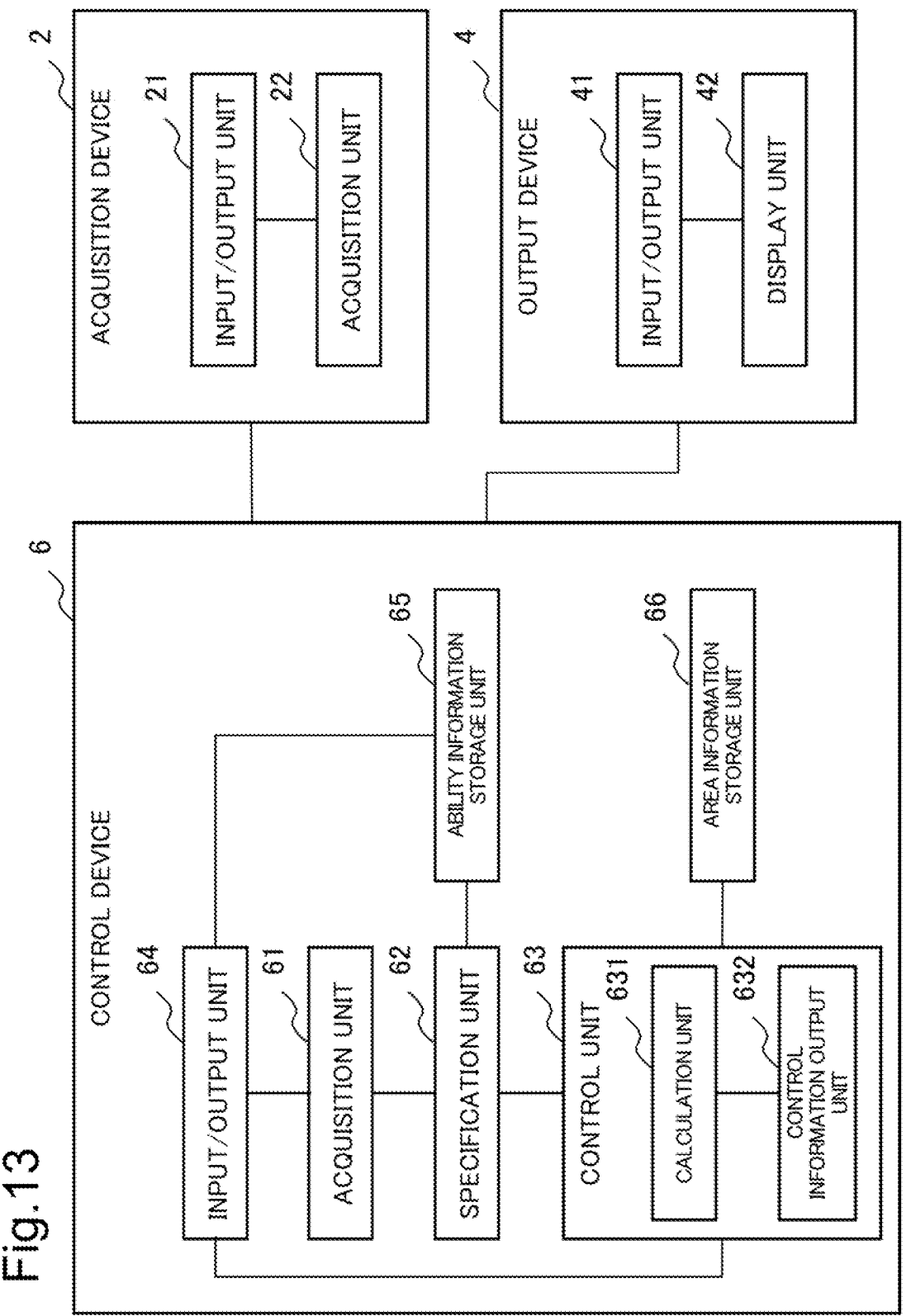
FIG. 13 is a block diagram illustrating a configuration example of a control system according to a fourth example embodiment of the present invention.

A configuration example of the control system of the present example embodiment will be described with reference to FIG. 13. FIG. 13 is a block diagram illustrating a configuration example of a control system according to the present example embodiment. As illustrated in FIG. 13, the control system of the present example embodiment includes an acquisition device 2, a control device 6, and an output device 4.

Since the configuration of the acquisition device 2 in the present example embodiment is the same as the configuration of the acquisition device 2 in the second example embodiment illustrated in FIG. 3 except for the following points, the corresponding elements are designated by the same reference numerals as in FIG. 3, and the description thereof will be omitted. The acquisition device 2 in the present example embodiment acquires person information that is information unique to a person and moving destination information indicating a moving destination of the person indicated by the person information, and outputs the person information and the moving destination information to the control device 6 in association with each other.

Further, since the configuration of the output device 4 in the present example embodiment is the same as the configuration of the output device 4 in the second example embodiment illustrated in FIG. 3 except for the following points, the corresponding elements are designated by the same reference numerals as in FIG. 3, and the description thereof will be omitted. When the output device 4 in the present example embodiment receives control information instructing an output of specified ability information, area total value information, and area identification information of an area in which the area total value information is generated from the control device 6, the following operations are performed. The input/output unit 41 displays, on the display unit 42, the specified ability information, the area total value information, and the area identification information of the area in which the area total value information is generated. Further, the area total value information and the area identification information will be described later.

When an ambulance crew or firefighter is dispatched to respond to an emergency call in a given area, it is assumed that there will be a shortage of qualified ambulance crews or firefighters who can respond to subsequent emergency calls. In the present example embodiment, a person who is a user and whose ability is grasped uses the input/output interface provided in the acquisition device 2 to input moving destination information indicating a moving destination to the acquisition device 2 before starting the movement, and allows the acquisition device 2 to acquire the person information. For example, when the person whose ability is grasped is an ambulance crew or firefighter who responds to an emergency call, the person whose ability is grasped inputs the moving destination to the acquisition device 2 and causes the acquisition device 2 to acquire the person information before dispatching in response to the emergency call and after responding to the emergency call. The destination information includes area identification information indicating the moving destination area. In addition, when the user is an ambulance crew or a firefighter, the moving destination information includes information indicating that the user has been dispatched in response to an emergency call. Further, the area identification information is information indicating an identifier set in advance for each area. When the area is a fire station, the area identification information may be information indicating the name of the fire station.

The control device 6 acquires the person information and the moving destination information by receiving the person information and the moving destination information from the acquisition device 2. The control device 6 specifies the ability information that is information indicating the ability of the person indicated by the acquired person information, and the evaluation value information indicating the evaluation value of the ability indicated by the specified ability information. Further, the control device 6 generates pieces of area total value information of each area. The area total value information indicates a total value of the evaluation values indicated by the evaluation value information related to the ability information of the person assigned to the area. When there are two or more persons assigned to the area, the area total value information is the sum of the evaluation values indicated by the evaluation value information related to the ability information of the two or more persons. The control device 6 outputs the specified ability information, the area total value information, and the control information instructing the output of the area identification information of the area in which the area total value information is generated to the output device 4. In this way, the control device 6 outputs, to the output device 4, the specified ability information, the area total value information, and the area identification information of the area in which the area total value information is generated. As for the area total value information, the evaluation value indicated by the evaluation value information corresponding to the ability information of the person scheduled to be assigned to the area may be a value added to the value indicated by the area total value information before the person is assigned. For example, the area to which the person indicated by the acquired person information is scheduled to be assigned is the area indicated by the area identification information that is the moving destination information acquired together with the person information of the person.

The control device 6 outputs the pieces of area total value information of each area, which is the sum of the evaluation values indicated by the evaluation value information corresponding to the ability information of the person assigned to the area, and the specified ability information to the output device 4. For example, regarding the value indicated by the information indicating the evaluation value, it is assumed that ability information indicating ability useful for responding to an emergency call is associated with a value greater than pieces of ability information indicating other abilities. For each area, when the person assigned to the area has a useful ability for responding to an emergency call, the value indicated by the area total value information will be large. Further, for each area, when the person assigned to the area does not have a useful ability for responding to an emergency call, the value indicated by the area total value information becomes small. That is, the area in which the value indicated by the area total value information is small is an area in which it is more difficult to respond to an emergency call than other areas. By outputting the area total value information of each area to the output device 4, it becomes possible for the user to grasp the area in which it is difficult to respond to an emergency call.

Next, the configuration of the control device 6 of the present example embodiment will be described in detail with reference to FIG. 13. The control device 6 includes an acquisition unit 61, a specification unit 62, and a control unit 63. Further, the ability information storage unit 65 is connected to the specification unit 62 and the input/output unit 64. Further, the area information storage unit 66 is connected to the control unit 63. Further, the input/output unit 64 is connected to the acquisition unit 61, the control unit 63, and the ability information storage unit 65.

The input/output unit 64 receives the person information that is information unique to the person, and the moving destination information indicating the moving destination of the person indicated by the person information from the acquisition device 2. The input/output unit 64 outputs the received person information and the moving destination information to the acquisition unit 61 in association with each other.

Further, the input/output unit 64 receives the ability information and the person information from the output device 4. When the ability information and the person information are received from the output device 4, the input/output unit 64 specifies the evaluation value information indicating the evaluation value of the ability indicated by the ability information with respect to the received ability information. Further, the input/output unit 64 outputs the received person information and the ability information to the control unit 63 in association with the specified evaluation value information related to the ability information. Further, the input/output unit 64 stores the received ability information, the specified evaluation value information related to the ability information, and the received person information in the ability information storage unit 65 in association with each other. The evaluation value information indicating the evaluation value of the ability indicated by the ability information is stored in the evaluation value information storage unit (not illustrated) of the control device 6 in association with the ability information. Further, the ability information storage unit 65 of the present example embodiment is different from the ability information storage unit 35 of the second example embodiment in that the ability information storage unit 65 of the present example embodiment stores the evaluation value information related to the ability information in association with the ability information and the person information.

The ability information storage unit 65 is connected to the input/output unit 64 and the specification unit 62. When the person identification information is used as the person information, the ability information storage unit 65 includes the person identification information of the person who is the specification target of the ability information, the ability information of the person, and the evaluation value information related to the ability information in association with each other. In addition, when the specification unit 62 specifies the ability information using the feature information, the ability information storage unit 65 stores the following information. Target feature information that is feature information of biometric information of a person who is a specification target of the ability information, person identification information of the person who is the specification target of the ability information, ability information of the person who is the specification target of the ability information, and evaluation value information related to the ability information are stored in the ability information storage unit 65 in association with each other. Further, biometric information of a person who is a specification target of ability information, target feature information, the person identification information, and evaluation value information related to the ability information may be stored in the ability information storage unit 65 in advance in association with the ability information of the person.

The person information and the moving destination information are input to the acquisition unit 61 from the input/output unit 64. The acquisition unit 61 acquires the person information and the moving destination information by inputting the person information and the moving destination information from the input/output unit 64. The acquisition unit 61 outputs the acquired person information and the moving destination information to the specification unit 62 in association with each other. For example, the person information is person identification information or biometric information. When the acquisition unit 61 acquires image information, the person information is image information indicating a face image. Further, for example, when the acquisition unit 61 acquires voice information, the person information is voice information.

Person information and moving destination information are input to the specification unit 62 from the acquisition unit 61. The specification unit 62 specifies the ability information that is information indicating the ability of the person indicated by the person information acquired by the acquisition unit 61. Further, the specification unit 62 reads the evaluation value information associated with the specified ability information from the ability information storage unit 65. The specification unit 62 outputs the specified ability information, the evaluation value information, the person information, and the moving destination information to the control unit 63 in association with each other. Since the method of specifying the ability information by the specification unit 62 is the same as the method of specifying the ability information of the specification unit 32 in the second example embodiment, the description thereof will be omitted. Further, when the ability information cannot be specified by the specification unit 62, the control device 6 outputs the message requesting the input of the ability information to the output device 4, as in the second example embodiment. Further, the ability information is input to the output device 4 according to the operation of the input/output interface of the output device 4 by the user.

The control unit 63 includes a calculation unit 631 and a control information output unit 632.

The specified ability information, evaluation value information, person information, and moving destination information are input to the calculation unit 631 from the specification unit 62. When the ability information, the evaluation value information, the person information, and the moving destination information are input, the calculation unit 631 generates the area total value information of each area. The area total value information indicates a total value of the evaluation values indicated by the evaluation value information related to the ability information of the person assigned to the area. Here, the area in which the area total value information is generated is called the area to be calculated.

The process of generating the area total value information of each area by the calculation unit 631 will be specifically described.

Here, it is assumed that the area information storage unit 66, which will be described later, stores the person identification information as the person information. Further, it is assumed that the person identification information is input to the calculation unit 631 as the person information.

First, the process when the calculation unit 631 generates the area total value information will be described with the area of the moving source of the person indicated by the input person information as the area to be calculated.

The calculation unit 631 specifies the area identification information stored in the area information storage unit 66 in association with the person identification information that matches the input person identification information. As a result, the calculation unit 631 specifies the area of the moving source of the person indicated by the input person information. The area information storage unit 66 stores pieces of area identification information indicating identifiers set in advance for each area, person information of a person assigned to the area indicated by the area identification information, and person evaluation value information of the person indicated by the person information in association with each other. The person evaluation value information indicates the total value of the ability evaluation values of one or two or more ability information associated with the person information of the person information. As in the second example embodiment, the ability information storage unit 65 stores one or two or more arbitrary ability information in association with the person information of a predetermined person.

As the ability information, the person evaluation value information will be specifically described by taking as an example a person in which information indicating that he/she has a qualification as an emergency paramedic and information indicating that he/she has a large vehicle license are associated with each other. The value indicated by the person evaluation value information of the person is a sum of the evaluation value to indicated by the evaluation value information associated with the information indicating that the person is qualified as an emergency paramedic and the evaluation value indicated by the evaluation value information associated with the information indicating that the person has a large vehicle license.

Further, the calculation unit 631 reads out the person identification information and the person evaluation value information associated with the specified area identification information from the area information storage unit 66. In addition, the calculation unit 631 excludes the person evaluation value information associated with the person identification information that matches the input person identification information from the read person evaluation value information, and calculates the total value of the evaluation values indicated by the person evaluation value information. The calculation unit 631 uses the information indicating the calculated total value as the area total value information of the area to be calculated.

Next, the process when the calculation unit 631 generates the area total value information will be described with the area of the moving destination of the person indicated by the input person information as the area to be calculated.

The calculation unit 631 reads out the person identification information and the person evaluation value information associated with the area identification information indicated by the input moving destination information from the area information storage unit 66. The calculation unit 631 calculates the total value of the evaluation value obtained by adding the evaluation value indicated by the read person evaluation value information and the evaluation value indicated by the input evaluation value information. The calculation unit 631 uses the information indicating the calculated total value as the area total value information of the area to be calculated.

When the moving destination information includes information indicating that the user has been dispatched in response to an emergency call, the moving destination area is not specified.

Finally, the process will be described in which the calculation unit 631 generates the area total value information with another area different from the area of the moving source or the area of the moving destination of the person indicated by the input person information as the area to be calculated.

The calculation unit 631 reads the person evaluation value information associated with the area identification information to be calculated from the area information storage unit 66. The calculation unit 631 calculates a total value of the evaluation values indicated by the read person evaluation value information. The calculation unit 631 uses the information indicating the calculated total value as the area total value information of the area to be calculated.

In this way, the calculation unit 631 generates the area total value information of each area. The calculation unit 631 outputs the specified ability information, the area total value information, and the area identification information of the area in which the area total value information is generated to the control information output unit 632 in association with each other Further, the calculation unit 631 stores the area identification information of the area indicated by the moving destination information in the area information storage unit 66 with respect to the input person identification information. When the total value of the evaluation values indicated by the input evaluation value information does not match the person evaluation value information stored in the area information storage unit 66 in association with the input person identification information, the calculation unit 631 performs the following operations The calculation unit 631 stores the input person identification information in the area information storage unit 66 as the person evaluation value information, which indicates the total value of the evaluation values indicated by the input evaluation value information.

The pieces of area identification information indicating the identifiers set in advance for each area and the person information of the person assigned to the area indicated by the area identification information may be stored in the area information storage unit 66 in association with each other. When the pieces of area identification information indicating the identifiers set in advance for each area and the person information of the person assigned to the area indicated by the area identification information are stored in the area information storage unit 66 in association with each other, the process of generating the area total value information by the calculation unit 631 will be described.

First, the calculation unit 631 reads the evaluation value information related to the ability information from the ability information storage unit 65 for each person information associated with the area identification information of the area to be calculated. The calculation unit 631 generates person evaluation value information indicating the total value of the ability evaluation values indicated by one or two or more ability information with respect to the person information Next, when the area to be calculated is the area of the moving source of the person indicated by the person information input by the specification unit 62, the calculation unit 631 performs the following processes. The calculation unit 631 excludes the person evaluation value information generated for the person identification information that matches the person identification information input by the specification unit 62 from the generated person evaluation value information, and calculates the total value of the evaluation values indicated by the person evaluation value information. The person indicated by the person identification information that matches the person identification information input by the specification unit 62 is assumed to be a person who moves from the calculation target area. The person who moves from the calculation target area is, for example, a person who is dispatched from the calculation target area in response to an emergency call.

Further, when the area to be calculated is the area of the moving destination of the person indicated by the person information input by the specification unit 62, the calculation unit 631 performs the following processes. The calculation unit 631 calculates the total value of the evaluation value in which the evaluation value indicated by the evaluation value information associated with the ability information specified by the specification unit 62 is added to the total value of the area in which the evaluation value indicated by the generated person evaluation value information is calculated. The evaluation value indicated by the evaluation value information associated with the ability information specified by the specification unit 62 is the evaluation value of the ability information specified for the person who moves to the area to be calculated. In addition, the calculation unit 631 may generate the person evaluation value information that is the total value of the evaluation values indicated by the evaluation value information associated with the ability information specified by the specification unit 62 with respect to the person information input by the specification unit 62.

Specifically, the specification unit 62 specifies the ability information of the person indicated by the person information acquired by the acquisition unit 61, and outputs the ability information, the person information, and the moving destination information to the control unit 63 in association with each other. The calculation unit 631 reads the evaluation value information associated with the ability information specified by the specification unit 62 from the ability information storage unit 65. In addition, the calculation unit 631 generates person evaluation value information of the person information input from the specification unit 62, to which the area identification information of the area to be calculated is associated as the moving destination information. Further, the calculation unit 631 calculates the total value of the evaluation value in which the evaluation value indicated by the person evaluation value information generated for the person information input from the specification unit 62 is added to the total value of the area in which the evaluation value indicated by the generated person evaluation value information is calculated.

Further, when the area to be calculated is another area different from the moving source area and the moving destination area of the person indicated by the person information input by the specification unit 62, the calculation unit 631 performs the following operation. The calculation unit 631 calculates the total value of the calculation target area of the evaluation value indicated by the generated person evaluation value information. In addition, the calculation unit 631 uses the information indicating the calculated total value as the area total value information of the area to be calculated.

The specified ability information, the area total value information, and the area identification information of the area in which the area total value information is generated are input to the control information output unit 632 from the calculation unit 631. When the specified ability information, the area total value information, and the area identification information of the area in which the area total value information is generated are input, the control information output unit 632 performs the following operations. The control information output unit 632 outputs the control information instructing the output of the specified ability information, the area total value information, and the area identification information of the area in which the area total value information is generated to the output device 4. The above-described control information includes information for causing the output device 4 to output the specified ability information, the area total value information, and the area identification information of the area in which the area total value information is generated as an image.

For example, regarding the area total value information and the area identification information of the area in which the area total value information is generated, the control information output unit 632 may display the list of the specified ability information, the area total value information, and the list of the area identification information of the area in which the area total value information is generated on the output device 4. Further, for example, the control information output unit 632 may use the map information to display a map image indicating the area total value information at the position in the map on the output device 4 for each area. The map information includes information for displaying a map including each areas an image. Further, the map information includes information indicating the position of the area indicated by each area identification information of each area included in the map.

The area information storage unit 66 stores pieces of area identification information indicating identifiers set in advance for each area, person information of a person assigned to the area indicated by the area identification information, and person evaluation value information of the person indicated by the person information in association with each other.

In this way, the control device 6 acquires the person information that is information unique to a person. Further, the control device 6 specifies the ability information of the person indicated by the acquired person information, and outputs the specified ability information to the predetermined output device 4. This makes it possible for the user of the control device 6 to confirm the ability information output to the output device 4. In this way, it becomes possible for the user of the control device 6 to easily grasp ability of a predetermined person.

Figure 14:
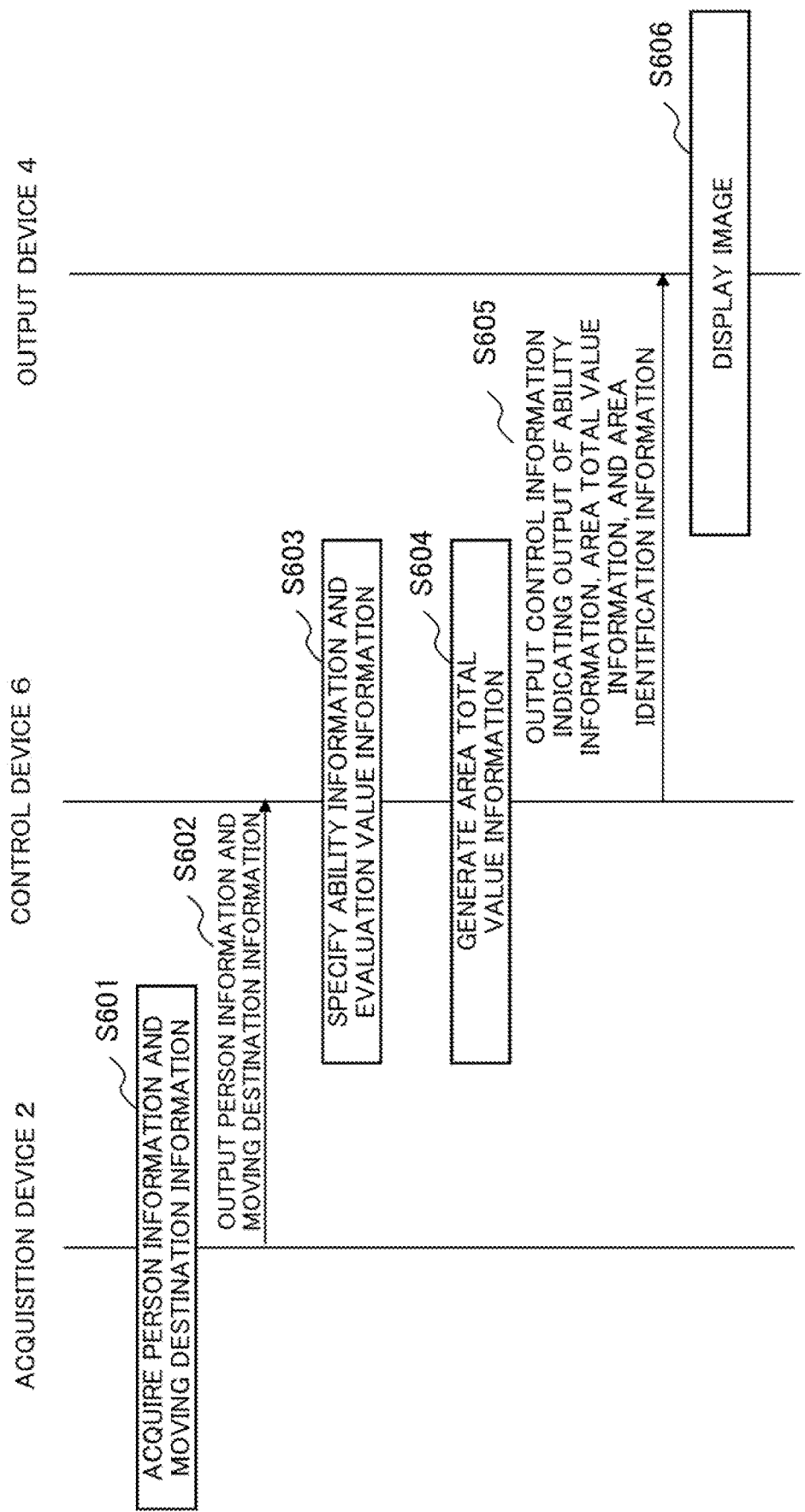
FIG. 14 is a sequence diagram illustrating an operation example of the control system according to the fourth example embodiment of the present invention.
Figure 15:
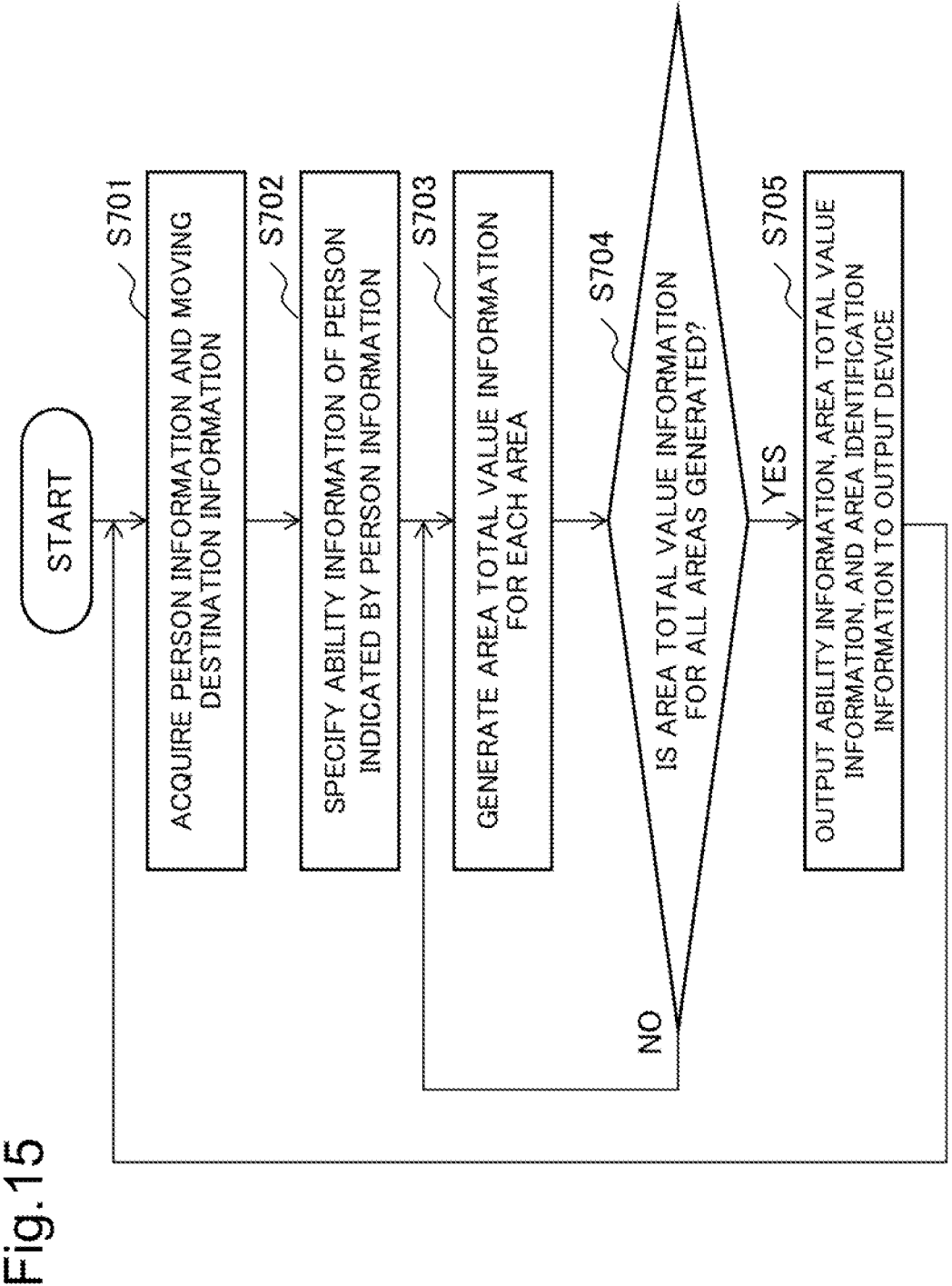
FIG. 15 is a flowchart illustrating an operation example of a control device according to the fourth example embodiment of the present invention.

Next, an operation example of the control system of the present example embodiment will be described with reference to FIGS. 14 and 15. FIG. 14 is a sequence diagram illustrating an operation example of the control system. FIG. 15 is a flowchart illustrating an operation example of the control device 6.

First, with reference to FIG. 14, the operation in which the acquisition device 2 acquires the person information and the moving destination information, and the control device 6 outputs the area total value information and the specified ability information to the output device 4 will be described.

The acquisition device 2 acquires the person information that is information unique to a person, and the moving destination information input by the user (step S601). The acquisition device 2 outputs the acquired person information and the moving destination information to the control device 6 in association with each other (step S602).

The control device 6 acquires the person information and the moving destination information by receiving the person information and the moving destination information from the acquisition device 2. The control device 6 specifies the ability information of the person indicated by the acquired person information and the evaluation value information indicating the evaluation value of the ability indicated by the specified ability information (step S603). Next, the control device 6 generates area total value information in which the evaluation values indicated by the evaluation value information related to the ability information of the person assigned to the area are summed for each area (step S604). Then, the control device 6 outputs the control information instructing the output of the specified ability information, the area total value information, and the area identification information of the area in which the area total value information is generated to the output device 4 (step S605).

When the ability information cannot be specified in step S603, the control device 6 outputs a message requesting input of the ability information to the output device 4, as in the second example embodiment. Further, the ability information is input to the output device 4 according to the operation of the input/output interface of the output device 4 by the user. Further, the output device 4 outputs the received person information and the input ability information to the control device 6 in association with each other.

The output device 4 receives, from the control device 6, the control information instructing the output of the ability information, the area total value information, and the area identification information of the area in which the area total value information is generated. The output device 4 displays the next image based on the specified ability information, the area total value information, and the control information instructing the output of the area identification information of the area in which the area total value information is generated. The output device 4 displays an image indicating the specified ability information, the area total value information, and the area identification information of the area in which the area total value information is generated (step S606). For example, the output device 4 displays a list of the specified ability information, the area total value information, and a list of the area identification information of the area in which the area total value information is generated.

Next, an operation example of the control device 6 will be described with reference to FIG. 15 Further, the operation of FIG. 15 details the operation of steps S603 to S605 of FIG. 14.

The input/output unit 64 receives the person information that is information unique to the person, and the moving destination information indicating the moving destination of the person indicated by the person information from the acquisition device 2. The input/output unit 64 outputs the received person information and the moving destination information to the acquisition unit 61 in association with each other.

The person information and the moving destination information are input to the acquisition unit 61 from the input/output unit 64. The acquisition unit 61 acquires the person information and the moving destination information by inputting the person information and the moving destination information from the input/output unit 64 (step S701). The acquisition unit 61 outputs the acquired person information and the moving destination information to the specification unit 62 in association with each other.

Person information and moving destination information are input to the specification unit 62 from the acquisition unit 61. The specification unit 62 specifies the ability information that is the information indicating the ability of the person indicated by the acquired person information (step S702). Further, the specification unit 62 reads the evaluation value information associated with the specified ability information from the ability information storage unit 65. The specification unit 62 outputs the specified ability information, the evaluation value information, the person information, and the moving destination information to the control unit 63 in association with each other.

Further, when the ability information cannot be specified by the specification unit 62, the control device 6 outputs the message requesting the input of the ability information to the output device 4, as in the second example embodiment. Further, the ability information is input to the output device 4 according to the operation of the input/output interface of the output device 4 by the user.

The specified ability information, evaluation value information, person information, and moving destination information are input from the specification unit 62 to the calculation unit 631 of the control unit 63. When the ability information, the evaluation value information, the person information, and the moving destination information are input, the calculation unit 631 generates the area total value information of each area (step S703).

In addition, the calculation unit 631 confirms whether the area total value information has been generated for all the areas (step S704). All the areas referred to here are areas in which the area identification information is stored in the area information storage unit 66. When the area total value information is generated for all areas (step S704, YES), the calculation unit 631 performs the following operations. The calculation unit 631 outputs the specified ability information, the generated area total value information, and the area identification information of the area in which the area total value information is generated to the control information output unit 632 in association with each other. When there is an area for which the area total value information has not been generated (step S704, NO), the calculation unit 631 performs the operation of step S703 for the area for which the area total value information has not been generated.

The specified ability information, the area total value information, and the area identification information of the area in which the area total value information is generated are input to the control information output unit 632 from the calculation unit 631. The control information output unit 632 outputs the control information instructing the output of the specified ability information, the area total value information, and the area identification information of the area in which the area total value information is generated to the output device 4. In this way, the control information output unit 632 outputs, the output device 4, the specified ability information, the area total value information, and the area identification information of the area in which the area total value information is generated (step S705).

Figure 17:
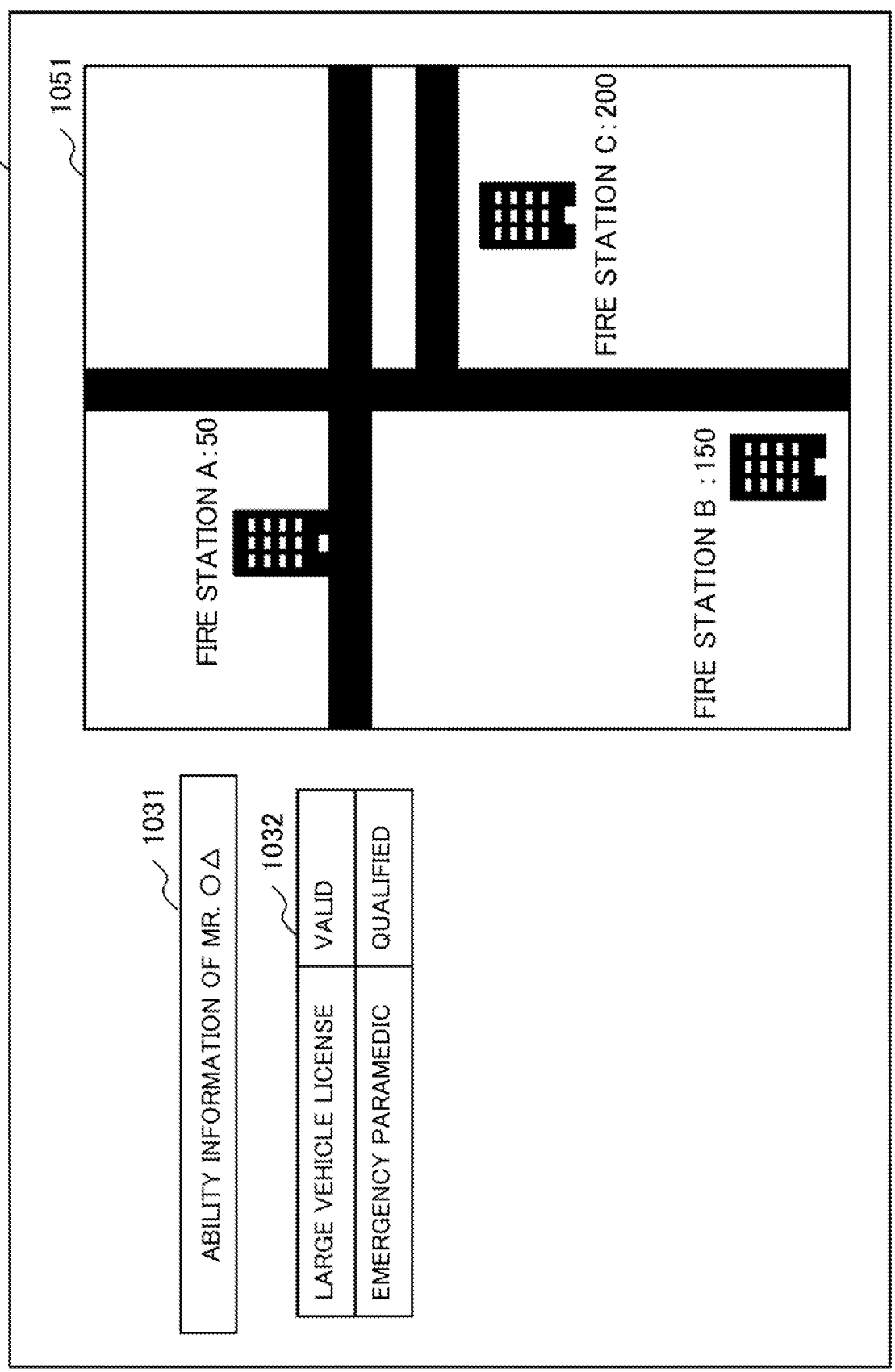
FIG. 17 is a diagram illustrating an example of a screen displayed on an output device according to the fourth example embodiment of the present invention.

FIGS. 16 and 17 illustrate an example of a screen displayed on the display unit 42 of the output device 4 when the ability information, the area total value information, and the area identification information of the area in which the area total value information is generated are output to the output device 4. Since message 1031 and Table 1032 are the same as the example of FIG. 12, the corresponding elements are designated by the same reference numerals as those of FIG. 12, and the description thereof will be omitted. In the case of the examples of FIGS. 16 and 17, the person indicated by "○△" that is the name of the person whose ability information is specified, is, for example, the person dispatched to respond to an emergency call. Further, in the example of the screen 104 illustrated in FIG. 16, table 1041 showing the area total value information of each area in which the area identification information is "fire station A", "fire station B", and "fire station C" is displayed on the display unit 42.

In addition, FIG. 17 illustrates an example of a screen displayed on the display unit 42 of the output device 4 when the output device 4 outputs a map image indicating the area total value information at the positions in the map for each area using the map information. Further, in the example of the screen 105 illustrated in FIG. 17, the map image 1051 showing the area total value information of each area in which the area identification information is "fire station A", "fire station B", and "fire station C" is displayed on the display unit 42.

Further, the control device 6 may generate area total value information of each type of ability information. When generating the area total value information of each type of ability information, the control device 6 outputs, to the output device 4, the ability information, the area total value information related to two or more types of ability information, and the area identification information of the area for which area total value information has been generated. The types of ability information are, for example, "firefighting operation responsiveness" and "emergency operation responsiveness". Further, when the control device 6 generates the area total value information of each type of ability information, the information indicating the type of ability information is stored in the ability information storage unit 65 in association with the ability information. Further, one ability information may be associated with information indicating two or more types of ability information. For example, the ability information indicating that the commander can serve as a command captain may be associated with information indicating "firefighting operation responsiveness" and information indicating "command ability" as information indicating the type of ability information. The ability information indicating the number of years of experience in firefighting operation may be associated with information indicating "firefighting operation responsiveness" and information indicating "experience value" as information indicating the type of ability information. In this case, the control device 6 outputs, in addition to the area total value information of the ability information type of "firefighting operation responsiveness", the area total value information of the ability information type of "command ability" and the area total value of "experience value" to the output device 4 to.

Figure 19:
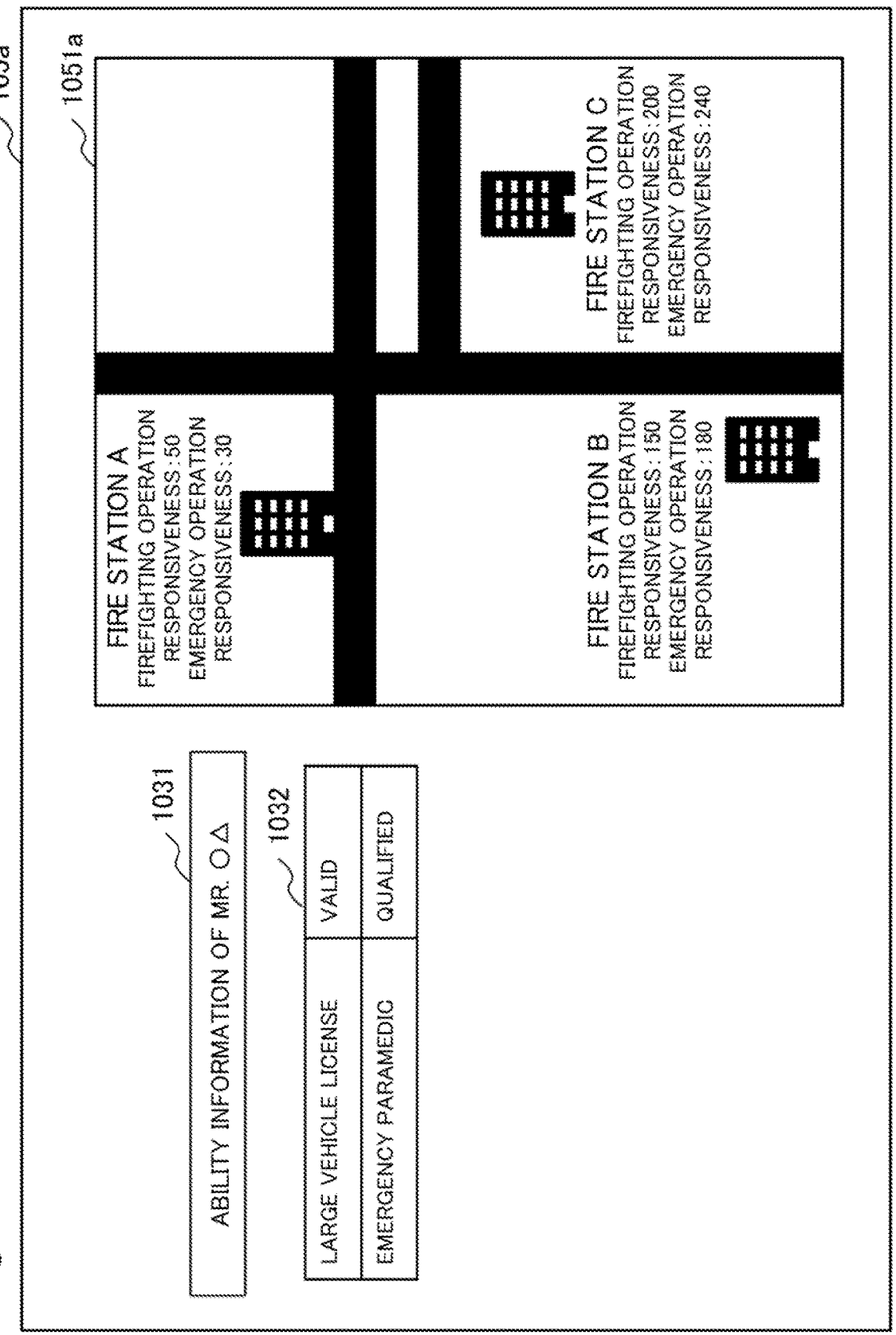
FIG. 19 is a diagram illustrating an example of a screen displayed on an output device according to the fourth example embodiment of the present invention.

FIGS. 18 and 19 illustrate an example of the screen displayed on the display unit 42 of the output device 4 when the output device 4 outputs the ability information, the area total value information related to two or more types of ability information, and the area identification information of the area in which the area total value information is generated. Since message 1031 and Table 1032 are the same as the example of FIG. 12, the corresponding elements are designated by the same reference numerals as those of FIG. 12, and the description thereof will be omitted. In an example of a screen 104a illustrated in FIG. 18, in areas where the area identification information is "fire station A", "fire station B", and "fire station C", a table 1041a showing the area total value information of "firefighting operation responsiveness" and the area total value information of "emergency operation responsiveness" as the type of ability information is displayed on the display unit 42.

In addition, FIG. 19 illustrates an example of a screen 105a displayed on the display unit 42 of the output device 4 when, using the map information, for each area, the map image in which the area total value information of the ability information type "firefighting operation responsiveness" and the area total value information of "emergency operation responsiveness" are shown at the related position in the map is output to the output device 4. In an example of a screen 105a illustrated in FIG. 19, in areas where the area identification information is "fire station A", "fire station B", and "fire station C", a map image 1051a showing the area total value information of "firefighting operation responsiveness" and the area total value information of "emergency operation responsiveness" as the type of ability information is displayed on the display unit 42.

In this way, the control device 6 acquires the person information that is information unique to a person. Further, the control device 6 specifies the ability information of the person indicated by the acquired person information, and outputs the specified ability information to the predetermined output device 4. This makes it possible for the user of the control device 6 to confirm the ability information output to the output device 4. In this way, it becomes possible for the user of the control device 6 to easily grasp ability of a predetermined person.

Further, the control device 6 of the present example embodiment displays, on the output device 4, an image indicating the specified ability information, the area total value information, and the area identification information of the area in which the area total value information is generated. In this way, the control device 6 can visualize the responsiveness for each area as a value indicated by the area total value information, and allow the user of the control device 6 to grasp the responsiveness for each area. As a result, the user of the control device 6 can confirm the value indicated by the area total value information of each area displayed on the display installed in the command center, and grasp the reduction in the responsiveness of the predetermined area.

Further, in the present example embodiment, the control device 6 displays, on the output device 4, the image indicating the ability information of the moved person, the area total value information after the person moves, and the area identification information for the area in which the area total value information was generated each time the person whose ability is grasped moves. As a result, when an ambulance crew or a firefighter is dispatched to respond to an emergency call, it becomes possible for the user of the control device 6 to grasp the area in which the responsiveness is reduced.

Fifth Example Embodiment

Next, the control device 7 according to the fifth example embodiment of the present invention will be specifically described. The control device 7 of the fifth example embodiment is different from the control device 6 of the fourth example embodiment in that at least one of a person and a car to be moved from a predetermined area to another area is specified.

Figure 20:
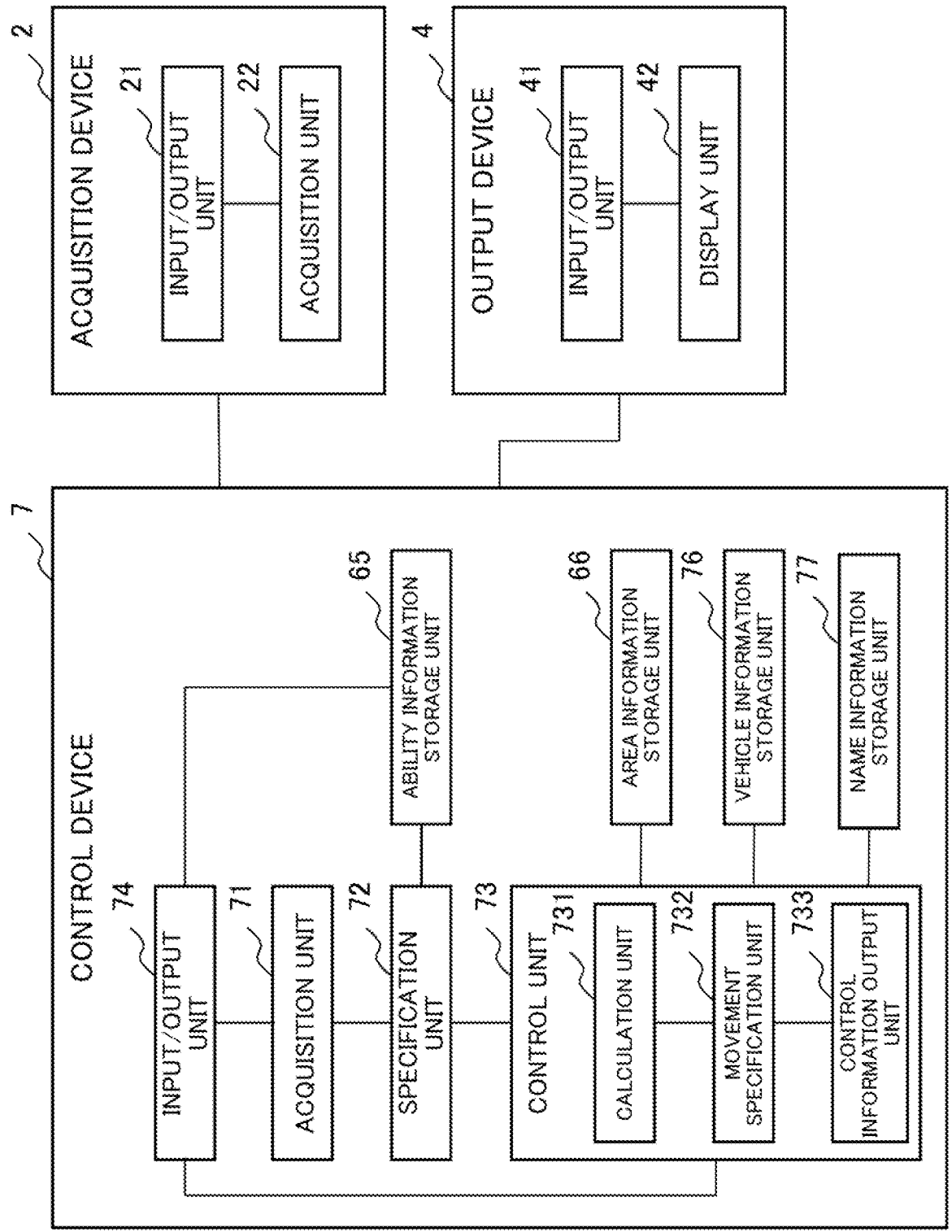
FIG. 20 is a block diagram illustrating a configuration example of a control system according to a fifth example embodiment of the present invention.

A configuration example of the control system of the present example embodiment will be described with reference to FIG. 20. FIG. 20 is a block diagram illustrating a configuration example of a control system according to the present example embodiment. As illustrated in FIG. 20, the control system of the present example embodiment includes an acquisition device 2, a control device 7, and an output device 4.

Since the configuration of the acquisition device 2 in the present example embodiment is the same as the configuration of the acquisition device 2 in the second example embodiment illustrated in FIG. 3 except for the following points, the corresponding elements are designated by the same reference numerals as in FIG. 3, and the description thereof will be omitted. The acquisition device 2 in the present example embodiment acquires person information that is information unique to a person, moving destination information indicating a moving destination of a person indicated by the person information, and car identification information that can identify each car used for movement. Further, the acquisition device 2 outputs the person information, the moving destination information, and the car identification information of the car used for the movement to the control device 7 in association with each other.

Further, since the configuration of the output device 4 in the present example embodiment is the same as the configuration of the output device 4 in the second example embodiment illustrated in FIG. 3 except for the following points, the corresponding elements are designated by the same reference numerals as in FIG. 3, and the description thereof will be omitted. The output device 4 in the present example embodiment performs the following operation when the control device 7 receives the specified ability information, the movement target information, the moving source designation information, and the control information instructing the output of the moving destination designation information. The input/output unit 41 displays, on the display unit 42, display the specified ability information, movement target information, moving source designation information, and moving destination designation information.

The movement target information is information indicating a movement target that is a target to be moved from a predetermined area to another area. When the target to be moved is a person, the movement target information includes name information indicating the name of the person to be moved. Further, when the object to be moved is a car, the car identification information indicating the car to be moved is included. The car identification information is information indicating preset identifiers for each car. The car identification information may be a series of designated numbers shown on the car registration number plate (license plate) of the car. Further, the moving source designation information is information indicating an area in which the target to be moved is arranged. The moving destination designation information is information indicating an area to move the target to be moved.

The control device 7 receives the person information, the moving destination information, and the car identification information of the car used for the movement from the acquisition device 2 to acquire the person information, the moving destination information, and the car identification information of the car used for the movement. The control device 7 specifies the ability information that is information indicating the ability of the person indicated by the acquired person information, and the evaluation value information indicating the evaluation value of the ability indicated by the specified ability information. Further, the control device 7 generates area total value information of each area. The area total value information indicates a total value of the evaluation values indicated by the evaluation value information related to the ability information of the person assigned to the area. Further, the control device 7 generates area number information of each area. The area number information indicates the number of cars deployed in the area. When the area total value information and the area number information satisfy the movement condition that is the condition for starting the identification of the movement target, the control device 7 specifies the movement target. The control device 7 outputs control information instructing the output of the movement target information, the moving destination designation information, the moving source designation information, and the specified ability information to the output device 4. In this way, the control device 7 outputs, to the output device 4, the movement target information, the moving destination designation information, the moving source designation information, and the specified ability information.

Further, the control device 7 of the present example embodiment may further output, to the output device 4, the area total value information and the area number information and the area identification information of the area in which the area total value information and the area number information are generated.

Next, the configuration of the control device 7 of the present example embodiment will be described in detail with reference to FIG. 20. The control device 7 includes an acquisition unit 71, a specification unit 72, and a control unit 73. Further, the ability information storage unit 65 is connected to the specification unit 72 and the input/output unit 74. Further, the area information storage unit 66, the car information storage unit 76, and the name information storage unit 77 are connected to the control unit 73. Further, the input/output unit 74 is connected to the acquisition unit 71, the control unit 73, and the ability information storage unit 65.

The input/output unit 74 receives the person information that is information unique to the person, the moving destination information indicating the moving destination of the person indicated by the person information, and the car identification information of the car used for the movement from the acquisition device 2. The input/output unit 74 outputs the received person information, the moving destination information, and the car identification information of the car used for the movement in association with each other to the acquisition unit 71. The configuration of the input/output unit 74 in the present example embodiment is the same as the configuration of the input/output unit 64 in the fourth example embodiment illustrated in FIG. 13, except for the above-described points, and thus the description thereof will be omitted.

The configuration of the ability information storage unit 65 and the area information storage unit 66 in the present example embodiment is the same as the configuration of the ability information storage unit 65 and the area information storage unit 66 in the fourth example embodiment illustrated in FIG. 13. The elements are designated by the same reference numerals as those in FIG. 13, and the description of the ability information storage unit 65 and the area information storage unit 66 will be omitted.

Person information, moving destination information, and car identification information of a car used for movement are input to the acquisition unit 71 from the input/output unit 74. The acquisition unit 71 inputs the person information, the moving destination information, and the car identification information of the car used for the movement from the input/output unit 74 to acquire the person information and the moving destination information and the car identification information of the car used for the movement. The acquisition unit 71 outputs the acquired person information, the moving destination information, and the car identification information of the car used for the movement in association with each other to the specification unit 72. For example, the person information is person identification information or biometric information. When the acquisition unit 71 acquires the image information, the person information is the image information indicating the face image. Further, for example, when the acquisition unit 71 acquires voice information, the person information is voice information.

The person information, the moving destination information, and the car identification information of the car used for the movement are input to the specification unit 72 from the acquisition unit 71. The specification unit 72 specifies the ability information that is the information indicating the ability of the person indicated by the acquired person information. Further, the specification unit 72 reads the evaluation value information associated with the specified ability information from the ability information storage unit 65. The specification unit 72 outputs the specified ability information, the evaluation value information, the person information, the moving destination information, and the car identification information of the car used for the movement to the control unit 73 in association with each other. Since the method of specifying the ability information by the specification unit 72 is the same as the method of specifying the ability information of the specification unit 32 in the second example embodiment, the description thereof will be omitted. Further, when the ability information cannot be specified by the specification unit 72, the control device 7 outputs a message requesting the input of the ability information to the output device 4, as in the second example embodiment. Further, the ability information is input to the output device 4 according to the operation of the input/output interface of the output device 4 by the user.

The control unit 73 includes a calculation unit 731, a movement specification unit 732, and a control information output unit 733.

In the calculation unit 731, the specified ability information and evaluation value information, the person information and the moving destination information, and the car identification information of the car used for the movement are input from the specification unit 72. In addition, the calculation unit 731 generates area total value information of each area. The area total value information indicates a total value of the evaluation values indicated by the evaluation value information related to the ability information of the person assigned to the area. The method in which the calculation unit 731 generates the area total value information is the same as the method in which the calculation unit 631 generates the area total value information in the fourth example embodiment, and thus the description thereof will be omitted.

The process of generating the area number information of each area by the calculation unit 731 will be specifically described. Here, the area in which the area number information is generated is called an area to be calculated.

First, the process when the calculation unit 731 generates the area number information will be described with the area of the car moving source indicated by the input car identification information as the calculation target area.

The calculation unit 731 specifies the area identification information stored in the car information storage unit 76 in association with the car identification information that matches the car identification information of the car used for the input movement. The area identification information indicating the identifier set in advance for each area and the car identification information of the cars deployed in the area indicated by the area identification information are stored in the car information storage unit 76 in association with each other. Further, the number information indicating the number of cars deployed in the area and the area identification information of the area are stored in the car information storage unit 76 in association with each other.

Further, the calculation unit 731 reads the number information associated with the specified area identification information from the car information storage unit 76. Further, the calculation unit 731 uses the information indicating the value obtained by subtracting the number of cars indicated by the input car identification information from the value indicated by the read number information as the area number information of the area to be calculated.

Next, the process when the calculation unit 731 generates the area number information will be described with the area to which the car moves indicated by the input car identification information as the area to be calculated.

The calculation unit 731 reads the number information associated with the area identification information indicated by the input moving destination information from the car information storage unit 76. Further, the calculation unit 731 uses the information indicating the value obtained by adding the number of cars indicated by the input car identification information to the value indicated by the read number information as the area number information of the area to be calculated.

Finally, the process will be described in which the calculation unit 731 generates the area number information with another area different from the moving source area and the moving destination area of the car indicated by the input car identification information as the area to be calculated.

The calculation unit 731 reads the number information associated with the area identification information to be calculated from the car information storage unit 76. The calculation unit 731 uses the read number information as the area number information of the area to be calculated.

In this way, the calculation unit 731 generates the area total value information and the area number information of each area. The calculation unit 731 outputs the specified ability information, the area total value information, the area number information, and the area identification information of the area in which the area total value information and the area number information are generated to the movement specification unit 732 in association with each other.

Further, the calculation unit 731 stores the area identification information of the area indicated by the moving destination information in the car information storage unit 76 with respect to the input car identification information. In addition, the area number information of the moving destination area is stored in association with the area identification information of the moving destination area of the car indicated by the input car identification information.

The specified ability information, the area total value information, the area number information, and the area identification information of the area in which the area total value information and the area number information are generated are input from the calculation unit 731 to the movement specification unit 732. The movement specification unit 732 determines whether the movement condition that is the condition for starting the identification of the movement target The movement condition is that any one of the followings is satisfied: that the value indicated by the area total value information is equal to or lower than a predetermined threshold value, or that the value indicated by the area number information is equal to or lower than a predetermined threshold value. When there is an area where the movement condition is satisfied, the movement specification unit 732 specifies the movement target information, the moving destination designation information, and the moving source designation information. In addition, when the movement target information is specified, the movement specification unit 732 outputs the movement target information, the moving destination designation information, the moving source designation information, and the specified ability information to the control information output unit 733 in association with each other. When the movement target information cannot be specified, the movement specification unit 732 outputs the ability information to the control information output unit 733.

When there is an area in which the value indicated by the area total value information is equal to or lower than a predetermined threshold value, the movement specification unit 732 specifies the person information of the person to be moved to the area. The movement specification unit 732 specifies a person to be moved as a movement target in such a way as to satisfy the movement target conditions preset by the user. The movement target condition is a condition for the movement specification unit 732 to specify the movement target to be moved.

For example, the movement target condition is a person satisfying a predetermined condition who is assigned to an area (referred to as a second area) having a greater value than an area (referred to as a first area) in which the value indicated by the area total value information is equal to or lower than the predetermined threshold value described above. The predetermined condition is that the person has predetermined ability such as being able to serve as a command captain of an ambulance crew or a fire brigade, or having a large vehicle license. Further, the movement target condition may be a person associated with the information indicating that the person is not operating, as information indicating an operating state of a person having the above-mentioned predetermined ability or a person having ability to play a predetermined role. The information indicating the operating state may be stored in the ability information storage unit 65 in association with the person information. As a result, when the person who can play a predetermined role is not in the first area, the movement specification unit 732 can specify a person who has predetermined ability and is not operating from the second area.

The predetermined condition may be, for example, that the value indicated by the person evaluation value information is a person whose value is equal to or greater than a predetermined threshold value. The person evaluation value information indicates a total value of the evaluation values indicated by the evaluation value information related to the ability information of a predetermined person Regarding the value indicated by the evaluation value information, it is assumed that the value indicated by the evaluation value information associated with the ability information indicating the ability useful for responding to an emergency call is greater than the value indicated by the evaluation value information associated with the ability information indicating other abilities. The control device 7 can consider a person whose value indicated by the person evaluation value information is larger than a predetermined threshold value as a person having high ability. For example, the control device 7 can identify a person with high ability from the person assigned to the second areas the person to be moved to the first area. For example, the first area is assumed to be the fire station after a person having high ability has been dispatched in response to an emergency call. The fire station that is the first area described above is assigned a person who has ability that is not useful for responding to emergency calls. In such a case, for example, the control device 7 displays, to the output device 4, a message in such a way as to temporarily move a person with high ability from the second area to the first area.

For example, a person who can serve as a command captain of an ambulance crew or a fire brigade who is assigned to an area in which the value indicated by the area total value information is larger than the area in which the value indicated by the area total value information is equal to or lower than the predetermined threshold value described above is set as a movement target condition. In this case, the movement specification unit 732 reads out the person information associated with the ability information indicating that it can serve as the command captain of the ambulance crew or the fire brigade from the ability information storage unit 65. Further, the movement specification unit 732 reads the area identification information associated with the read person information from the area information storage unit 66. The movement specification unit 732 calculates the number of persons having ability that can serve as the command captain of the ambulance crew or the fire brigade in the area in which the value indicated by the area total value information is larger than the area in which the value indicated by the area total value information is equal to or lower than the predetermined threshold value described above.

In addition, the movement specification unit 732 specifies the area identification information of the area to which a plurality of persons who can serve as command captains of the ambulance crew and the fire brigade are assigned. Further, the movement specification unit 732 specifies a person who can serve as a command captain of an ambulance crew or a fire brigade from the persons assigned to the area indicated by the specified area identification information as the person to be moved. The person information of the person who is the specification target of the ability information and the name information indicating the name of the person indicated by the person information are stored in the name information storage unit 77 in association with each other. The movement specification unit 732 reads the name information associated with the person information of the specified person from the name information storage unit 77. The movement specification unit 732 specifies, as the movement target information, the name information of the specified person, the moving source designation information indicating the area to which the person to be moved is assigned that is the second area, and the moving destination designation information indicating the moving destination area that is the first area.

Further, when there is an area in which the value indicated by the area number information is equal to or lower than a predetermined threshold value as the movement condition, the movement specification unit 732 specifies the car identification information of the car to be moved to the areas the movement target. The movement specification unit 732 specifies the car to be moved in such a way as to satisfy the movement target condition preset by the user. For example, the movement target condition is an area other than a predetermined area (referred to as one area) among the areas in which the value indicated by the area number information is equal to or lower than the above-described predetermined threshold value, and is a car that is in an area (referred to as another area) where the value indicated by the area number information is larger than that in one area. The movement specification unit 732 specifies, as the movement target information, the car identification information of the car to be moved, the moving source designation information indicating the area in which the car to be moved is deployed that is another area, and the moving destination designation information indicating the moving destination area that is one area.

Further, the car information storage unit 76 may store information indicating the type of the car and the car identification information of the car in association with each other. The movement specification unit 732 may specify the information indicating the type of the car indicated by the specified car identification information as the movement target information. The information indicating the type of the car is, for example, information indicating that the car is an emergency car or information indicating that the car is a firefighting car.

For example, suppose that the value indicated by the area number information of the fire station A is equal to or lower than a predetermined threshold value, and the value indicated by the area number information of the fire station B is greater than the value of the fire station A. Further, it is assumed that the car whose car identification information is XX that is deployed at the fire station B, is specified as a movement target by the movement specification unit 732. In this case, the control device 7 causes the output device 4 to display a message "Fire station A's responsiveness to a firefighting operation has reduced. Let's move the car XX from the fire station B to fire station A." Further, the control device 7 may display information indicating that there is a shortage of cars deployed in the area of the fire station A on the output device 4.

Figure 21:
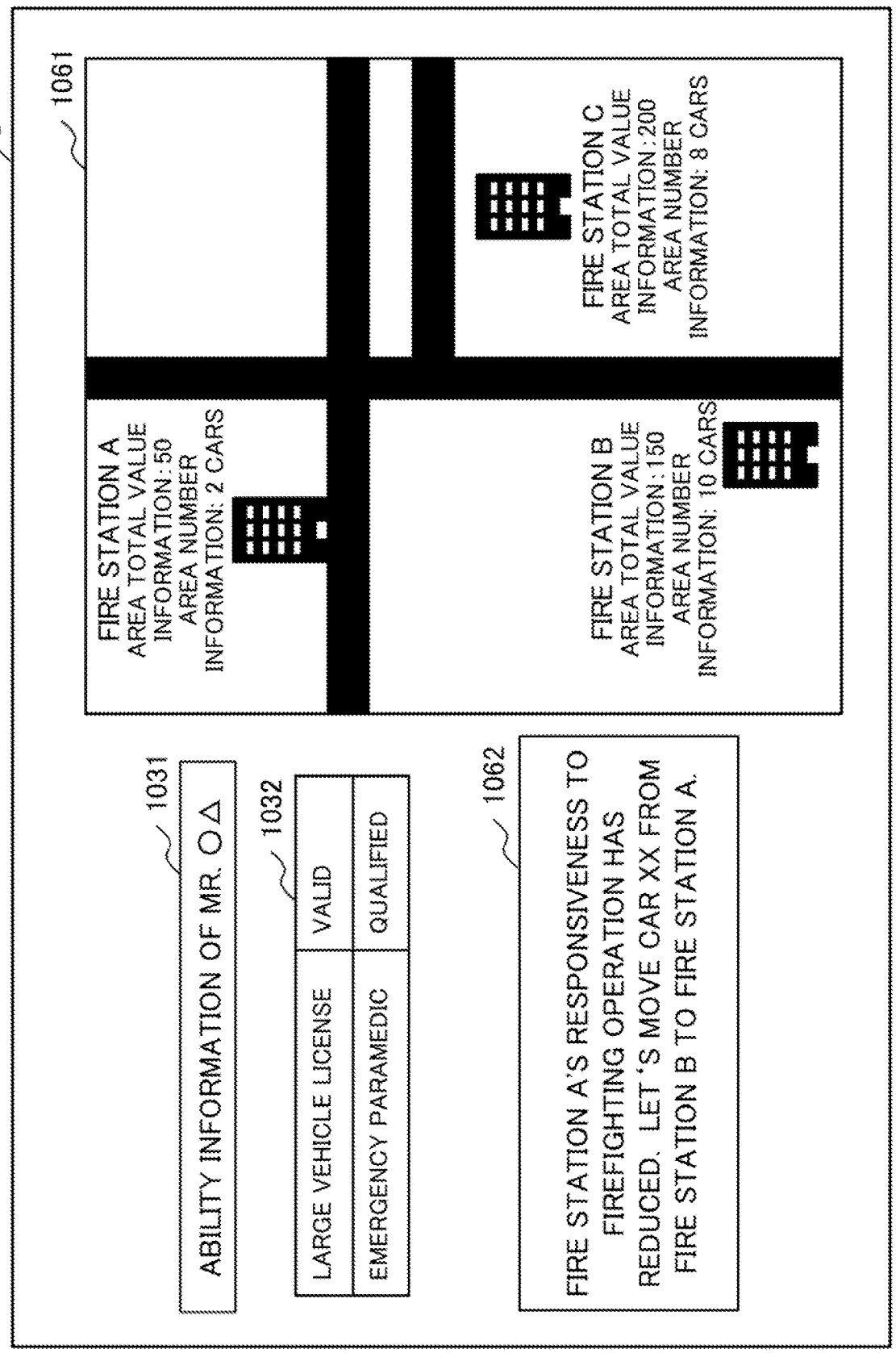
FIG. 21 is a diagram illustrating an example of a screen displayed on an output device according to the fifth example embodiment of the present invention.

FIG. 21 illustrates an example of a screen 106 displayed on the display unit 42 of the output device 4 when the output device 4 outputs a map image indicating the area total value information and the area number information at the positions in the map for each area using the map information. Since a message 1031 and a table 1032 are the same as the example of FIG. 12, the corresponding elements are designated by the same reference numerals as those of FIG. 12, and the description thereof will be omitted. In the example of FIG. 21, a map image 1061 illustrating the area total value information and the pieces of area number information of each area in which the area identification information is "fire station A", "fire station B", and "fire station C" is displayed on the display unit 42. In addition, in the example illustrated in FIG. 21, a message 1062 "Fire station A's responsiveness to a firefighting operation has reduced. Let's move the car XX from the fire station B to the fire station A." is displayed on the display unit 42. In addition, when the movement target is specified, the control device 7 displays at least the movement target information, the moving destination designation information, the message 1062 indicating the moving source designation information, and a table 1032 indicating the specified ability information on the output device 4. Further, as illustrated in FIG. 21, the control device 7 may display a map image indicating the area total value information and the area number information of each area, or an image indicating a list of the area total value information and the area number information of each area on the display unit 42.

Further, for example, it is assumed that the value indicated by the area total value information of the fire station A is equal to or lower than a predetermined threshold value, and the value indicated by the area total value information of the fire station C is greater than the value of the fire station A. In addition, it is assumed that a person assigned to the fire station C, who can serve as a command captain of an ambulance crew or a fire brigade, and whose name shown in the name information is ΔΔ, is specified as a movement target by the movement specification unit 732. Further, it is assumed that the value indicated by the area number information of fire station A is equal to or lower than a predetermined threshold value and the value indicated by the area number information of fire station C is greater than the value of fire station A. Further, it is assumed that the car whose car identification information is XX that is deployed at the fire station C, is specified as a movement target by the movement specification unit 732. In this case, the control device 7 causes the output device 4 to display a message "Fire station A's responsiveness to a firefighting operation has reduced. Let's move the car XX and Mr. ΔΔ from the fire station C to the fire station A."

Figure 22:
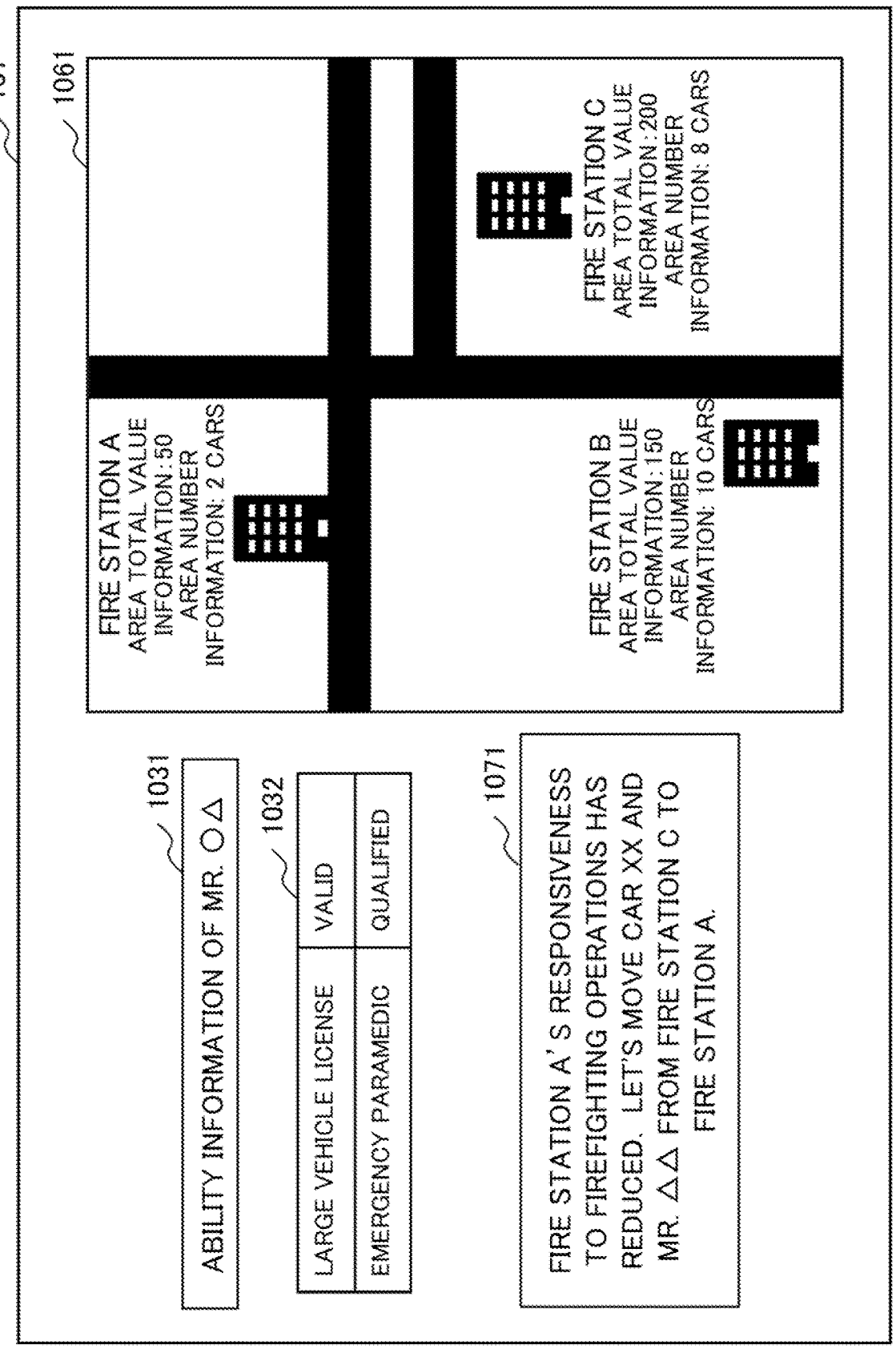
FIG. 22 is a diagram illustrating an example of the screen displayed on the output device according to the fifth example embodiment of the present invention.

FIG. 22 illustrates an example of a screen 107 displayed on the display unit 42 of the output device 4 when the output device 4 outputs a map image indicating the area total value information and the area number information at the positions in the map for each area using the map information. Since a message 1031 and a table 1032 are the same as the example of FIG. 12, the corresponding elements are designated by the same reference numerals as those of FIG. 12, and the description thereof will be omitted. Further, since the map image 1061 is the same as the example of FIG. 21, the elements are designated by the same reference numerals as those of FIG. 21, and the description thereof will be omitted. In the example illustrated in FIG. 22, a message 1071 "Fire station A's responsiveness to firefighting operations has reduced. Let's move the car XX and Mr. ΔΔ from the fire station C to the fire station A." is displayed on the display unit 42. In addition, when the movement target is specified, the control device 7 displays at least the movement target information, the moving destination designation information, a message 1071 indicating the moving source designation information, and a table 1032 indicating the specified ability information on the output device 4.

Further, the movement specification unit 732 may specify the ability information of each person assigned to the area in which the value indicated by the area total value information is equal to or lower than a predetermined threshold value. Further, the movement specification unit 732 may determine whether a person with predetermined ability is assigned to an area in which the value indicated by the area total value information is equal to or lower than a predetermined threshold value. For example, when the person who can serve as the command captain of the ambulance crew or the fire brigade is not assigned to the fire station A where the value indicated by the area total value information is equal to or lower than a predetermined threshold value, the control device 7 may display, on the output device 4, information indicating that the personnel who can take command at the site are absent from the fire station A.

Figure 23:
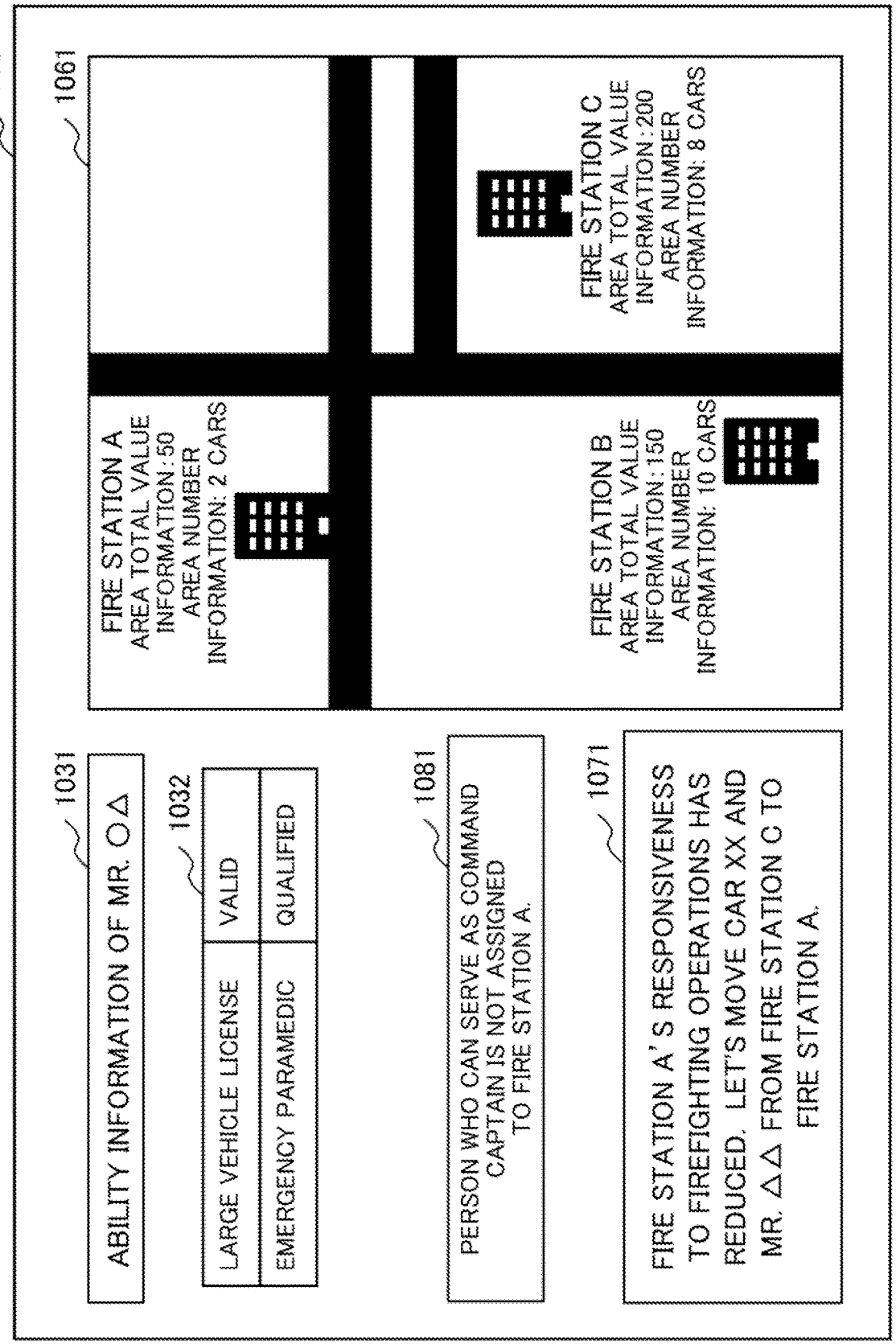
FIG. 23 is a diagram illustrating an example of the screen displayed on the output device according to the fifth example embodiment of the present invention.

FIG. 23 illustrates an example of a screen 108 displayed on the display unit 42 of the output device 4 when the output device 4 outputs a map image indicating the area total value information and the area number information at the corresponding positions in the map for each area using the map information. Since a message 1031 and a table 1032 are the same as the example of FIG. 12, the corresponding elements are designated by the same reference numerals as those of FIG. 12, and the description thereof will be omitted. Further, since the map image 1061 is the same as the example of FIG. 21, the elements are designated by the same reference numerals as those of FIG. 21, and the description thereof will be omitted. Further, since the message 1071 is the same as the example of FIG. 22, the corresponding elements are designated by the same reference numerals as those of FIG. 22, and the description thereof will be omitted. In the example of screen 108 illustrated in FIG. 23, the message 1081 "The person who can serve as the command captain is not assigned to the fire station A" is displayed on the display unit 42.

Further, when there are a plurality of targets to be moved with respect to a predetermined area, the movement specification unit 732 may specify another target to be moved from the area in which one target to be moved is specified. As a result, when there are a plurality of targets to be moved with respect to a predetermined area, the control device 7 can specify a plurality of targets to be moved with the same areas the moving source area.

The movement target information, the moving destination designation information, the moving source designation information, and the specified ability information are input to the control information output unit 733 from the movement specification unit 732. The control information output unit 733 outputs the control information instructing the output of the movement target information, the moving destination designation information, the moving source designation information, and the specified ability information to the output device 4. The movement target information, the moving destination designation information, the moving source designation information, and the control information instructing the output of the specified ability information include information for outputting, to the output device 4, the movement target information, the moving destination designation information, the moving source designation information, and the specified ability information as the image. For example, the control information output unit 733 displays, to the output device 4, an image that includes a message indicating the movement target information, the moving destination designation information, and the moving source designation information, and a list of the specified ability information.

Further, the ability information is input to the control information output unit 733 from the movement specification unit 732. When the ability information is input, the control information output unit 733 outputs the control information instructing the output of the ability information to the output device 4.

The area identification information indicating the identifier set in advance for each area and the car identification information of the cars deployed in the area indicated by the area identification information are stored in the car information storage unit 76 in association with each other. Further, the number information indicating the number of cars deployed in the area and the area identification information of the area are stored in the car information storage unit 76 in association with each other.

The person information of the person who is the specification target of the ability information and the name information indicating the name of the person indicated by the person information are stored in the name information storage unit 77 in association with each other.

In this way, the control device 7 acquires the person information that is information unique to a person. Further, the control device 7 specifies the ability information of the person indicated by the acquired person information, and outputs the specified ability information to the predetermined output device 4. This makes it possible for the user of the control device 7 to confirm the ability information output to the output device 4. In this way, it becomes possible for the user of the control device 7 to easily grasp ability of a predetermined person.

Figure 24:
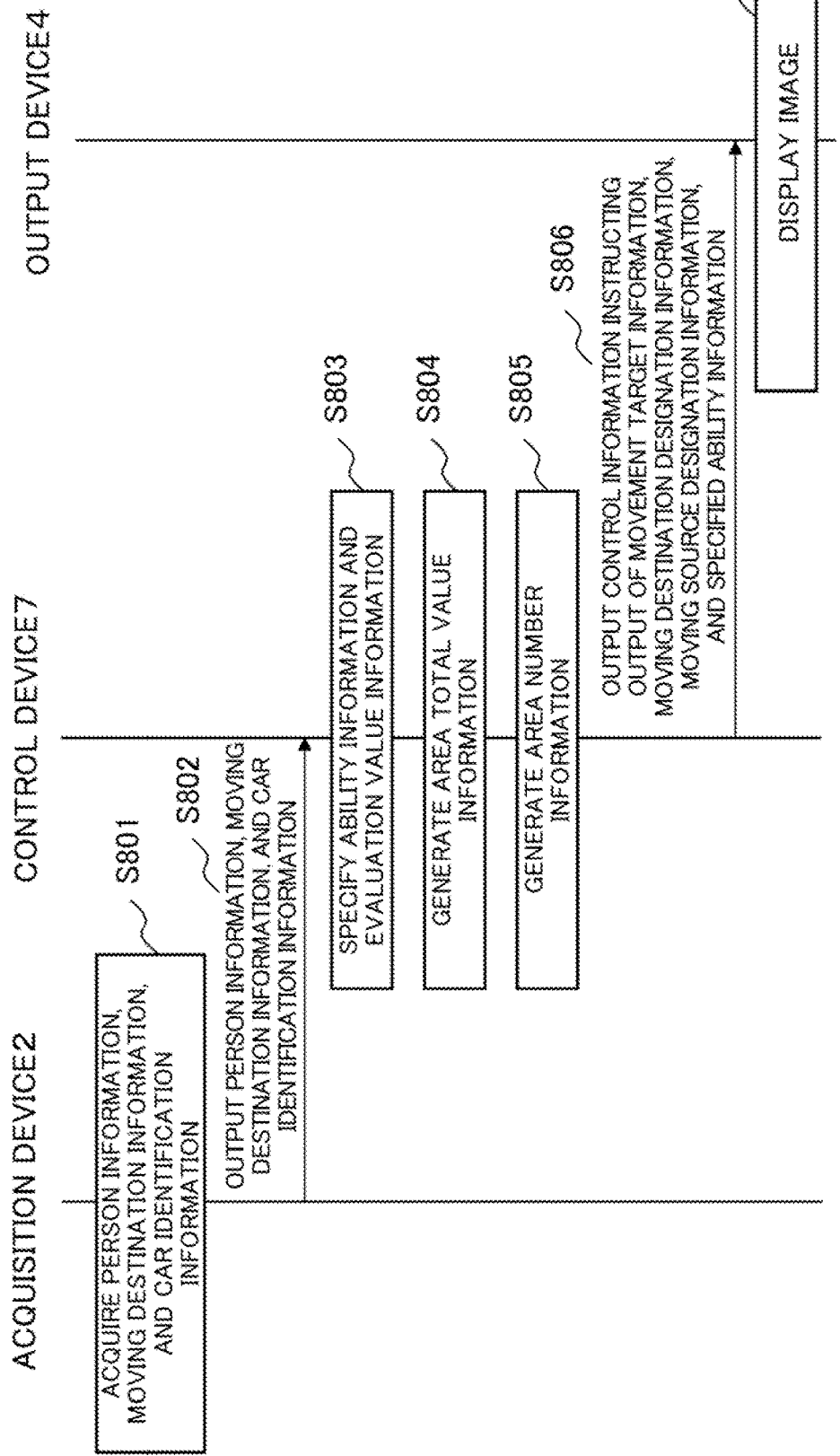
FIG. 24 is a sequence diagram illustrating an operation example of the control system according to the fifth example embodiment of the present invention.
Figure 25:
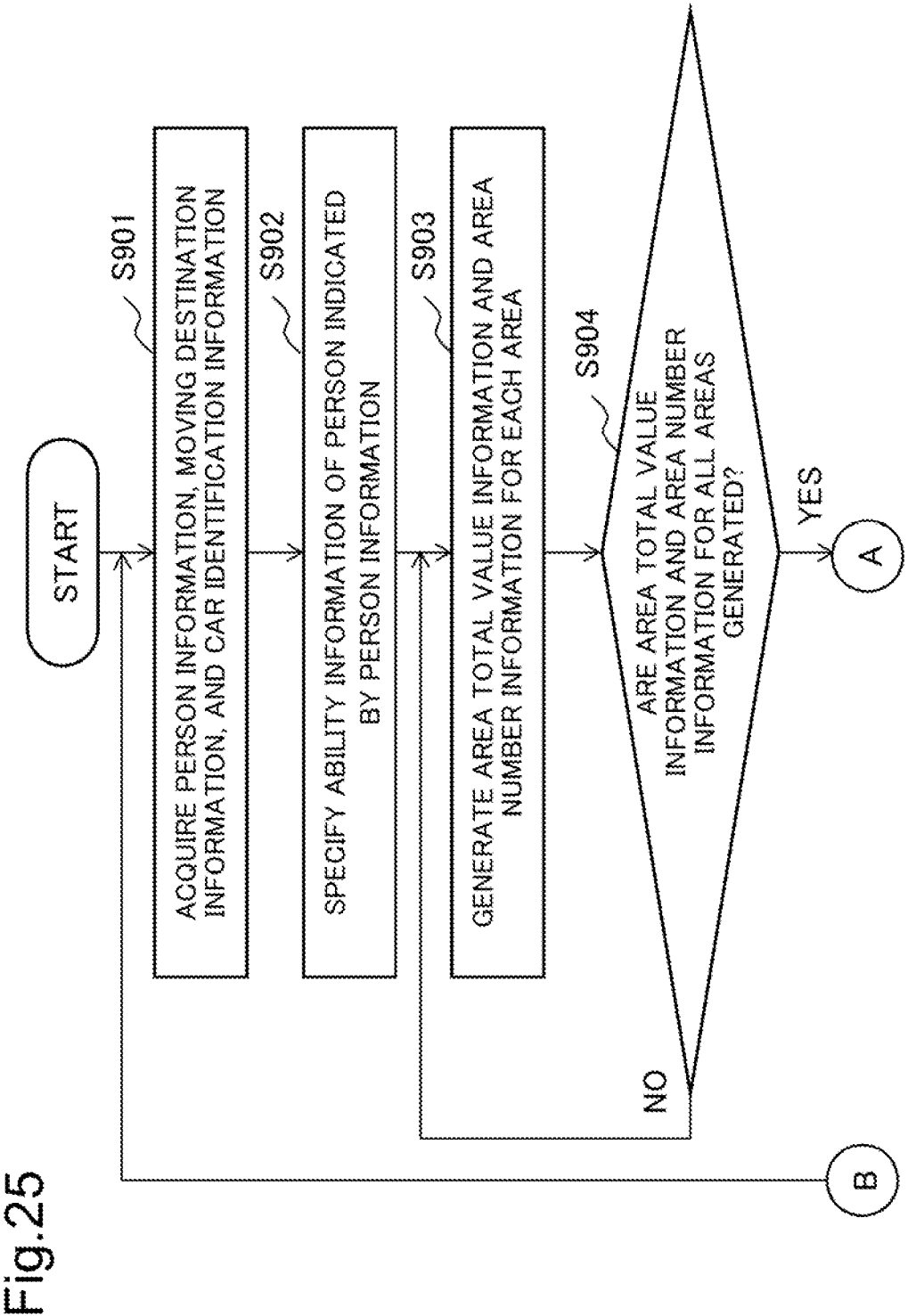
FIG. 25 is a flowchart illustrating the operation example of the control device according to the fifth example embodiment of the present invention.
Figure 26:
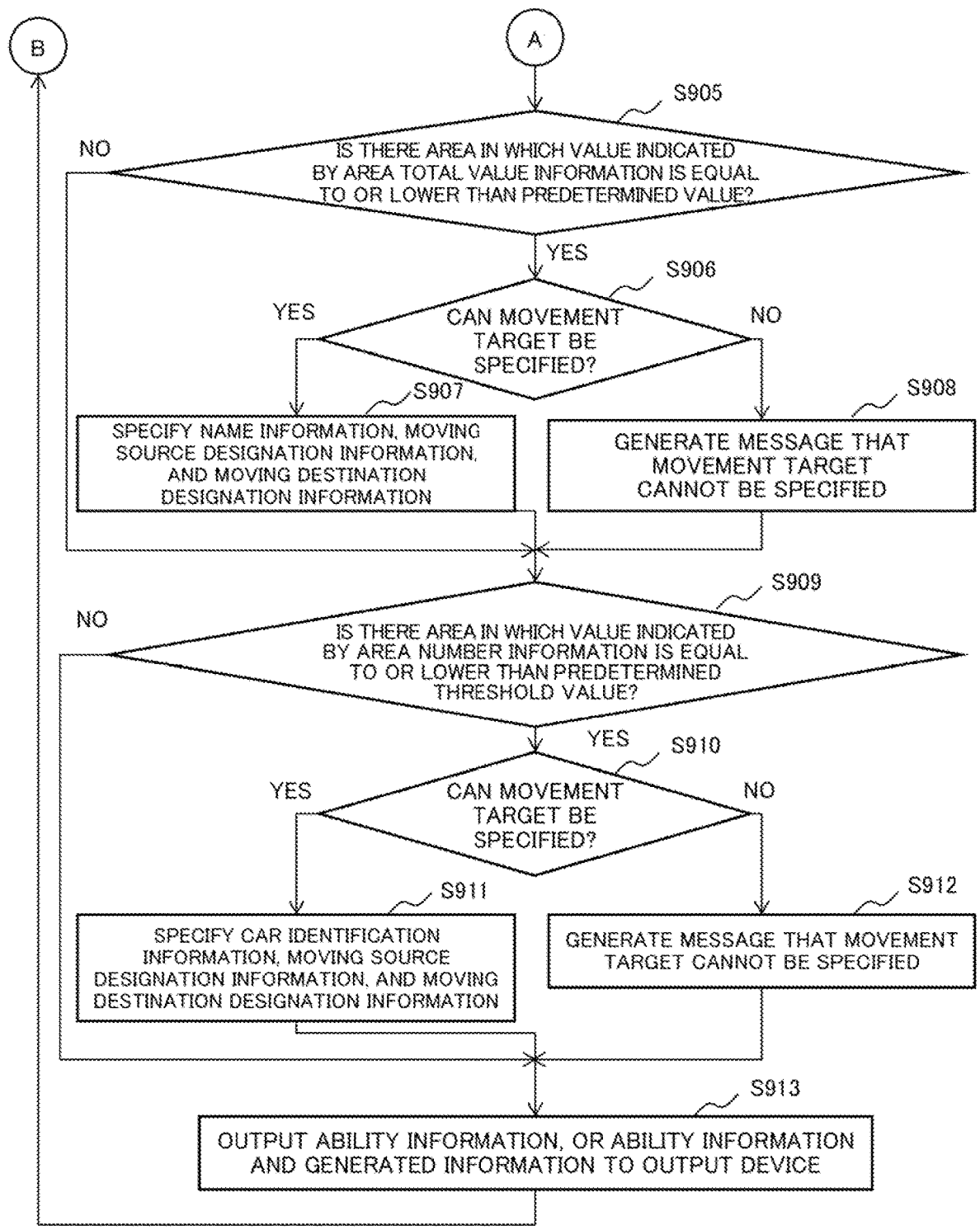
FIG. 26 is a flowchart illustrating the operation example of the control device according to the fifth example embodiment of the present invention.

Next, an operation example of the control system of the present example embodiment will be described with reference to FIGS. 24 to 26. FIG. 24 is a sequence diagram illustrating an operation example of the control system. 25 and 26 are flowcharts illustrating an operation example of the control device 7.

First, referring to FIG. 24, the operation will be described in which the acquisition device 2 acquires the person information, the moving destination information, and the car identification information that can identify each car used for the movement, and the control device 7 outputs, to the output device 4, the movement target information, the moving destination information, the moving source designation information, and the specified ability information. When the ability information is output to the output device 4, the control device 7 does not perform the operation of step S806 illustrated in FIG. 24, but performs the operation of step S204 illustrated in FIG. 4 of the second example embodiment.

The acquisition device 2 acquires the person information that is information unique to a person, the moving destination information, and the car identification information of the car used for the movement (step S801). The acquisition device 2 outputs the acquired person information, the moving destination information, and the car identification information of the car used for the movement to the control device 7 in association with each other (step S802).

The control device 7 receives the person information, the moving destination information, and the car identification information of the car used for the movement from the acquisition device 2 to acquire the person information, the moving destination information, and the car identification information of the car used for the movement. The control device 7 specifies the ability information of the person indicated by the acquired person information, and also specifies the evaluation value information indicating the evaluation value of the ability indicated by the specified ability information (step S803). The control device 7 generates area total value information of each area (step S804). Further, the control device 7 generates area number information of each area (step S805).

When the area total value information and the area number information satisfy the movement condition, the control device 7 specifies the target to be moved. The control device 7 outputs the control information instructing the output of the movement target information, the moving destination designation information, the moving source designation information, and the specified ability information to the output device 4 (step S806).

When the ability information cannot be specified in step S803, the control device 7 outputs a message requesting input of the ability information to the output device 4, as in the second example embodiment.

The output device 4 receives, from the control device 7, control information instructing the output of the movement target information, the moving destination designation information, the moving source designation information, and the specified ability information. The output device 4 displays an image indicating the movement target information, the moving destination designation information, the moving source designation information, and the specified ability information based on control information instructing the output of the movement target information, the moving destination designation information, the moving source designation information, and the specified ability information (step S807). For example, the output device 4 displays an image including movement target information, moving destination designation information, a message indicating the moving source designation information, and a list of the specified ability information.

Next, an operation example of the control device 7 will be described with reference to FIGS. 25 and 26. Further, the operations of FIGS. 25 and 26 detail the operations of steps S803 to S806 of FIG. 24.

The input/output unit 74 receives the person information that is information unique to the person, the moving destination information indicating the moving destination of the person indicated by the person information, and the car identification information of the car used for the movement from the acquisition device 2. The input/output unit 74 outputs the received person information, the moving destination information, and the car identification information of the car used for the movement in association with each other to the acquisition unit 71.

Person information, moving destination information, and car identification information of a car used for movement are input to the acquisition unit 71 from the input/output unit 74. The acquisition unit 71 inputs the person information, the moving destination information, and the car identification information of the car used for the movement from the input/output unit 74 to acquire the person information and the moving destination information and the car identification information of the car used for the movement (step S901). The acquisition unit 71 outputs the acquired person information, the moving destination information, and the car identification information of the car used for the movement in association with each other to the specification unit 72.

The person information, the moving destination information, and the car identification information of the car used for the movement are input to the specification unit 72 from the acquisition unit 71. The specification unit 72 specifies the ability information that is the information indicating the ability of the person indicated by the acquired person information (step S902). Further, the specification unit 72 reads the evaluation value information associated with the specified ability information from the ability information storage unit 65. The specification unit 72 outputs the specified ability information, the evaluation value information, the person information, the moving destination information, and the car identification information of the car used for the movement to the control unit 73 in association with each other.

Further, when the ability information cannot be specified by the specification unit 72, the control device 7 outputs a message requesting the input of the ability information to the output device 4, as in the second example embodiment.

In the calculation unit 731 of the control unit 73, the specified ability information, the evaluation value information, the person information, the moving destination information, and the car identification information of the car used for the movement are input from the specification unit 72. The calculation unit 731 generates area total value information of each area. In addition, the calculation unit 731 generates area number information of each area (step S903). The calculation unit 731 generates the area total value information and the area number information in an arbitrary order.

In addition, the calculation unit 731 confirms whether the area total value information and the area number information have been generated for all the areas (step S904). All the areas referred to here are areas in which the area identification information is stored in the area information storage unit 66. When the area total value information and the area number information are generated for all the areas (step S904, YES), the calculation unit 731 performs the following operations. The calculation unit 731 outputs the specified ability information, the area total value information, the area number information, and the area identification information of the area in which the area total value information and the area number information are generated to the movement specification unit 732 in association with each other. In addition, when there is an area in which the area total value information and the area number information are not generated (step S904, NO), the calculation unit 731 performs the operation of step S903 for the area in which the area total value information and the area number information are not generated.

The specified ability information, the area total value information, the area number information, and the area identification information of the area in which the area total value information and the area number information are generated are input from the calculation unit 731 to the movement specification unit 732. First, the movement specification unit 732 determines for each area whether the value indicated by the area total value information is equal to or lower than a predetermined threshold value (step S905).

When there is an area in which the value indicated by the area total value information is equal to or lower than a predetermined threshold value (step S905, YES), the movement specification unit 732 specifies a moving target satisfying the moving target condition as described above. When the movement target can be specified (step S906, YES), the movement specification unit 732 specifies, as the movement target information, the name information of the person to be moved, the moving source designation information indicating the area to which the person to be moved is assigned, and the moving destination designation information indicating the moving destination area (step S907). When the movement target cannot be specified (step S906, NO), the movement specification unit 732 does not perform the operation of step S907. The movement specification unit 732 generates a message that the movement target cannot be specified (step S908). When the movement target cannot be specified, for example, it is assumed that all the persons assigned to the second area who meet the movement target conditions have already been dispatched to respond to the emergency call. In addition, when a person who meets the conditions for movement is moved from the second area of the moving source to the first area, the case in which the value indicated by the area total value information of the second area of the moving source becomes equal to or lower than a predetermined threshold value is assumed. When moving to the first area, in the case in which the value indicated by the area total value information of the second area of the moving source is not equal to or lower than a predetermined threshold value, and a person who satisfies the moving target condition cannot be specified, the movement specification unit 732 may generate a message that the movement target cannot be specified.

When there is no area in which the value indicated by the area total value information is equal to or lower than a predetermined threshold value (step S905, NO), the movement specification unit 732 does not perform the operations of steps S906 to S908.

Next, the movement specification unit 732 determines for each area whether the value indicated by the area number information is equal to or lower than a predetermined threshold value (step S909). When there is an area in which the value indicated by the area number information is equal to or lower than a predetermined threshold value (step S909, YES), the movement specification unit 732 specifies a movement target satisfying the movement target condition as described above. When the movement target can be specified (step S910, YES), the movement specification unit 732 specifies, as the movement target information, the car identification information of the car to be moved, the moving source designation information indicating the area in which the car to be moved is deployed, and the moving destination designation information indicating the moving destination area (step S911). When the movement target cannot be specified (step S910, NO), the movement specification unit 732 does not perform the operation of step S911. The movement specification unit 732 generates a message that the movement target cannot be specified (step S912). Further, the movement specification unit 732 may generate a notification requesting the display of an alarm in step S908 and step S912 instead of the message that the movement target cannot be specified. The control information output unit 733, in which a notification requesting the display of the alarm is input from the movement specification unit 732, outputs an alarm to the output device 4 instead of the message that the movement target cannot be specified.

The movement specification unit 732 does not perform the operations of steps S910 to S912 when there is no area in which the value indicated by the area number information is equal to or lower than a predetermined threshold value (step S909, NO).

When the movement target information is specified, the movement specification unit 732 outputs the movement target information, the moving destination designation information, the moving source designation information, and the specified ability information to the control information output unit 733. When the movement target is not specified, the movement specification unit 732 outputs the ability information to the control information output unit 733. When a message indicating that the movement target cannot be specified is generated, the movement specification unit 732 outputs the ability information and the generated message to the control information output unit 733. Further, even when the message that the movement target cannot be specified is generated, if there is a specified movement target other than the movement target that cannot be specified, the movement specification unit 732 performs the following operations. The movement specification unit 732 outputs the specified movement target information, the moving destination designation information, the moving source designation information, the specified ability information, and a message that the movement target cannot be specified to the control information output unit 733.

The movement target information, the moving destination designation information, the moving source designation information, and the specified ability information are input to the control information output unit 733 from the movement specification unit 732. The control information output unit 733 outputs the control information instructing the output of the movement target information, the moving destination designation information, the moving source designation information, and the specified ability information to the output device 4. In this way, the control information output unit 733 outputs, to the output device 4, the movement target information, the moving destination designation information, the moving source designation information, and the specified ability information.

Further, in the control information output unit 733, the ability information and the message that the movement target cannot be specified are input from the movement specification unit 732. In this case, the control information output unit 733 outputs the ability information and the control information instructing the output of the message that the movement target cannot be specified to the output device 4. Further, the specified movement target information, the moving destination designation information, the moving source designation information, the specified ability information, and the message that the movement target cannot be specified are input from the movement specification unit 732 to the control information output unit 733. In this case, the control information output unit 733 outputs the specified movement target information, the moving destination designation information, the moving source designation information, the specified ability information, and the control information instructing the output of the message that the movement target cannot be specified to the output device 4.

Further, the ability information is input to the control information output unit 733 from the movement specification unit 732. The control information output unit 733 outputs the control information instructing the output of the ability information to the output device 4. In this way, the control information output unit 733 outputs the ability information to the output device 4 or the ability information and the generated information (step S909). The generated information includes a message that the movement target cannot be specified, movement target information, moving destination designation information, and moving source designation information.

In this way, the control device 7 acquires the person information that is information unique to a person. Further, the control device 7 specifies the ability information of the person indicated by the acquired person information, and outputs the specified ability information to the predetermined output device 4. This makes it possible for the user of the control device 7 to confirm the ability information output to the output device 4. In this way, it becomes possible for the user of the control device 7 to easily grasp ability of a predetermined person.

Further, the control device 7 of the present example embodiment display, to the output device 4, an image indicating the movement target information, the moving destination designation information, the moving source designation information, and the specified ability information. As a result, the user of the control device 7 can confirm the movement target information, the moving destination designation information, and the moving source designation information, and can cope with the decrease in the responsiveness of the predetermined area.

Hardware Configuration Example

A configuration example of hardware resources for realizing the control devices (1, 3, 5, 6, and 7) in each example embodiment of the present invention described above by using one information processing device (computer) will be described. The control device may be achieved by using at least two information processing devices physically or functionally. Further, the control device may be achieved as a dedicated device. Further, only a part of the functions of the control device may be achieved by using the information processing device.

Figure 27:
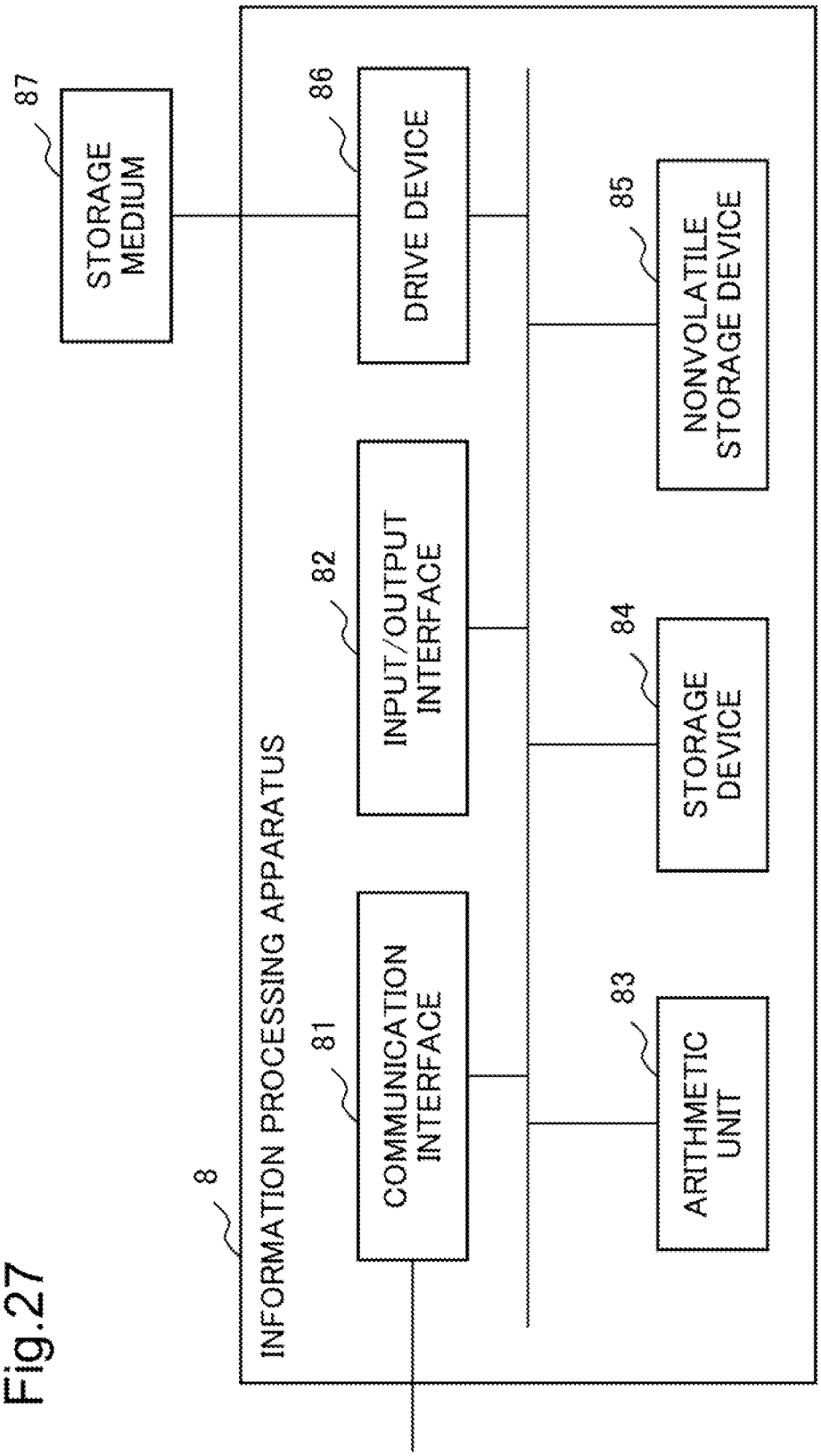
FIG. 27 is a block diagram illustrating a hardware configuration example of each example embodiment of the present invention.

FIG. 27 is a diagram schematically illustrating a hardware configuration example of an information processing device capable of realizing the control device according to each example embodiment of the present invention. The information processing device 8 includes a communication interface 81, an input/output interface 82, an arithmetic unit 83, a storage device 84, a non-volatile storage device 85, and a drive device 86.

For example, the acquisition unit 11, the specification unit 12, and the control unit 13 in FIG. 1 can be achieved by the arithmetic unit 83. Further, for example, the input/output unit 34 of FIG. 3 can be achieved by the communication interface 81. Further, for example, the ability information storage unit 35 of FIG. 3 can be achieved by the storage device 84.

The communication interface 81 is a communication means for the control device of each example embodiment to communicate with an external device by wire or/and wirelessly. When the control device is achieved by using at least two information processing devices, the devices may be connected in such a way as to be able to communicate with each other via the communication interface 81.

The input/output interface 82 is a man-machine interface such as a keyboard as an example of an input device and a display as an output device.

The arithmetic unit 83 is achieved by an arithmetic processing unit such as a general-purpose central processing unit (CPU) or a microprocessor, or a plurality of electric circuits. The arithmetic unit 83 can, for example, read various programs stored in the non-volatile storage device 85 into the storage device 84 and execute processing according to the read programs.

The storage device 84 is a memory device such as RAM (Random Access Memory) that can be referred to by the arithmetic unit 83, and stores programs, various data, and the like. The storage device 84 may be a volatile memory device.

The non-volatile storage device 85 is, for example, a non-volatile storage device such as a read only memory (ROM), a flash memory, etc., and can store various programs, data, and the like.

The drive device 86 is, for example, a device that processes data reading and writing to a recording medium 87, which will be described later.

The recording medium 87 is any recording medium capable of recording data, such as an optical disk, a magneto-optical disk, and a semiconductor flash memory.

Each example embodiment of the present invention may be achieved by configuring, for example, a control device by the information processing device 8 illustrated in FIG. 27, and supplying a program capable of enabling the functions described in each of the above example embodiments to the control device.

In this case, the example embodiment can be achieved by the arithmetic unit 83 executing the program supplied to the control device. It is also possible to configure some functions of the information processing device 8 instead of all of the control devices.

Further, the program may be recorded on the recording medium 87, and the program may be appropriately stored in the non-volatile storage device 85 at the shipping stage, the operation stage, or the like of the control device. In this case, as the supply method of the above program, a method of installing the program in the control device by using an appropriate jig may be adopted at the manufacturing stage before shipment, the operation stage, or the like. Further, as the method of supplying the above program, a general procedure such as a method of downloading from the outside via communication line such as the Internet may be adopted.

With respect to the example embodiment described above, Patent Literature 1 does not describe outputting information indicating the ability of the ambulance crew identified as the speaker. Therefore, the method described in Patent Literature 1 has a problem that the user of the server device such as the specified rescuer or another rescuer cannot easily grasp the ability of the specified ambulance crew.

An example advantage according to the invention is to make the user of the control device easily grasp ability of a predetermined person It should be noted that each of the above-described example embodiments is a preferred example embodiment of the present invention, and various modifications can be made without departing from the gist of the present invention.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The whole or part of the example embodiments disclosed above can be described as, but not limited to, the following supplementary notes.

(Supplementary Note 1)

A control device, including:
an acquisition unit configured to acquire person information that is information unique to person;
a specification unit configured to specify ability information that is information indicating ability of the person indicated by the acquired person information; and
a control unit configured to output the specified ability information to a predetermined output device.

(Supplementary Note 2)

The control device described in supplementary note 1, in which
the control unit further outputs attention information calling attention to the output device when ability indicated by the specified ability information satisfies an attention condition set for a role assigned to the person indicated by the acquired person information.

(Supplementary Note 3)

The control device described in supplementary note 1 or 2, in which
the person information is biometric information obtained from a living body of the person.

(Supplementary Note 4)

The control device described in supplementary note 3, in which
target feature information indicating a feature of biometric information of the person who is a specification target of the ability information is stored in an ability information storage unit in association with the person information of the person who is the specification target of the ability information and the ability information of the person who is the specification target of the ability information, and
the specification unit extracts feature information indicating the feature of the biometric information from the acquired biometric information, and specifies, as the ability information of the person indicated by the acquired person information, the ability information associated with the target feature information whose degree of similarity to the extracted feature information is equal to or greater than a predetermined value.

(Supplementary Note 5)

The control device described in supplementary note 4, in which
evaluation value information indicating an evaluation value of the ability is further stored in the ability information storage unit in association with the ability information,
the person information of the person assigned to each area is stored in an area information storage unit in association with area identification information indicating an identifier set in advance for each area, and
the control unit generates, in each area, area total value information indicates a total value of evaluation value of the person assigned to the area, the evaluation value being indicated by person evaluation value information indicating a total value of the person information among evaluation values of one or two or more of a plurality of pieces of the ability information associated with the person information, and further outputs the area total value information to the output device.

(Supplementary Note 6)

The control device described in supplementary note 5, in which
number information indicating the number of cars deployed in each area is stored in a car information storage unit,
the acquisition unit further acquires moving destination information indicating a moving destination of the person indicated by the person information and car identification information of a car for the movement, and
the control unit further generates, for each area, area number information indicating the number of cars deployed in the area based on the number information, specifies a movement target to be moved based on the area total value information and the area number information when the area total value information and the area number information satisfy a movement condition which is a condition to start specifying the movement target, and outputs movement target information indicating the specified movement target, moving source designation information indicating an area in which the movement target is assigned, moving destination designation information indicating a moving destination area in which the movement target moves, and the specified ability information to the output device.

(Supplementary Note 7)

The control device described in supplementary note 6, in which
the person information of the person who is the specification target of the ability information is stored in a name information storage unit in association with name information indicating a name of the person,
the control unit specifies the person who moves from a second area to a first area when specifying the person as a movement target, a value indicated by the area total value information in the second area being greater than a value indicated by the area total value information in the first area,
the movement target information includes the name information of the person to be moved,
the moving destination designation information is area identification information indicating the first area, and the moving source designation information is area identification information indicating the second area.

(Supplementary Note 8)

The control device described in supplementary note 6 or 7, in which the car information storage unit further stores car identification information of cars deployed in each area, the control unit specifies the car that is moved from another area to one area when specifying a car as a movement target, a value indicated by the area number information in the another area being greater than a value indicated by the area number information in the one area, the movement target information includes the car identification information of the car to be moved, the moving destination designation information is area identification information indicating one area, and the moving source designation information is area identification information indicating the another area.

(Supplementary Note 9)

A control method, including:

acquiring person information that is information unique to person;

specifying ability information that is information indicating ability of the person indicated by the acquired person information; and outputting the specified ability information to a predetermined output device.

(Supplementary Note 10)

The control method described in supplementary note 9, in which attention information calling attention is further output to the output device when ability indicated by the specified ability information satisfies an attention condition set for a role assigned to the person indicated by the acquired person information.

(Supplementary Note 11)

The control method described in supplementary note 9 or 10, in which the person information is biometric information obtained from a living body of the person.

(Supplementary Note 12)

The control method described in supplementary note 11, in which target feature information indicating a feature of biometric information of the person who is a specification target of the ability information is stored in an ability information storage unit in association with the person information of the person who is the specification target of the ability information and the ability information of the person who is the specification target of the ability information, and feature information indicating the feature of the biometric information is extracted from the acquired biometric information, and the ability information associated with the target feature information whose degree of similarity to the extracted feature information is equal to or greater than a predetermined value is specified as the ability information of the person indicated by the acquired person information.

(Supplementary Note 13)

The control method described in supplementary note 12, in which evaluation value information indicating an evaluation value of the ability is further stored in the ability information storage unit in association with the ability information, the person information of the person assigned to each area is stored in an area information storage unit in association with area identification information indicating an identifier set in advance for each area, and area total value information indicates a total value of evaluation value of the person assigned to the area is generated in each area, the evaluation value being indicated by person evaluation value information indicating a total value of the person information among evaluation values of one or two or more of a plurality of pieces of the ability information associated with the person information, and the area total value information is further output to the output device.

(Supplementary Note 14)

The control method described in supplementary note 13, in which number information indicating the number of cars deployed in each area is stored in a car information storage unit, moving destination information indicating a moving destination of the person indicated by the person information and car identification information of a car for the movement are further acquired, and area number information indicating the number of cars deployed in the area based on the number information is further generated for each area, a movement target to be moved is specified based on the area total value information and the area number information when the area total value information and the area number information satisfy a movement condition which is a condition to start specifying the movement target, and movement target information indicating the specified movement target, moving source designation information indicating an area in which the movement target is assigned, moving destination designation information indicating a moving destination area in which the movement target moves, and the specified ability information are output to the output device.

(Supplementary Note 15)

The control method described in supplementary note 14, in which the person information of the person who is the specification target of the ability information is stored in a name information storage unit in association with name information indicating a name of the person, the person who moves from a second area to a first area is specified when specifying the person as a movement target, a value indicated by the area total value information in the second area being greater than a value indicated by the area total value information in the first area, the movement target information includes the name information of the person to be moved, the moving destination designation information is area identification information indicating the first area, and the moving source designation information is area identification information indicating the second area.

(Supplementary Note 16)

The control method described in supplementary note 14 or 15, in which the car information storage unit further stores car identification information of cars deployed in each area, the car that is moved from another area to one area is specified when specifying a car as a movement target, a value indicated by the area number information in the another area being greater than a value indicated by the area number information in the one area, the movement target information includes the car identification information of the car to be moved, the moving destination designation information is area identification information indicating one area, and the moving source designation information is area identification information indicating the another area.

(Supplementary Note 17)

A control program causing a computer to execute an acquisition function configured to acquire person information that is information unique to person, a specification function configured to specify ability information that is information indicating ability of the person indicated by the acquired person information, and a control function configured to output the specified ability information to a predetermined output device.

(Supplementary Note 18)

The control program described in supplementary note 17, in which the control function further outputs attention information calling attention to the output device when ability indicated by the specified ability information satisfies an attention condition set for a role assigned to the person indicated by the acquired person information.

(Supplementary Note 19)

The control program described in supplementary note 17 or 18, in which the person information is biometric information obtained from a living body of the person.

(Supplementary Note 20)

The control program described in supplementary note 19, in which target feature information indicating a feature of biometric information of the person who is a specification target of the ability information is stored in an ability information storage unit in association with the person information of the person who is the specification target of the ability information and the ability information of the person who is the specification target of the ability information, and the specification function extracts feature information indicating the feature of the biometric information from the acquired biometric information, and specifies, as the ability information of the person indicated by the acquired person information, the ability information associated with the target feature information whose degree of similarity to the extracted feature information is equal to or greater than a predetermined value.

(Supplementary Note 21)

The control program described in supplementary note 20, in which evaluation value information indicating an evaluation value of the ability is further stored in the ability information storage unit in association with the ability information, the person information of the person assigned to each area is stored in an area information storage unit in association with area identification information indicating an identifier set in advance for each area, and the control function generates, in each area, area total value information indicates a total value of evaluation value of the person assigned to the area, the evaluation value being indicated by person evaluation value information indicating a total value of the person information among evaluation values of one or two or more of a plurality of pieces of the ability information associated with the person information, and further outputs the area total value information to the output device.

(Supplementary Note 22)

The control program described in supplementary note 21, in which number information indicating the number of cars deployed in each area is stored in a car information storage unit, the acquisition function further acquires moving destination information indicating a moving destination of the person indicated by the person information and car identification information of a car for the movement, and the control function further generates, for each area, area number information indicating the number of cars deployed in the area based on the number information, specifies a movement target to be moved based on the area total value information and the area number information when the area total value information and the area number information satisfy a movement condition which is a condition to start specifying the movement target, and outputs movement target information indicating the specified movement target, moving source designation information indicating an area in which the movement target is assigned, moving destination designation information indicating a moving destination area in which the movement target moves, and the specified ability information to the output device.

(Supplementary Note 23)

The control program described in supplementary note 22, in which the person information of the person who is the specification target of the ability information is stored in a name information storage unit in association with name information indicating a name of the person, the control function specifies the person who moves from a second area to a first area when specifying the person as a movement target, a value indicated by the area total value information in the second area being greater than a value indicated by the area total value information in the first area, the movement target information includes the name information of the person to be moved, the moving destination designation information is area identification information indicating the first area, and the moving source designation information is area identification information indicating the second area.

(Supplementary Note 24)

The control program described in supplementary note 22 or 23, in which the car information storage unit further stores car identification information of cars deployed in each area, the control function specifies the car that is moved from another area to one area when specifying a car as a movement target, a value indicated by the area number information in the another area being greater than a value indicated by the area number information in the one area, the movement target information includes the car identification information of the car to be moved, the moving destination designation information is area identification information indicating one area, and the moving source designation information is area identification information indicating the another area.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A control device, comprising one or more memories storing instructions and one or more processors configured to execute the instructions to:
   acquire person information that is information unique to a person;
   specify ability information that is information indicating ability of the person indicated by the acquired person information; and
   output the specified ability information to a predetermined output device,
   wherein the person information is biometric information obtained from a living body of the person,
   wherein target feature information indicating a feature of biometric information of the person who is a specification target of the ability information is stored in an ability information storage memory in association with the person information of the person who is the specification target of the ability information and the ability information of the person who is the specification target of the ability information, and
   wherein the one or more processors are configured to execute the instructions to:
      extract feature information indicating the feature of the biometric information from the acquired biometric information; and
      specify, as the ability information of the person indicated by the acquired person information, the ability information associated with the target feature information whose degree of similarity to the extracted feature information is equal to or greater than a predetermined value.

2. The control device according to claim 1,
   wherein the one or more processors are configured to execute the instructions to further output attention information calling attention to the output device when ability indicated by the specified ability information satisfies an attention condition set for a role assigned to the person indicated by the acquired person information.

3. The control device according to claim 1,
   wherein evaluation value information indicating an evaluation value of the ability is further stored in the ability information storage memory in association with the ability information,
   wherein the person information of the person assigned to each area is stored in an area information storage memory in association with area identification information indicating an identifier set in advance for each area, and
   wherein the one or more processors are configured to execute the instructions to:
   generate, in each area, area total value information indicates a total value of evaluation value of the person assigned to the area, the evaluation value being indicated by person evaluation value information indicating a total value of the person information among evaluation values of one or two or more of a plurality of pieces of the ability information associated with the person information, and
   further output the area total value information to the output device.

4. The control device according to claim 3,
   wherein number information indicating the number of cars deployed in each area is stored in a car information storage memory, and
   wherein the one or more processors are configured to execute the instructions to:
   further acquire moving destination information indicating a moving destination of the person indicated by the person information and car identification information of a car for the movement,
   further generate, for each area, area number information indicating the number of cars deployed in the area based on the number information,
   specify a movement target to be moved based on the area total value information and the area number information when the area total value information and the area number information satisfy a movement condition which is a condition to start specifying the movement target, and
   output movement target information indicating the specified movement target, moving source designation information indicating an area in which the movement target is assigned, moving destination designation information indicating a moving destination area in which the movement target moves, and the specified ability information to the output device.

5. The control device according to claim 4,
   wherein the person information of the person who is the specification target of the ability information is stored in a name information storage memory in association with name information indicating a name of the person,
   wherein the one or more processors are configured to execute the instructions to specify the person who moves from a second area to a first area when specifying the person as a movement target, a value indicated by the area total value information in the second area being greater than a value indicated by the area total value information in the first area,
   wherein the movement target information includes the name information of the person to be moved,
   wherein the moving destination designation information is area identification information indicating the first area, and
   wherein the moving source designation information is area identification information indicating the second area.

6. The control device according to claim 4,
   wherein the car information storage memory further stores car identification information of cars deployed in each area,
   wherein the one or more processors are configured to execute the instructions to specify the car that is moved from another area to one area when specifying a car as a movement target, a value indicated by the area number information in the another area being greater than a value indicated by the area number information in the one area,
   wherein the movement target information includes the car identification information of the car to be moved,
   wherein the moving destination designation information is area identification information indicating one area, and
   wherein the moving source designation information is area identification information indicating the another area.

7. A control method, comprising:
acquiring person information that is information unique to a person;
specifying ability information that is information indicating ability of the person indicated by the acquired person information; and
outputting the specified ability information to a predetermined output device,
wherein the person information is biometric information obtained from a living body of the person,
wherein target feature information indicating a feature of biometric information of the person who is a specification target of the ability information is stored in an ability information storage memory in association with the person information of the person who is the specification target of the ability information and the ability information of the person who is the specification target of the ability information, and
wherein feature information indicating the feature of the biometric information is extracted from the acquired biometric information, and the ability information associated with the target feature information whose degree of similarity to the extracted feature information is equal to or greater than a predetermined value is specified as the ability information of the person indicated by the acquired person information.

8. The control method according to claim 7, wherein attention information calling attention is further output to the output device when ability indicated by the specified ability information satisfies an attention condition set for a role assigned to the person indicated by the acquired person information.

9. The control method according to claim 7, wherein evaluation value information indicating an evaluation value of the ability is further stored in the ability information storage memory in association with the ability information,
the person information of the person assigned to each area is stored in an area information storage memory in association with area identification information indicating an identifier set in advance for each area, and
area total value information indicates a total value of evaluation value of the person assigned to the area is generated in each area, the evaluation value being indicated by person evaluation value information indicating a total value of the person information among evaluation values of one or two or more of a plurality of pieces of the ability information associated with the person information, and the area total value information is further output to the output device.

10. The control method according to claim 9, wherein number information indicating the number of cars deployed in each area is stored in a car information storage memory,
moving destination information indicating a moving destination of the person indicated by the person information and car identification information of a car for the movement are further acquired, and
area number information indicating the number of cars deployed in the area based on the number information is further generated for each area, a movement target to be moved is specified based on the area total value information and the area number information when the area total value information and the area number information satisfy a movement condition which is a condition to start specifying the movement target, and movement target information indicating the specified movement target, moving source designation information indicating an area in which the movement target is assigned, moving destination designation information indicating a moving destination area in which the movement target moves, and the specified ability information are output to the output device.

11. The control method according to claim 10, wherein
the person information of the person who is the specification target of the ability information is stored in a name information storage memory in association with name information indicating a name of the person,
the person who moves from a second area to a first area is specified when specifying the person as a movement target, a value indicated by the area total value information in the second area being greater than a value indicated by the area total value information in the first area,
the movement target information includes the name information of the person to be moved,
the moving destination designation information is area identification information indicating the first area, and
the moving source designation information is area identification information indicating the second area.

12. The control method according to claim 10, wherein
the car information storage memory further stores car identification information of cars deployed in each area,
the car that is moved from another area to one area is specified when specifying a car as a movement target, a value indicated by the area number information in the another area being greater than a value indicated by the area number information in the one area,
the movement target information includes the car identification information of the car to be moved,
the moving destination designation information is area identification information indicating one area, and
the moving source designation information is area identification information indicating the another area.

13. A computer-readable non-transitory recording medium recorded with a control program causing a computer to execute
an acquisition function configured to acquire person information that is information unique to a person,
a specification function configured to specify ability information that is information indicating ability of the person indicated by the acquired person information, and
a control function configured to output the specified ability information to a predetermined output device,
wherein the person information is biometric information obtained from a living body of the person,
wherein target feature information indicating a feature of biometric information of the person who is a specification target of the ability information is stored in an ability information storage memory in association with the person information of the person who is the specification target of the ability information and the ability information of the person who is the specification target of the ability information, and
wherein the specification function extracts feature information indicating the feature of the biometric information from the acquired biometric information, and specifies, as the ability information of the person indicated by the acquired person information, the ability information associated with the target feature information whose degree of similarity to the extracted feature information is equal to or greater than a predetermined value.

14. The computer-readable non-transitory recording medium recorded with the control program according to claim 13, wherein the control function further outputs attention information calling attention to the output device when ability indicated by the specified ability information satisfies an attention condition set for a role assigned to the person indicated by the acquired person information.

\* \* \* \* \*